April 3, 1962 J. E. FERNEKEES ETAL 3,028,583

INFORMATION STORAGE CALCULATION SYSTEM

Filed Aug. 10, 1955

29 Sheets-Sheet 1

INVENTORS
JAMES E. FERNEKEES
LEONARD R. HARPER

BY

ATTORNEY

April 3, 1962 J. E. FERNEKEES ETAL 3,028,583

INFORMATION STORAGE CALCULATION SYSTEM

Filed Aug. 10, 1955 29 Sheets-Sheet 5

April 3, 1962 J. E. FERNEKEES ETAL 3,028,583

INFORMATION STORAGE CALCULATION SYSTEM

Filed Aug. 10, 1955 29 Sheets-Sheet 9

April 3, 1962 J. E. FERNEKEES ETAL 3,028,583

INFORMATION STORAGE CALCULATION SYSTEM

Filed Aug. 10, 1955 29 Sheets-Sheet 10

INFORMATION STORAGE CALCULATION SYSTEM

April 3, 1962 J. E. FERNEKEES ETAL 3,028,583

INFORMATION STORAGE CALCULATION SYSTEM

Filed Aug. 10, 1955 29 Sheets-Sheet 17

INFORMATION STORAGE CALCULATION SYSTEM

INFORMATION STORAGE CALCULATION SYSTEM

Filed Aug. 10, 1955 29 Sheets-Sheet 19

INFORMATION STORAGE CALCULATION SYSTEM

April 3, 1962 J. E. FERNEKEES ETAL 3,028,583

INFORMATION STORAGE CALCULATION SYSTEM

Filed Aug. 10, 1955 29 Sheets-Sheet 26

INFORMATION STORAGE CALCULATION SYSTEM

April 3, 1962 J. E. FERNEKEES ETAL 3,028,583

INFORMATION STORAGE CALCULATION SYSTEM

Filed Aug. 10, 1955 29 Sheets-Sheet 28

United States Patent Office 3,028,583
Patented Apr. 3, 1962

3,028,583
INFORMATION STORAGE CALCULATION SYSTEM

James E. Fernekees, Wappingers Falls, and Leonard Roy Harper, Poughkeepsie, N.Y., assignors to International Business Machines Corporation, New York, N.Y., a corporation of New York Filed Aug. 10, 1955, Ser. No. 527,586
43 Claims. (Cl. 340—172.5)

The present invention relates to electronic data processing machines, and particularly to an improved data processing machine using a small magnetic drum as the storage medium.

The utilization of a small magnetic drum as a storage medium makes available a large amount of storage at a nominal cost per stored digit. Prior arrangements making use of magnetic drum storage have resulted in storage of groups of related digits, each such group being conventionally called a "word" or "message," indiscriminately around the drum and requires that each stored message be given an identifying code number or address corresponding thereto in order that the message may later be located in storage. Each such address frequently has been as large as ten digit length, since it must specify the addresses of the message involved, the next instruction address, and the instructions to be performed at the present time. This conventional prior art arrangement often requires up to two revolutions of the drum before an instruction is executed, and is accordingly extremely wasteful of time. To reduce this time requirement to a minimum requires rigorously optimized programming. Further time is required to read each instruction while nothing else is done, so that these prior arrangements are not able to make the most efficient desired use of the time available.

In this invention a magnetic drum is utilized as the storage medium, but the information is recorded thereon in a novel manner which minimizes the so-called "hardware" and eliminates most of the detrimental features and handicaps encountered in conventional use of magnetic drum storage. In the system disclosed herein, described in the environment of a data processing machine in the form of a calculator adapted for accounting use, the instructions or "programs" are automatically recorded in angular relationship to their associated data in such manner that the location of the program instruction is also the location of the data and vice versa. In such a system, therefore, the size of the drum is the determinant for the number of instructions and data that can be executed and processed in one drum revolution.

The utilization of such a stored program system results in the replacement of large, cumbersome and heavily wired control panels by a relatively few punched tabulating cards with its consequent reduction of original cost, simplification of construction, and storage space requirements. In addition thereto, a procedural or requirements operation change is effected by merely punching new instruction cards rather than by tedious and time consuming change of complicated wiring at plug panels as heretofore required. In particular, the operator in using a machine embodying the present invention simply feeds it four program cards, for example, which determine in what sequence what operations will be performed on what numbers, and then feeds into the machine a succession of detail cards setting forth numbers on which the operations determined by the program cards are performed. Any subsequent change in program is simply effected by insertion of a new program card or cards which automatically effect erasure from storage of a portion or all of the old program and insertion into storage of the new program.

The invention may be briefly described as an improved electronic data processing machine and system utilizing magnetic drum storage in which the program is automatically recorded in storage in predetermined spatial relationship to one or more data values associated therewith.

An object of this invention is the provision of an improved electronic data processing machine and system.

Another object of the invention is the provision of an improved system of magnetic storage for data processing machines.

It is a further object of the invention to provide a novel drum storage system which avoids one or more of the disadvantages and limitations of prior arrangements using magnetic drum storage.

It is an additional object of the invention to provide a new and improved drum storage system in which transfer into and from storage is under the actual control of index or timing signals indicative of preestablished spatial storage positions.

It is yet a further object of the invention to provide a magnetic storage system wherein data and programming information are stored in preestablished, fixed, spatial relationship with the programming instructions spatially related to the data information to which the instructions apply.

It is an additional object of the invention to provide a novel magnetic storage system in which predetermined fixed storage spaces are reserved for relatively long term storage of program instructions, while predetermined other fixed spaces interposed between the program instruction spaces are reserved for relatively short term storage of data information so that the latter may be translated as an essentially continuous flow of data into the storage medium, from location to location within the storage medium, and eventually from the storage medium.

Other objects and advantages of the invention will appear as the detailed description thereof proceeds in the light of the drawings forming a part of this application, and in which.

Figure 1:
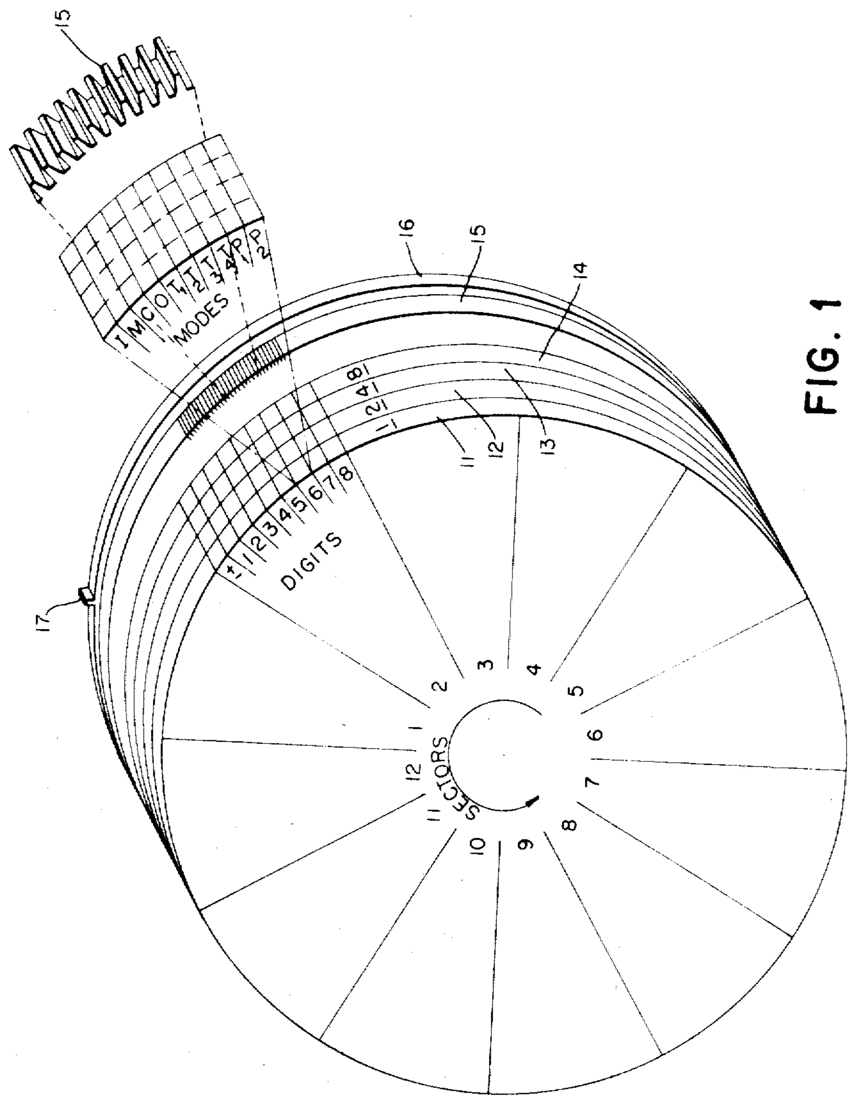
FIG. 1 illustrates schematically a magnetic storage drum and associated synchronizing signal generator structure of a form suitable for use in a particular embodiment of the present invention.
Figures 2, 4:
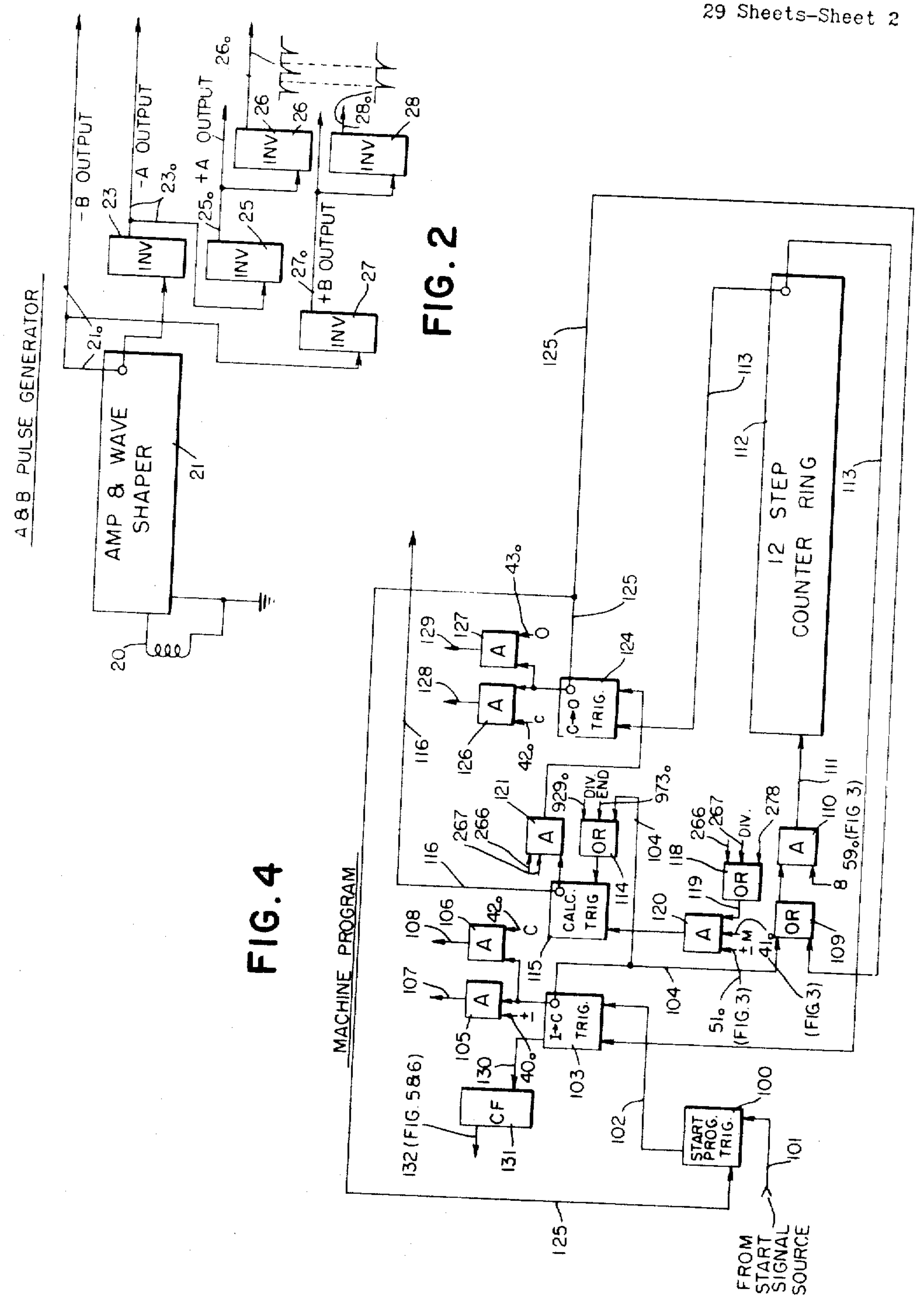
FIG. 2 represents an electrical synchronizing signal generator suitable for use in a calculating machine embodying the present invention.
Figure 3A:
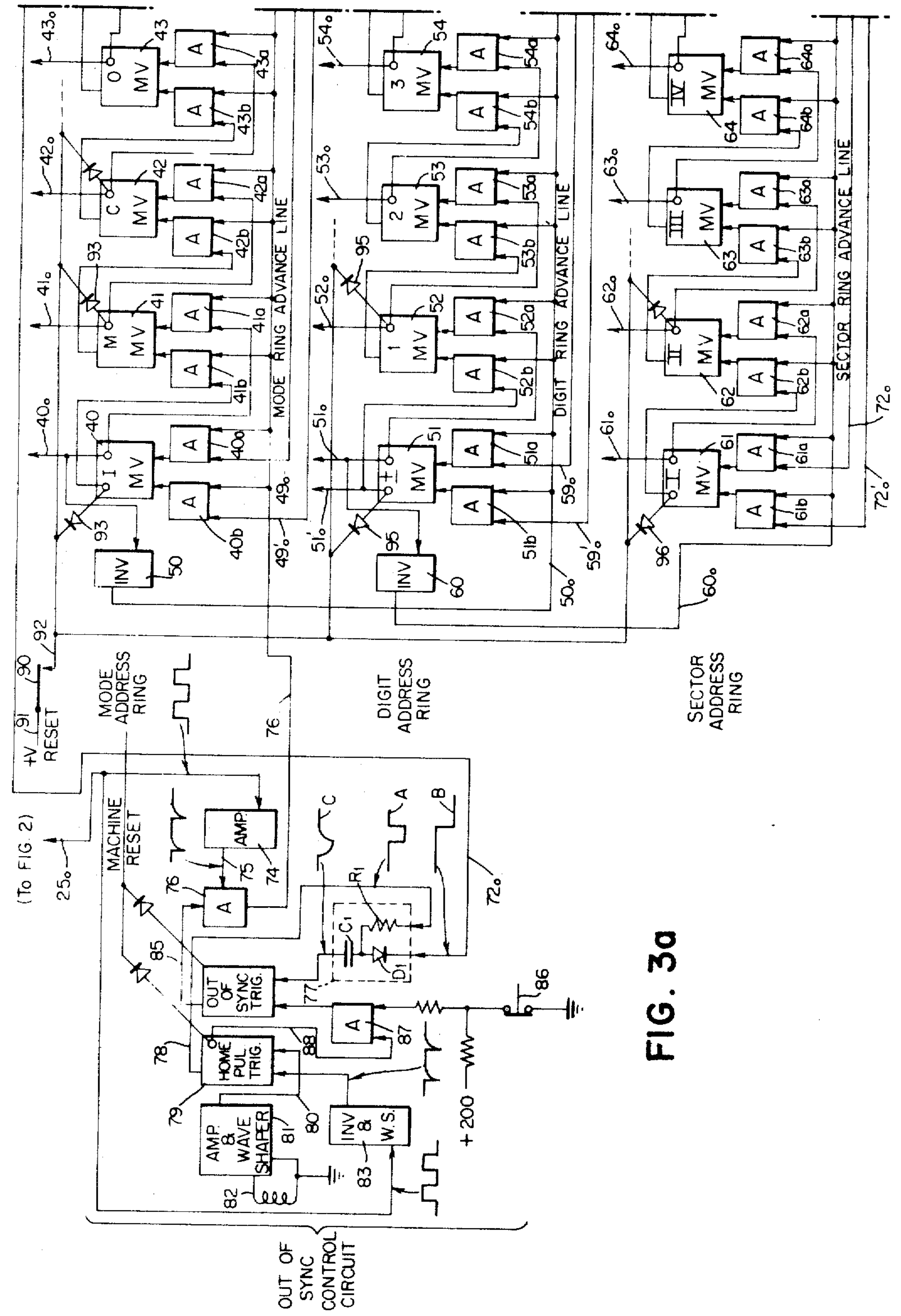
Figure 3B:
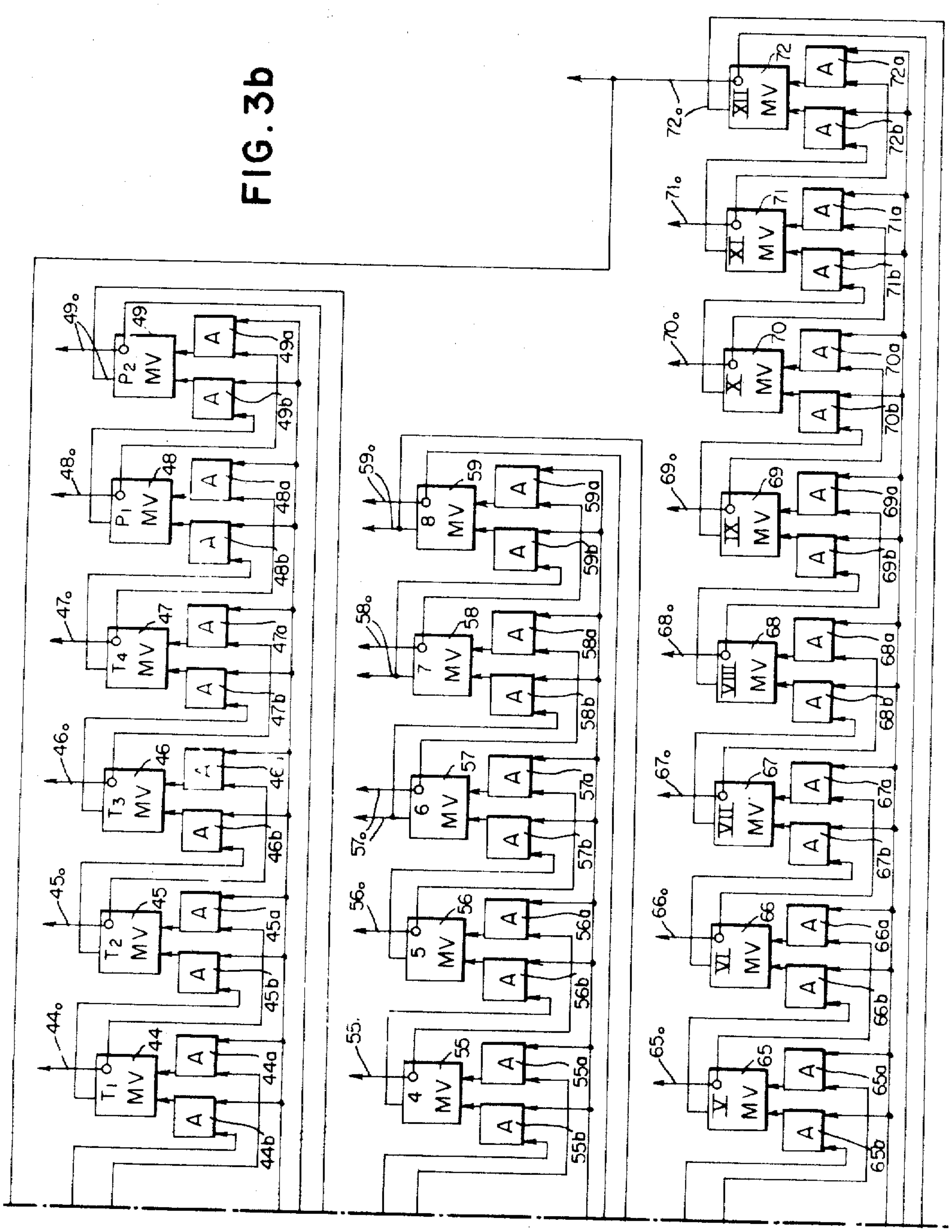
Figures 5A, 7:
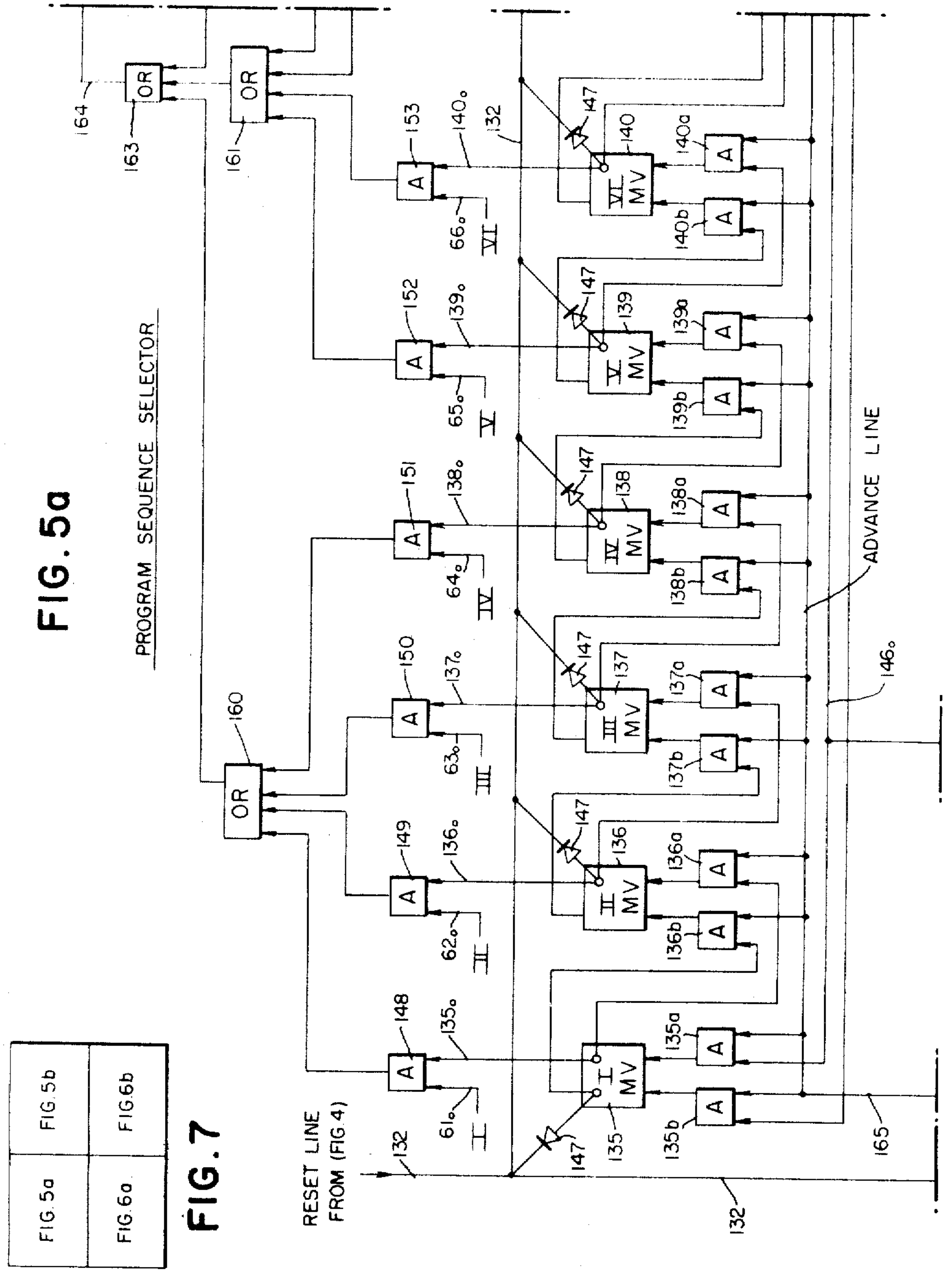
Figure 5B:
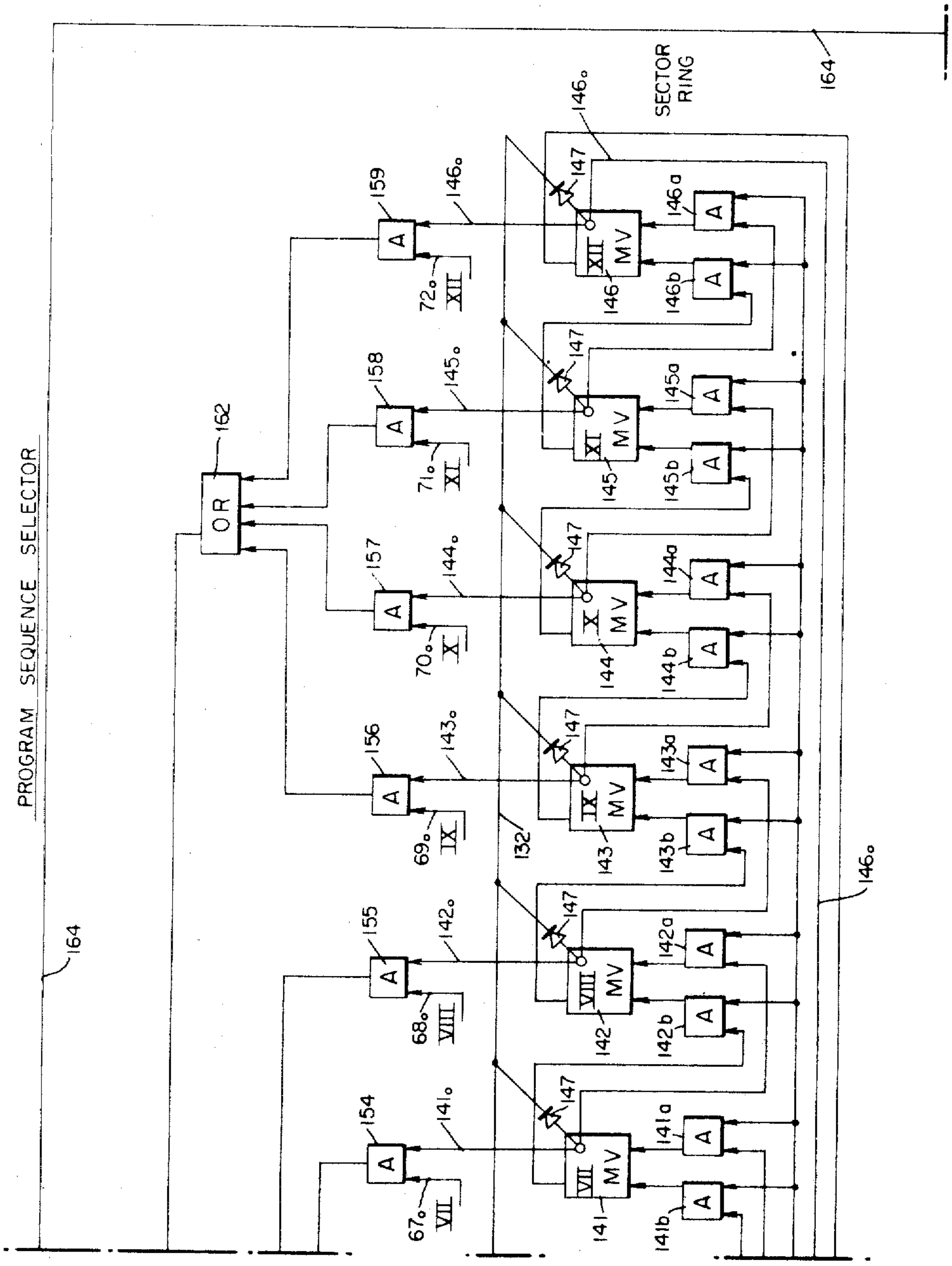
Figure 6A:
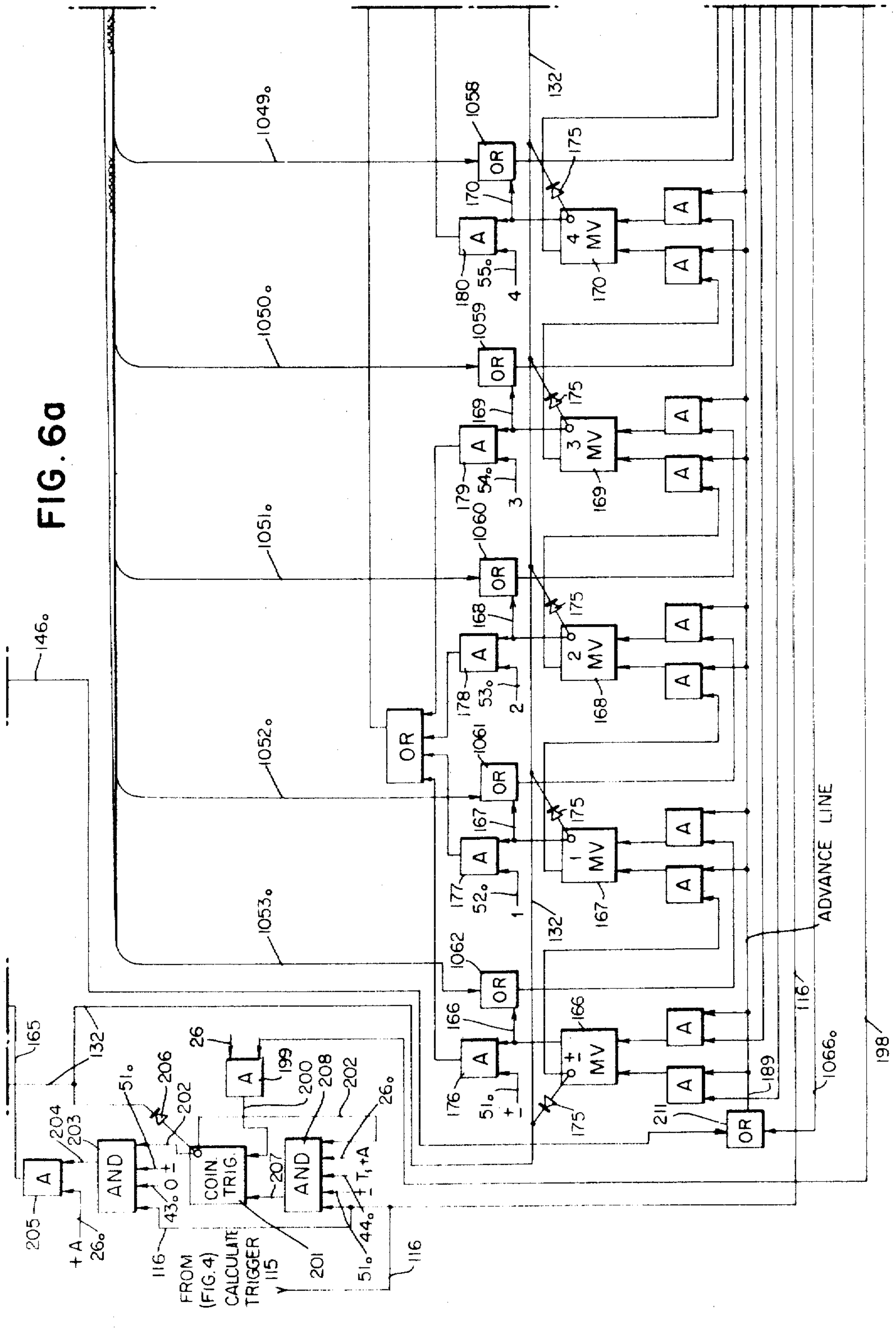
Figure 6B:
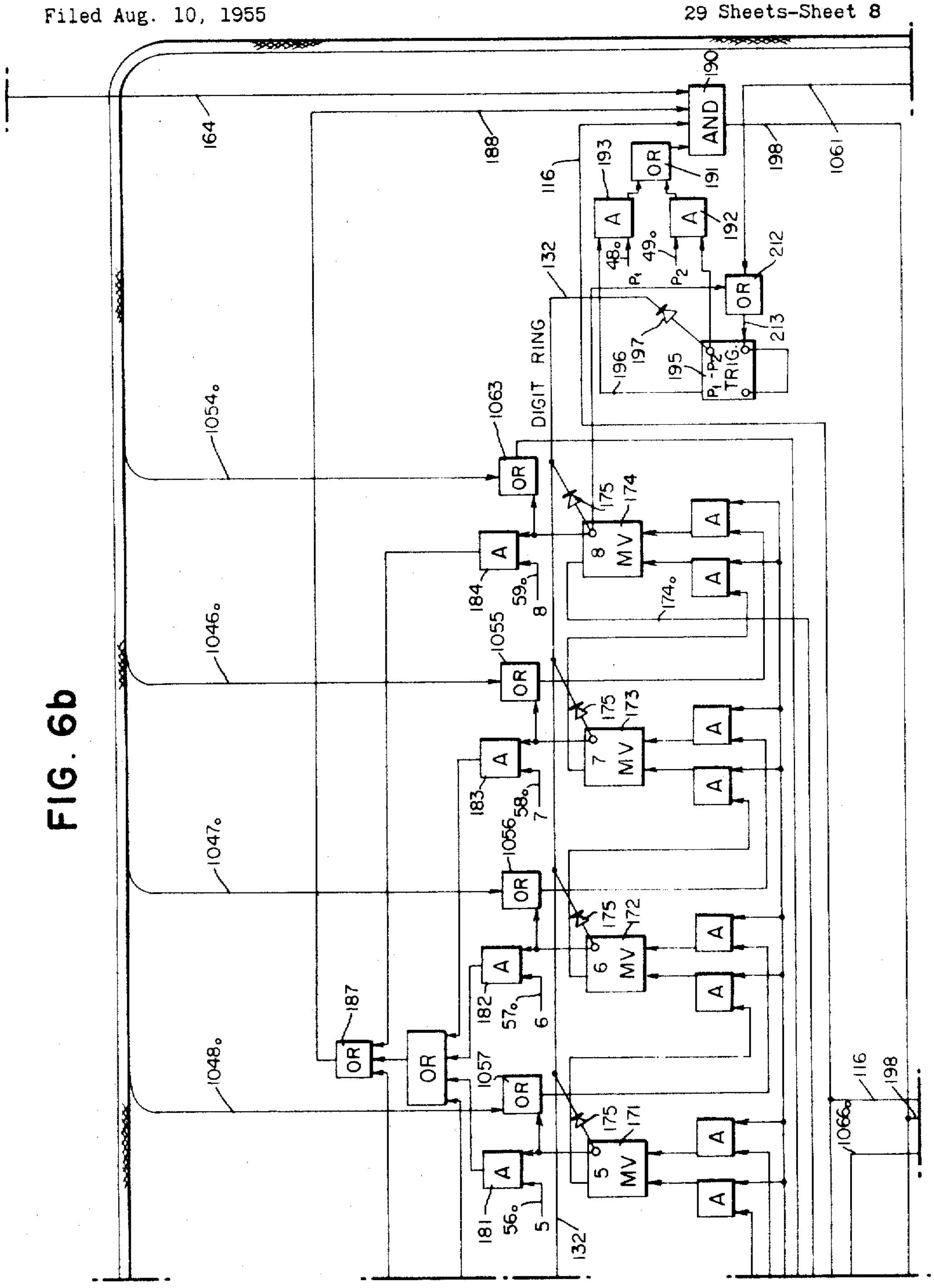
Figures 8, 9:
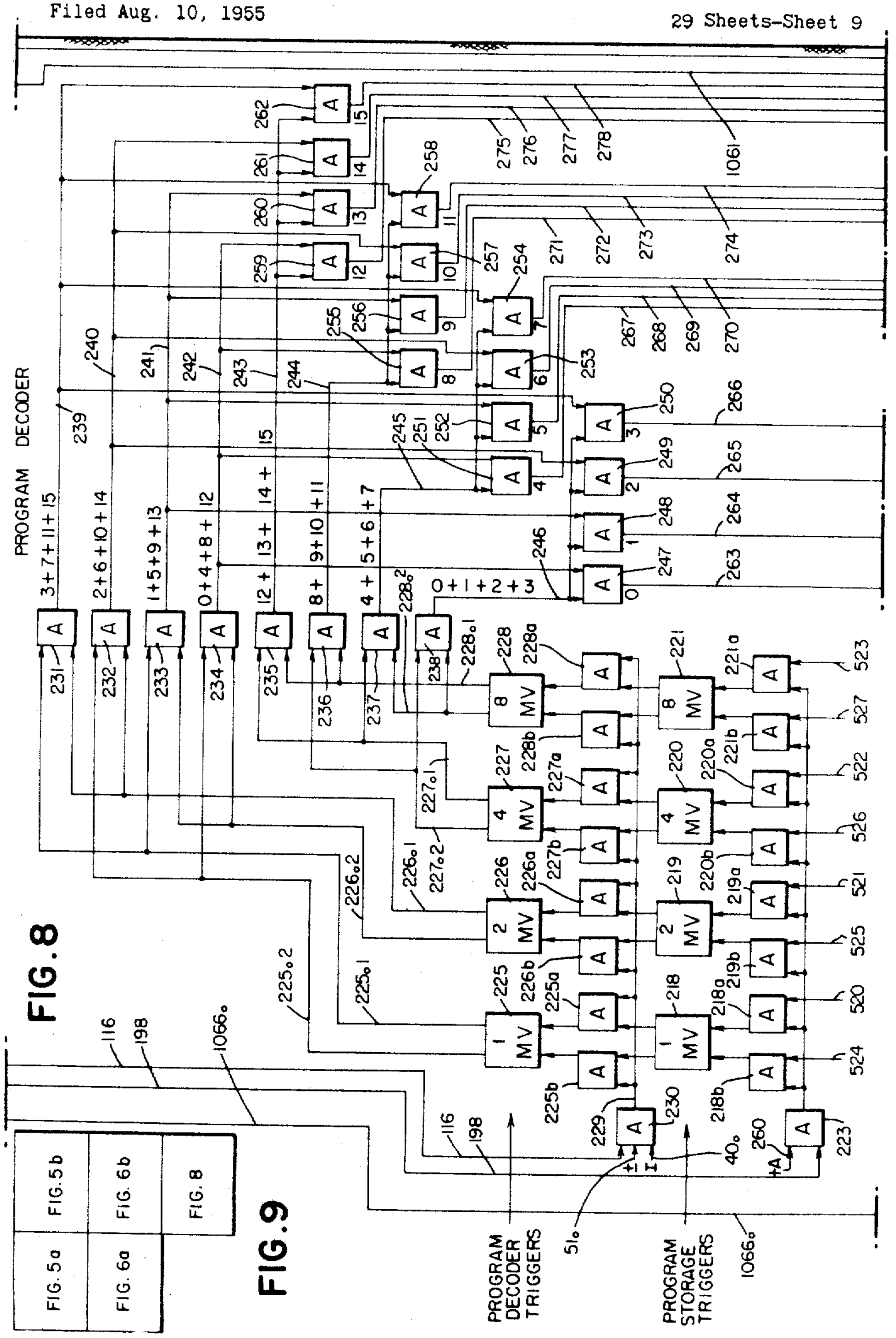
Figure 10:
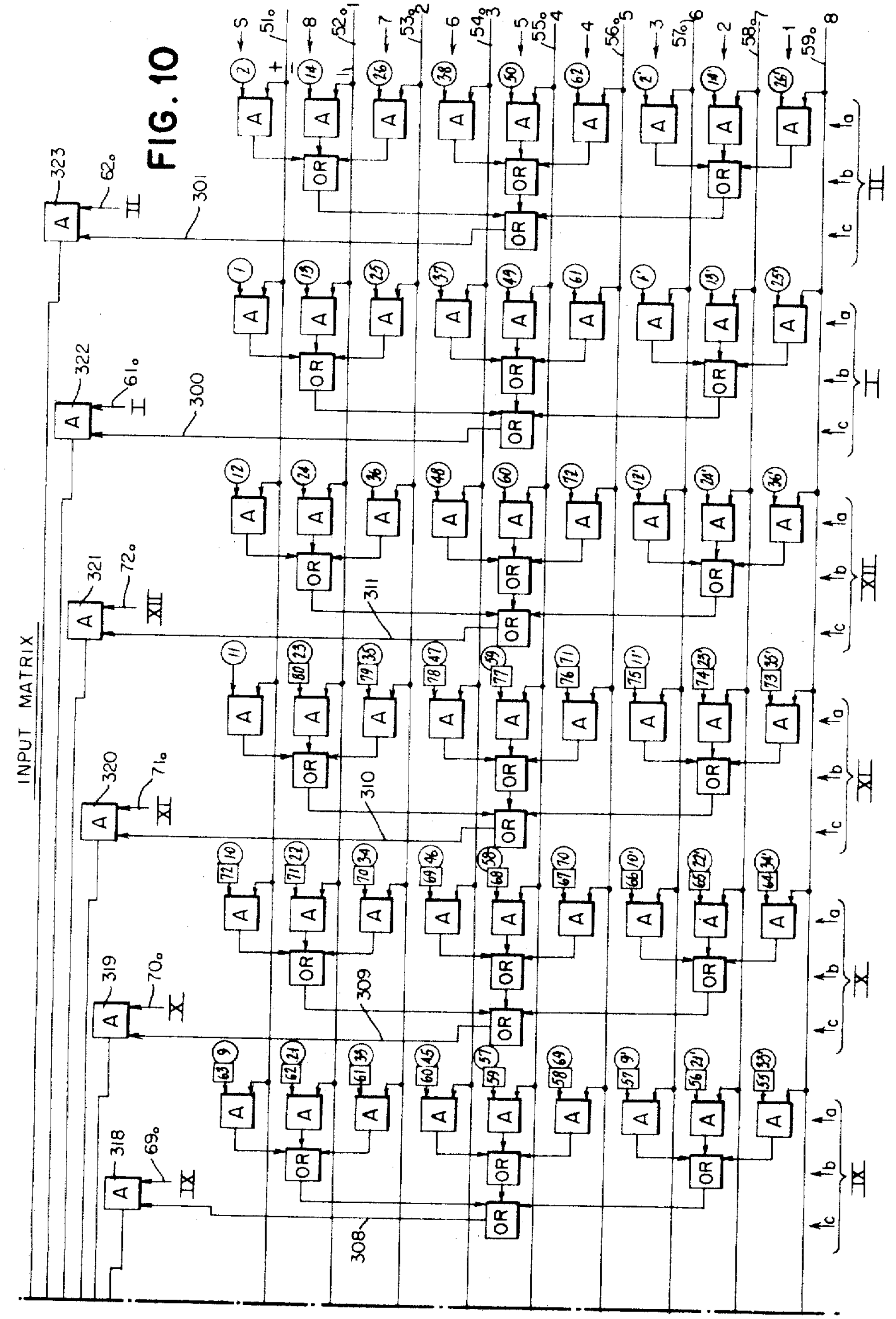
Figure 11:
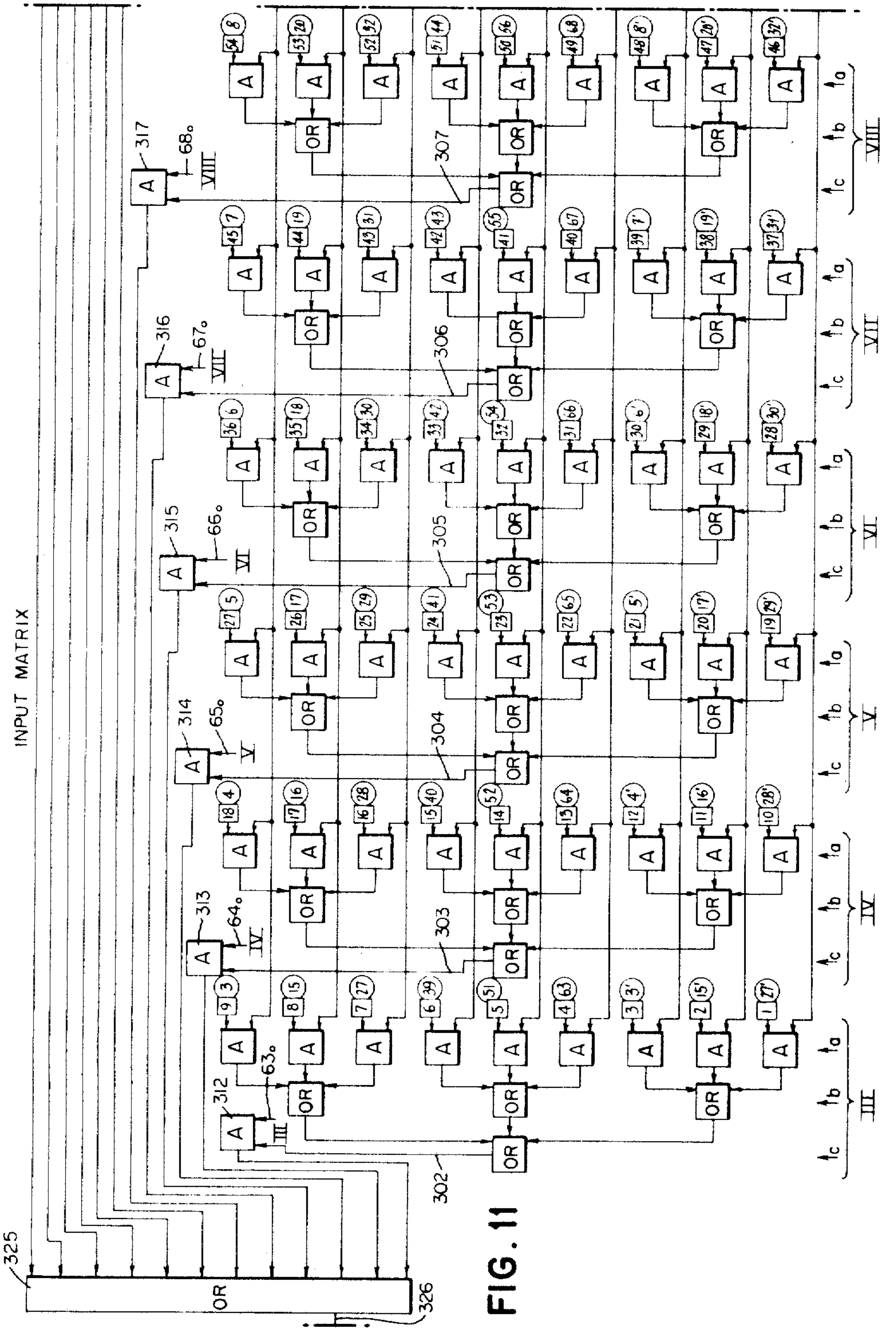
Figures 12, 13:
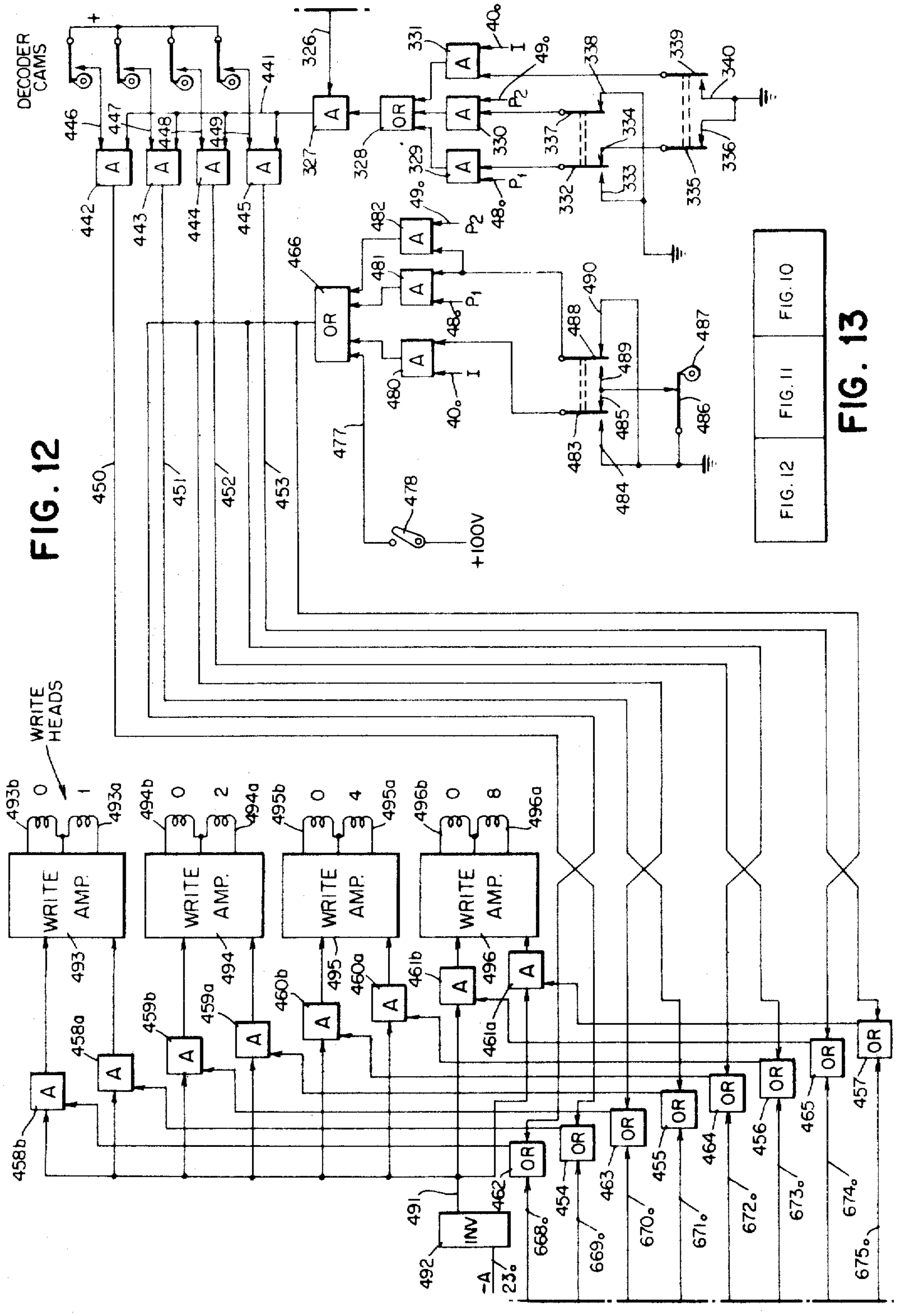
Figure 14:
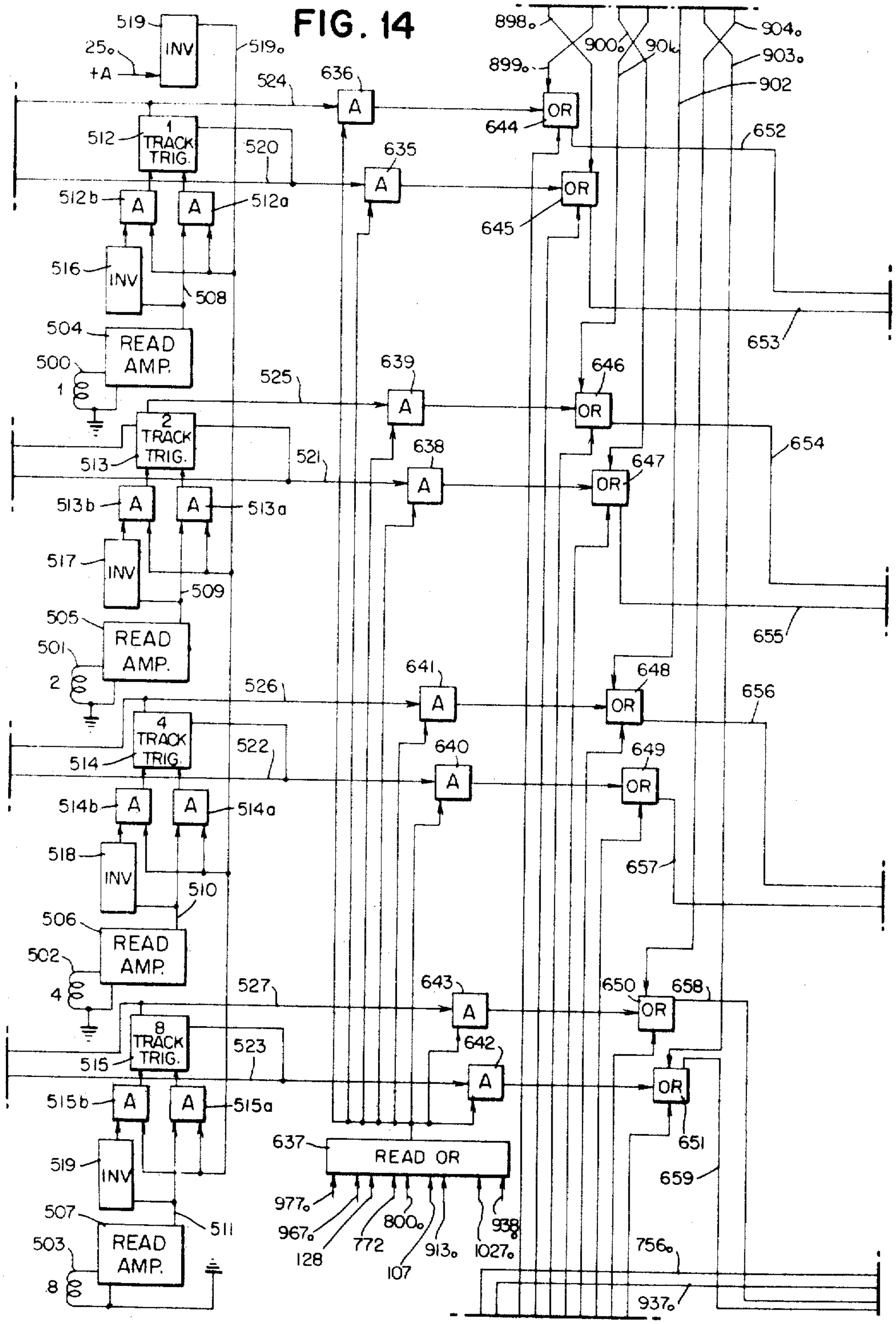
Figures 15, 16:
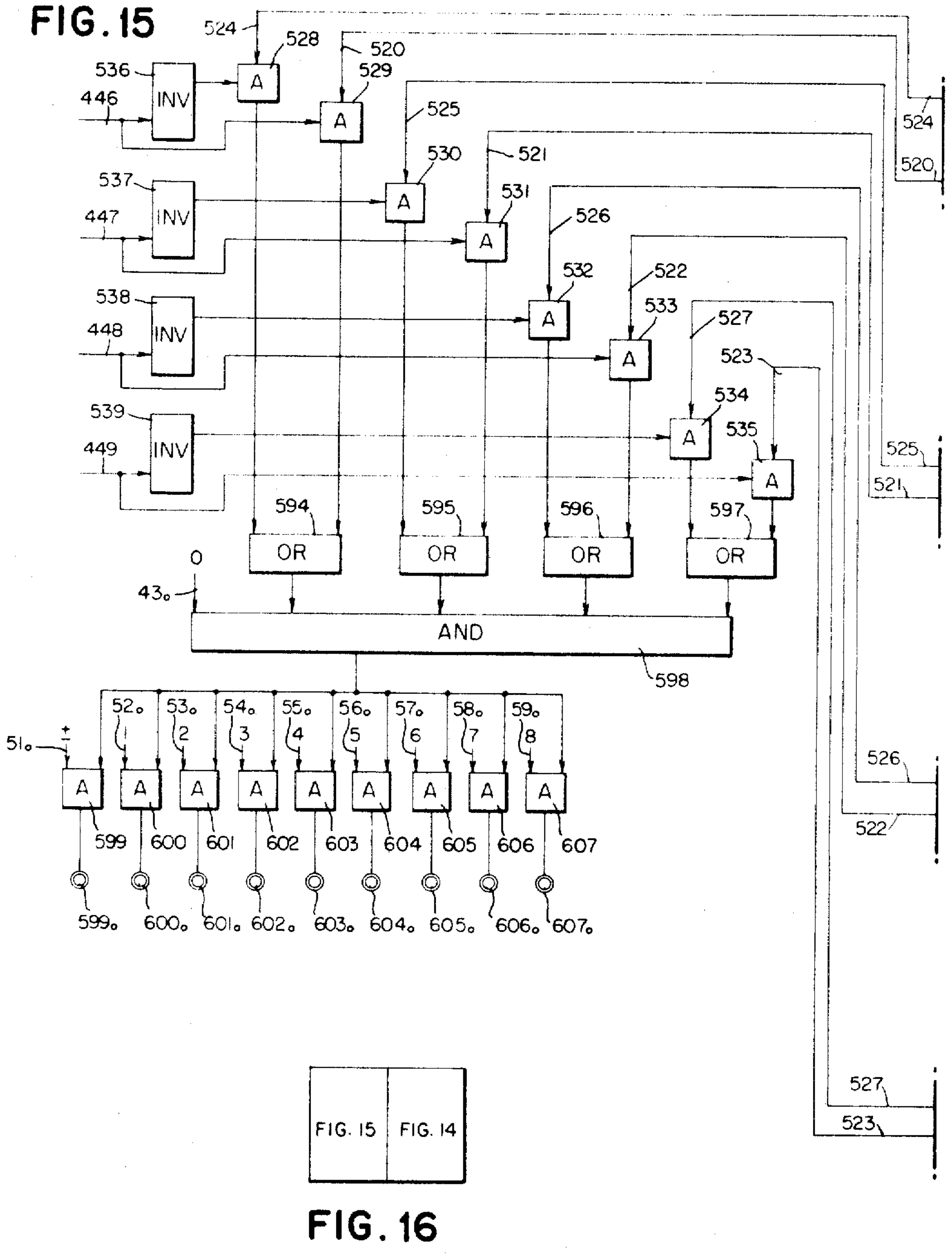
Figures 1, 16:
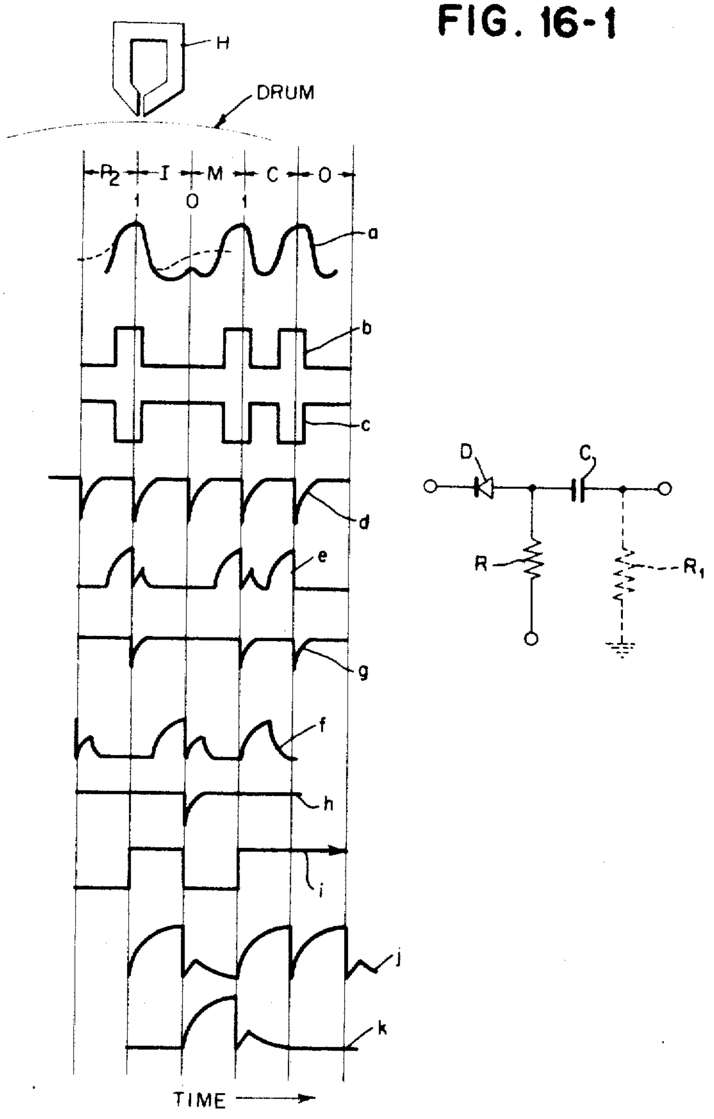
Figure 17:
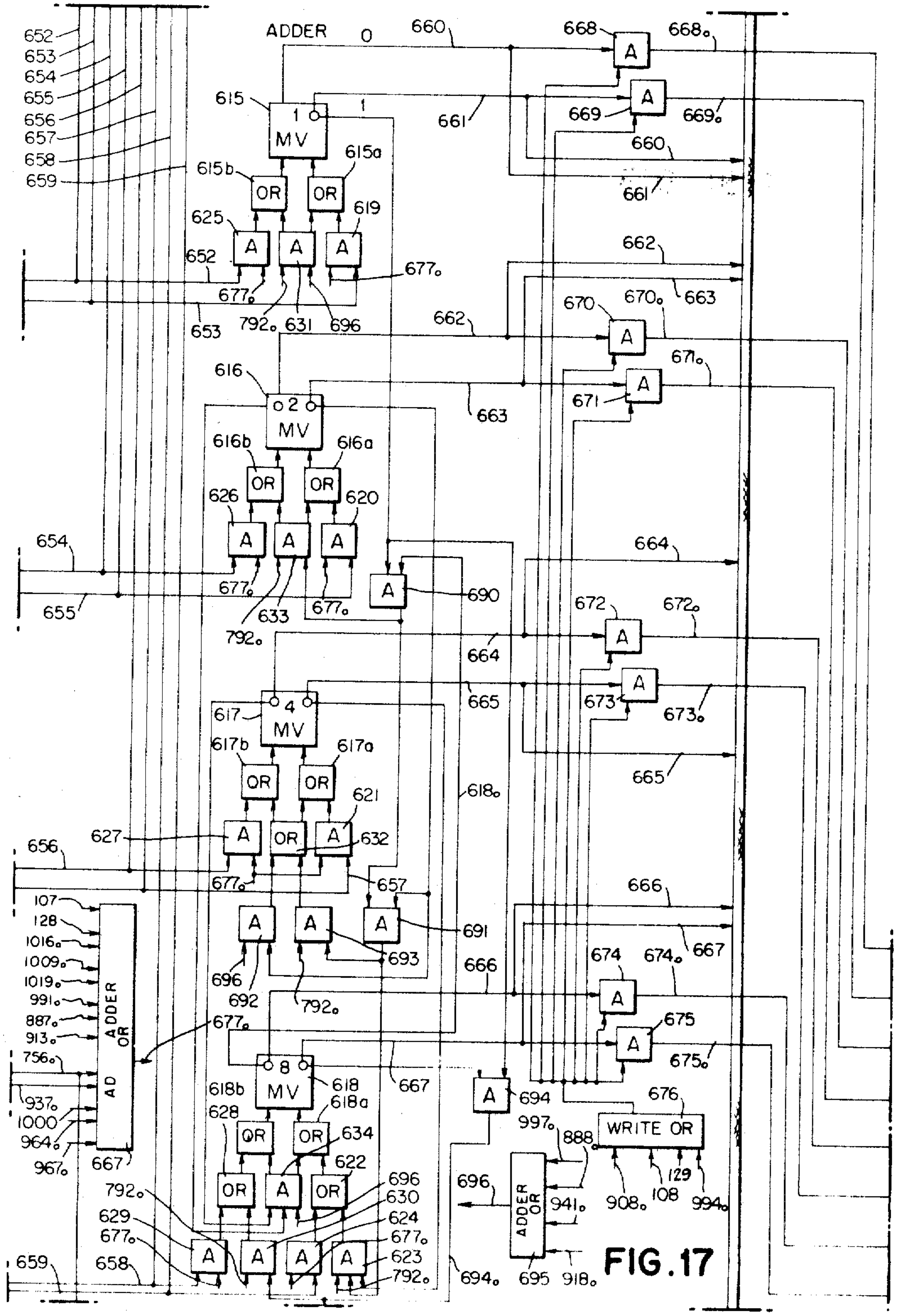
Figure 18:
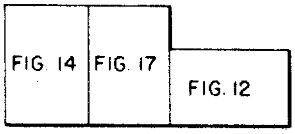
Figures 1, 18:
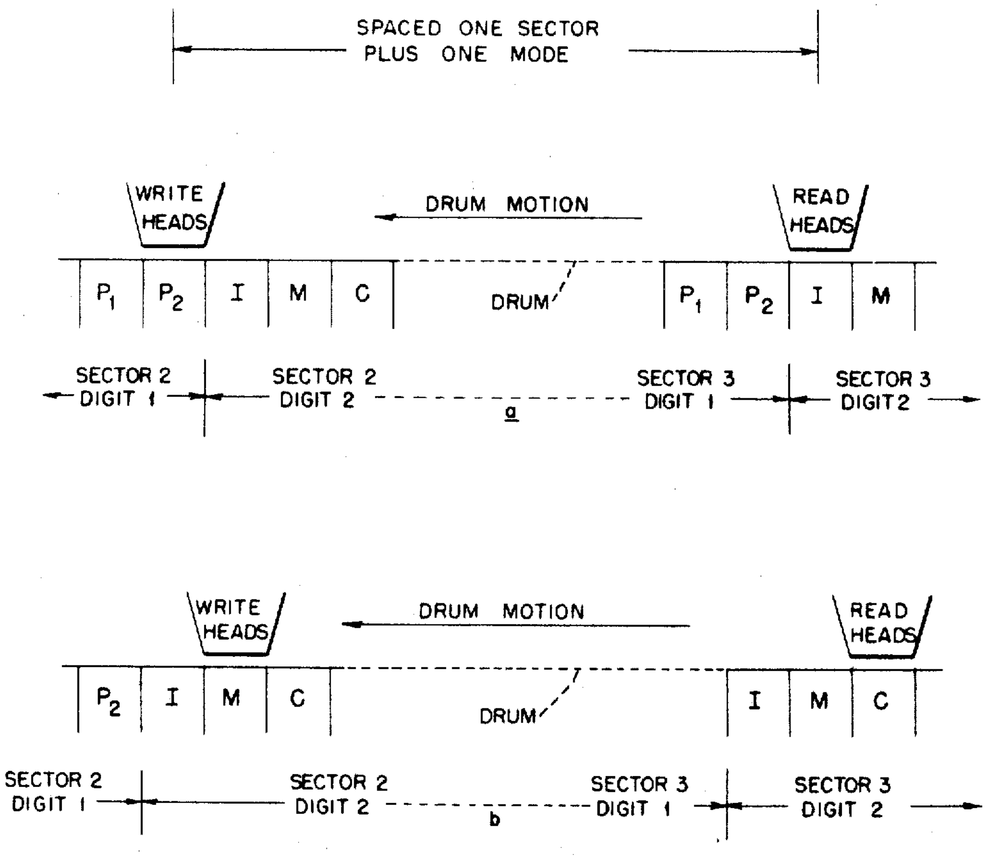
Figure 19:
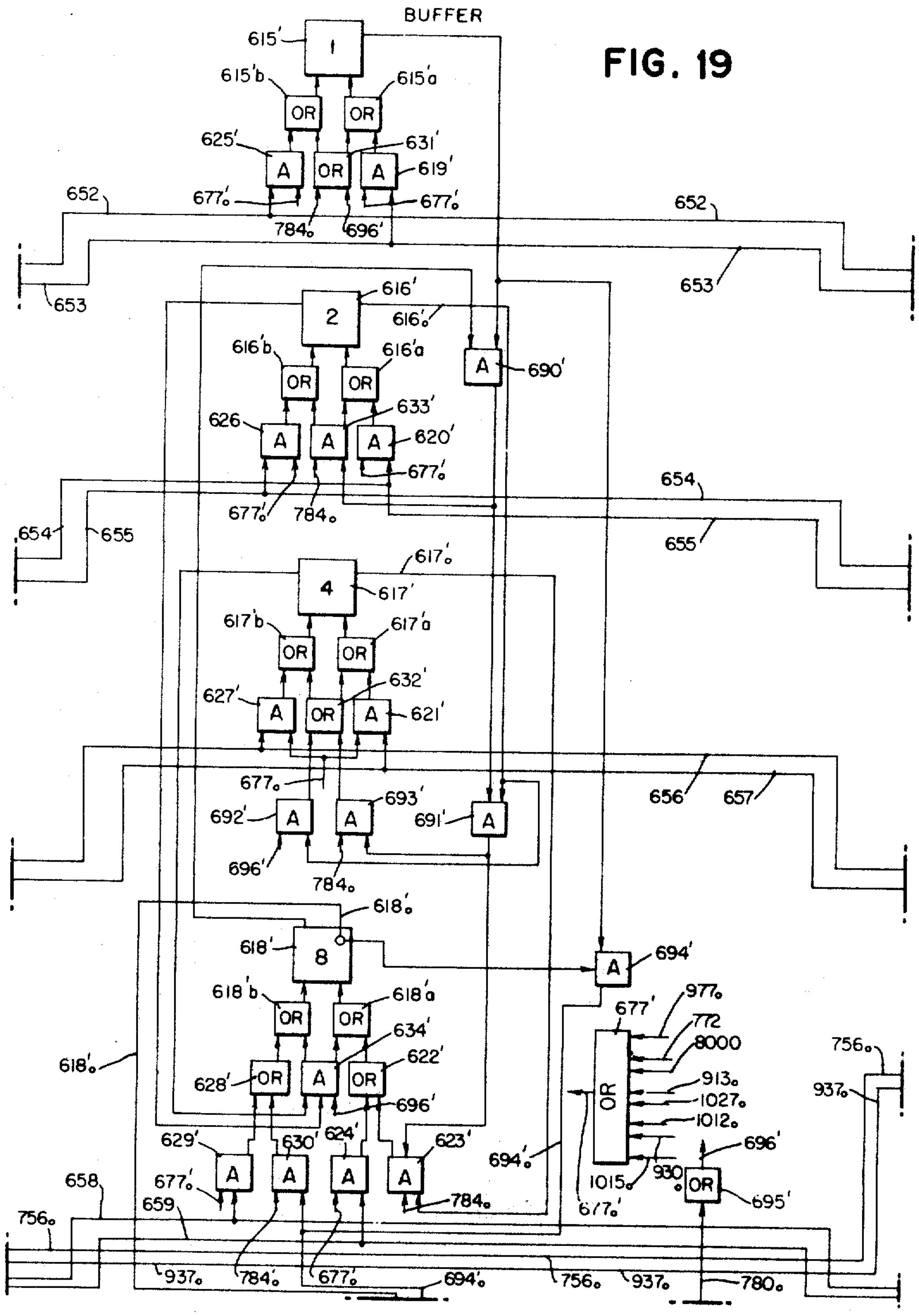
Figure 20:
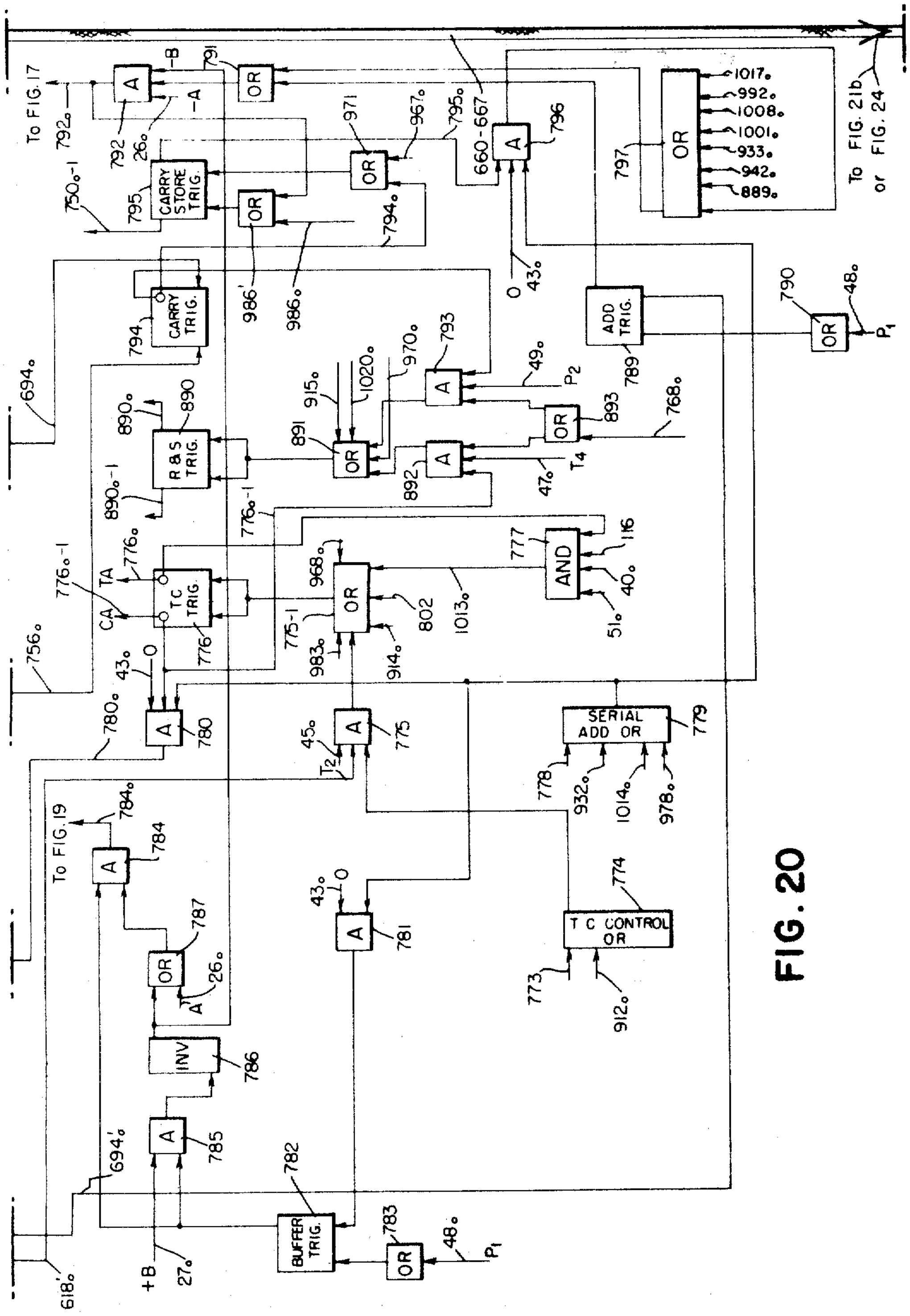
Figure 21A:
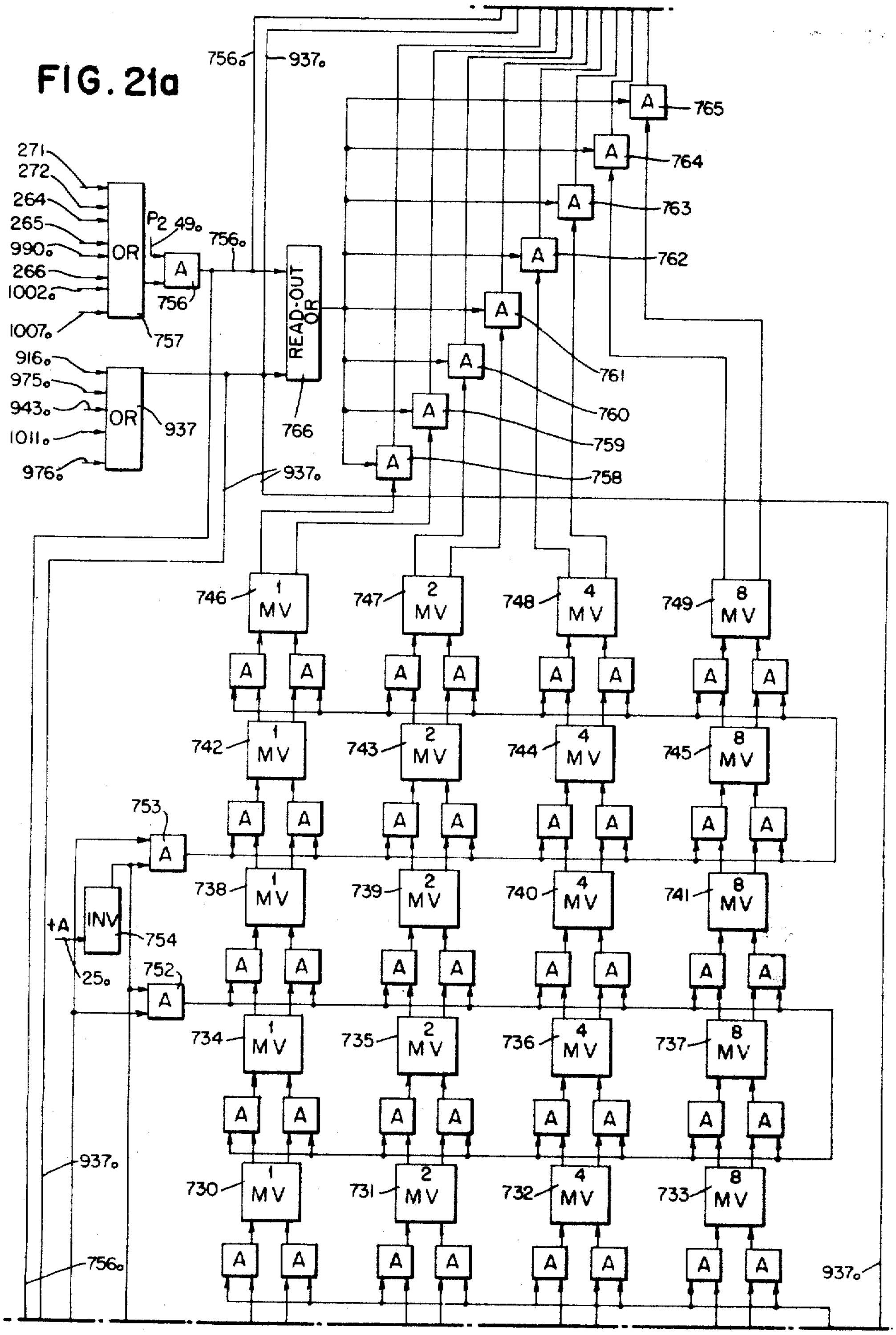
Figure 21B:
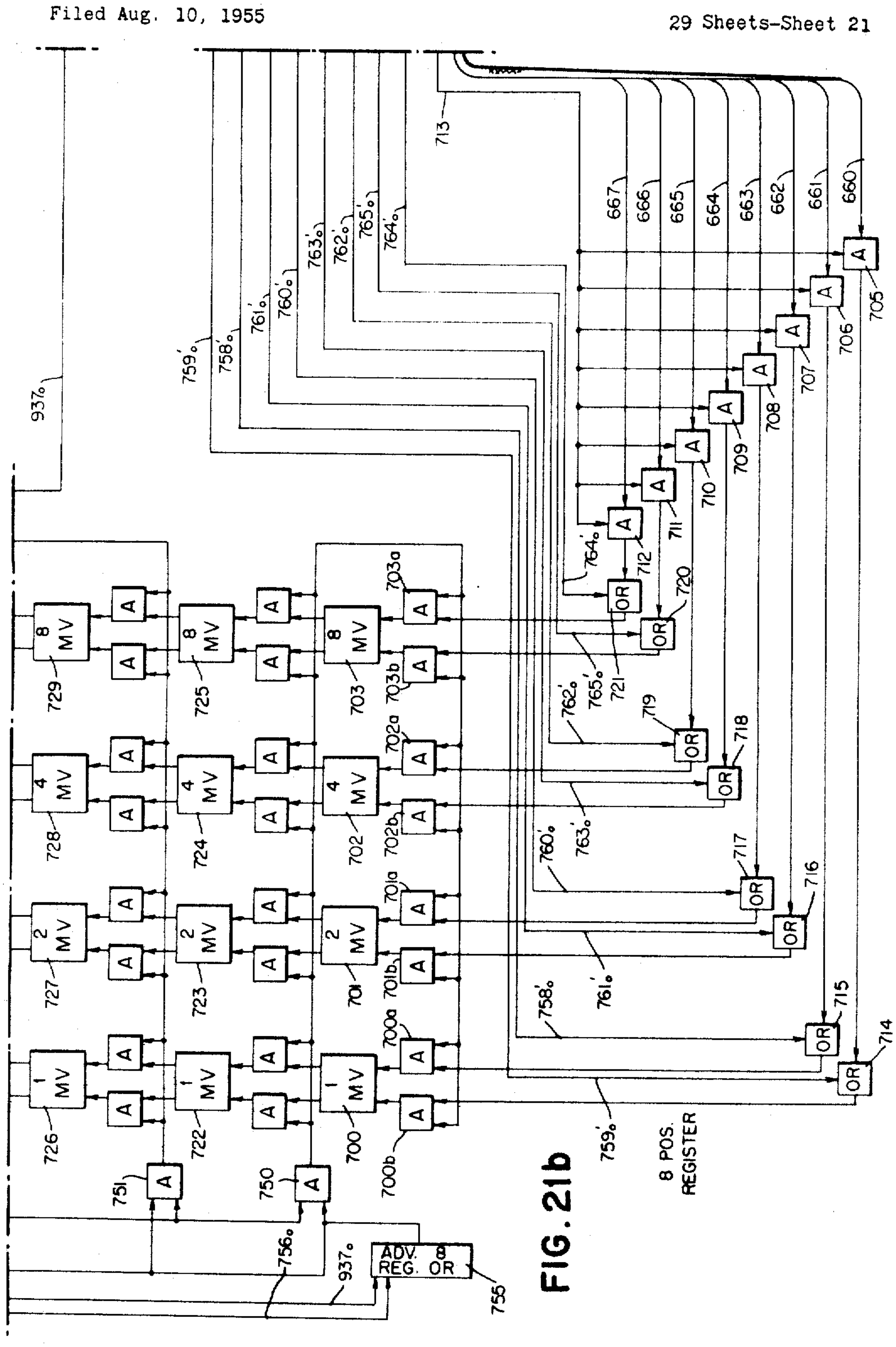
Figures 22A, 22B:
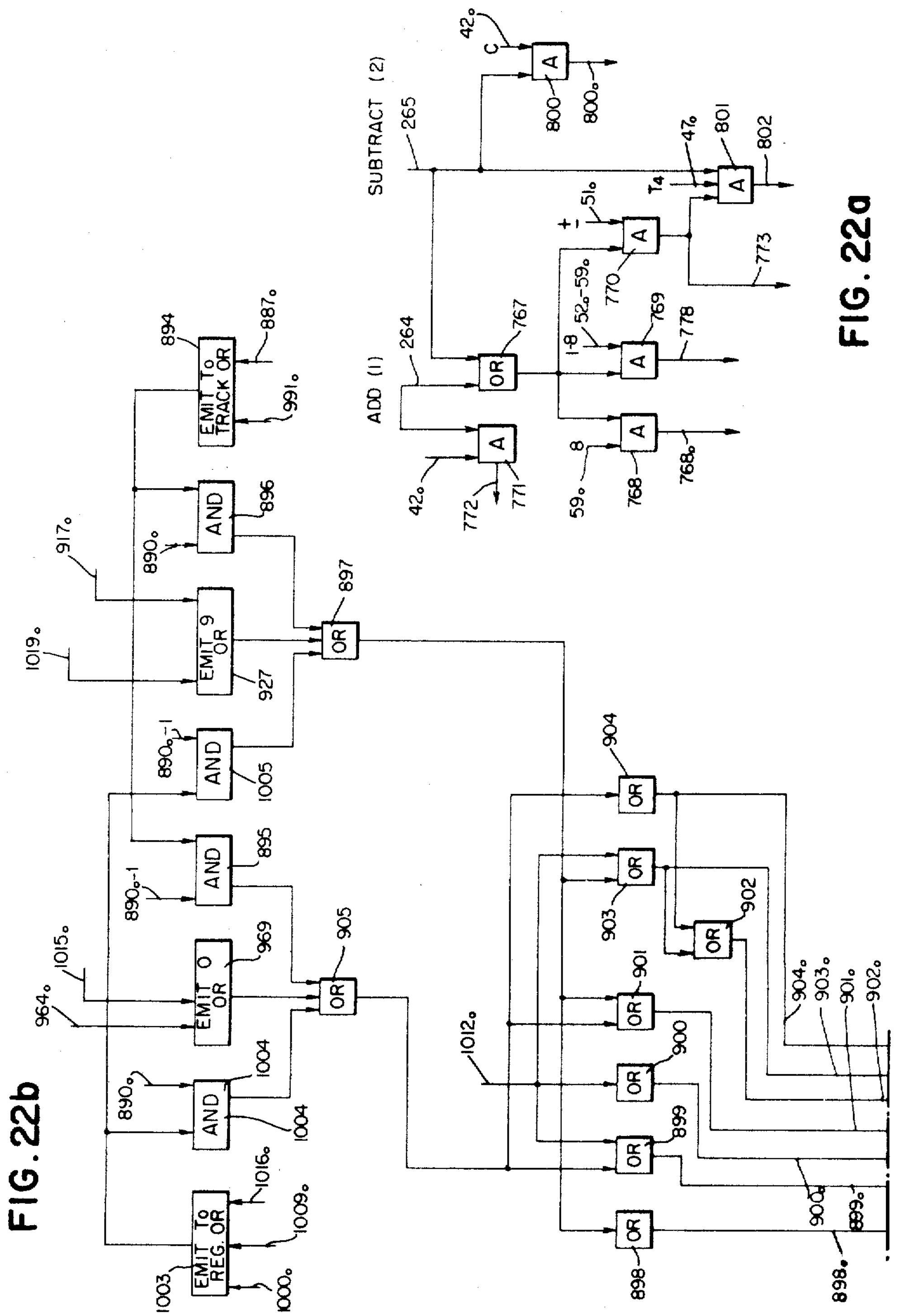
Figures 22C, 22D, 22E, 22F, 22G:
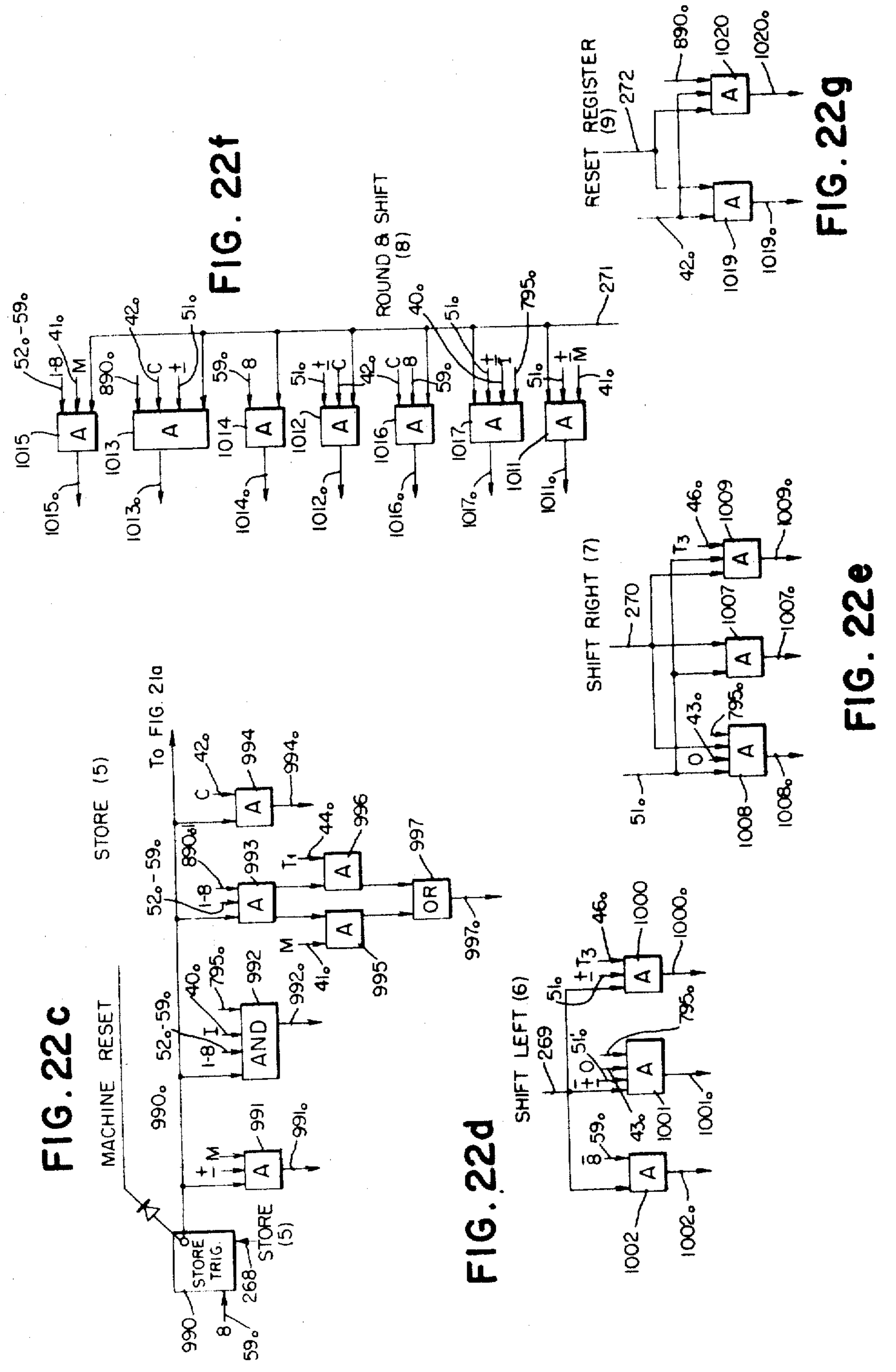
Figure 23:
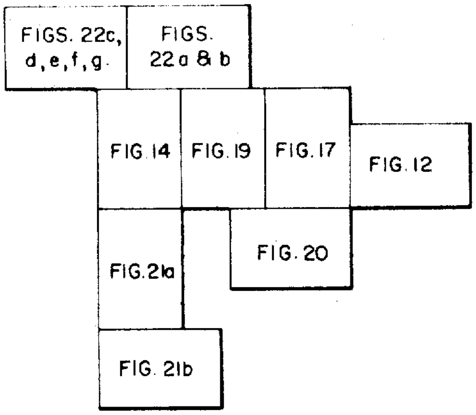
Figure 29:
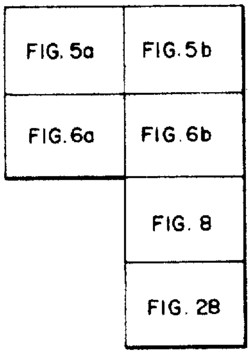
Figure 27:
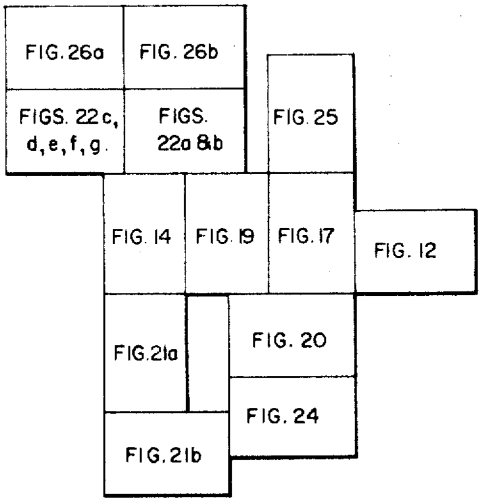
Figure 24:
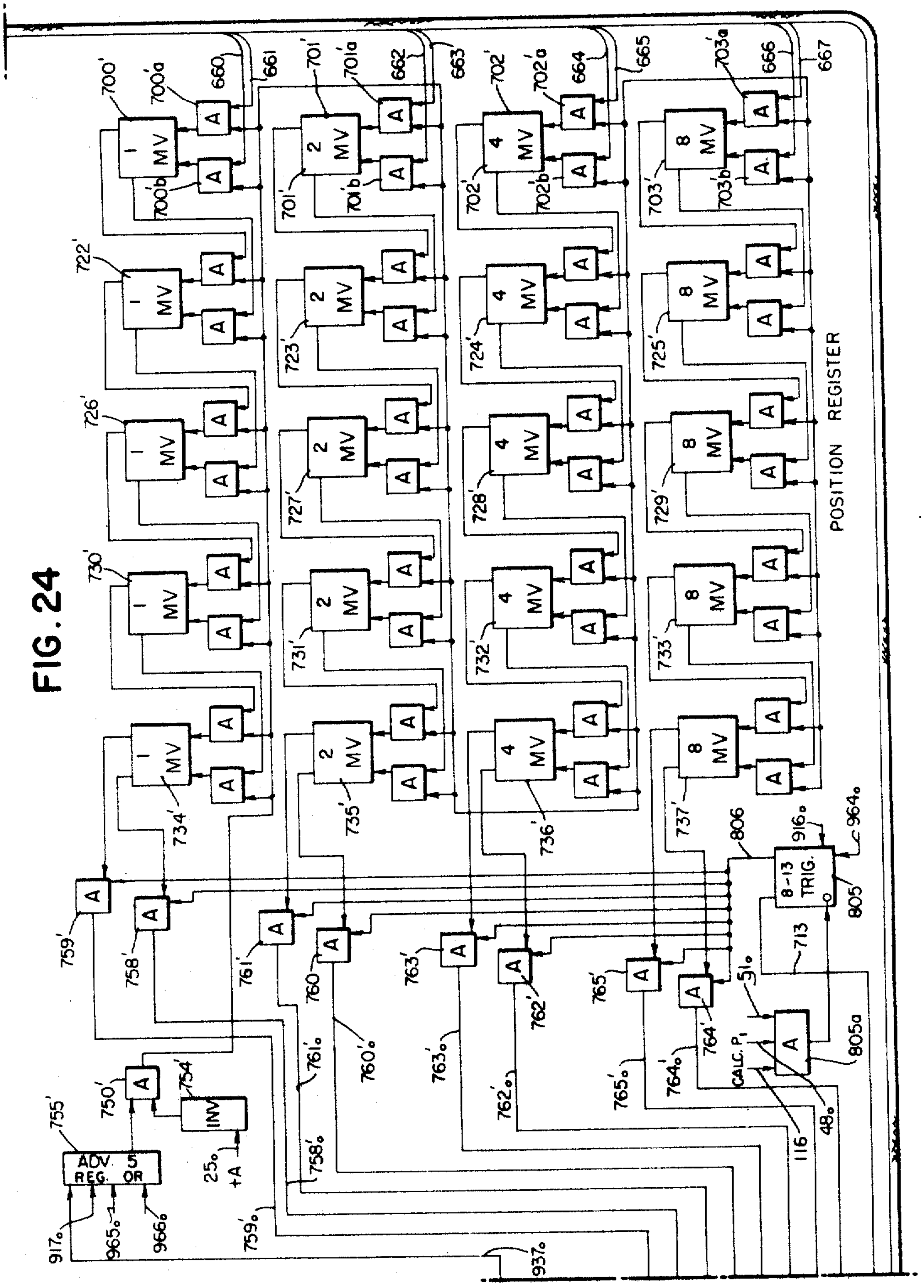
Figure 25:
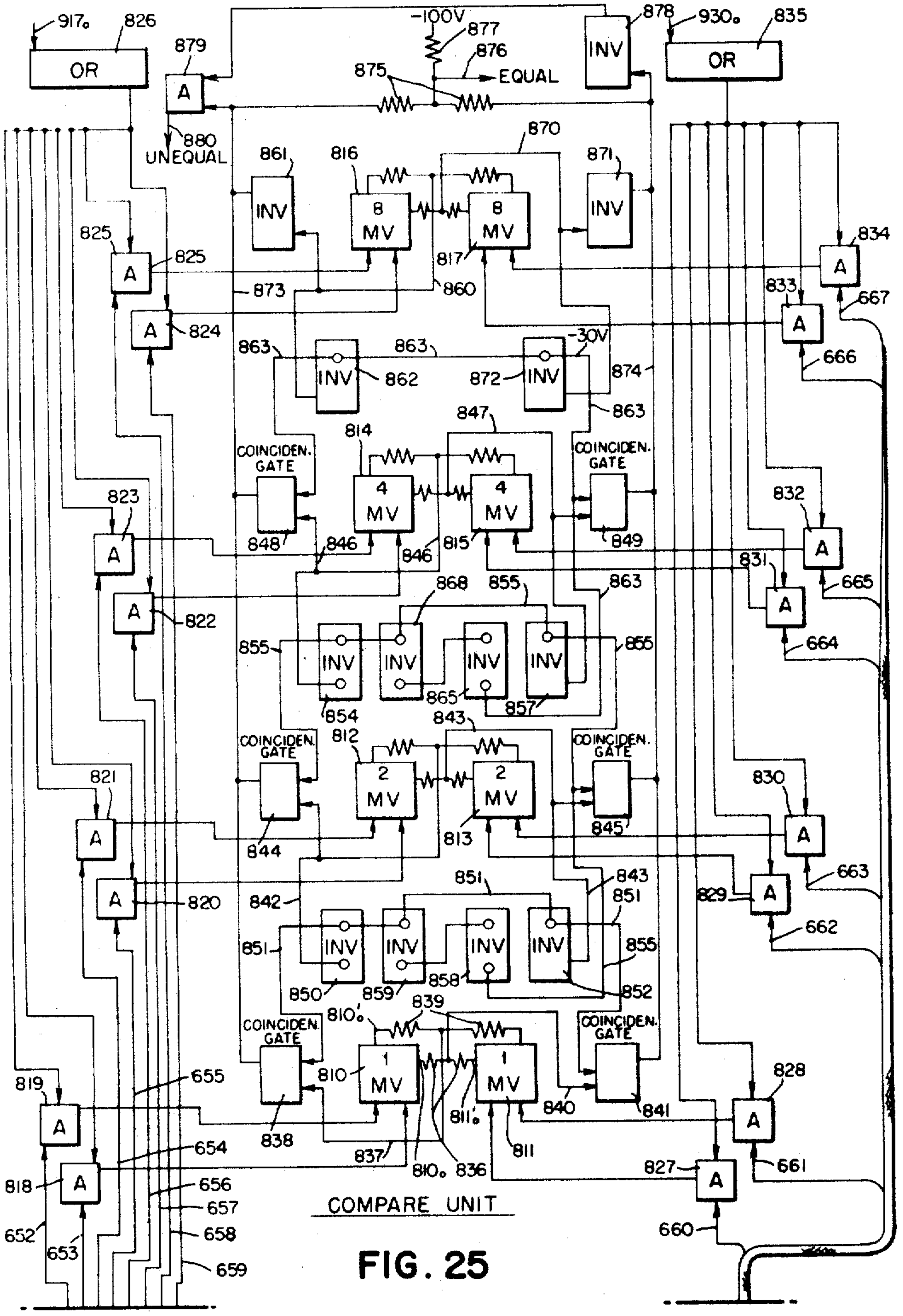
Figure 26A:
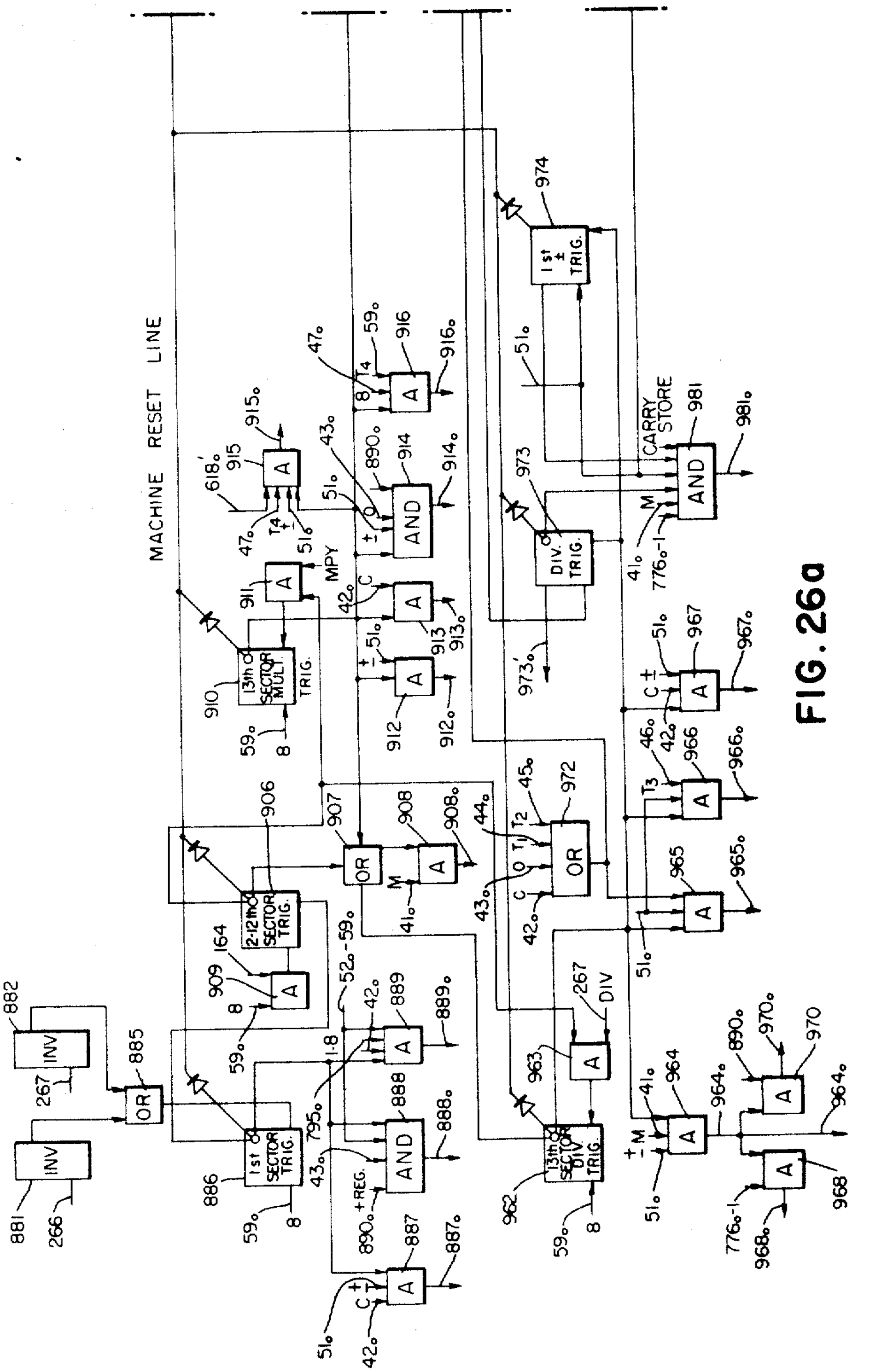
Figure 26B:
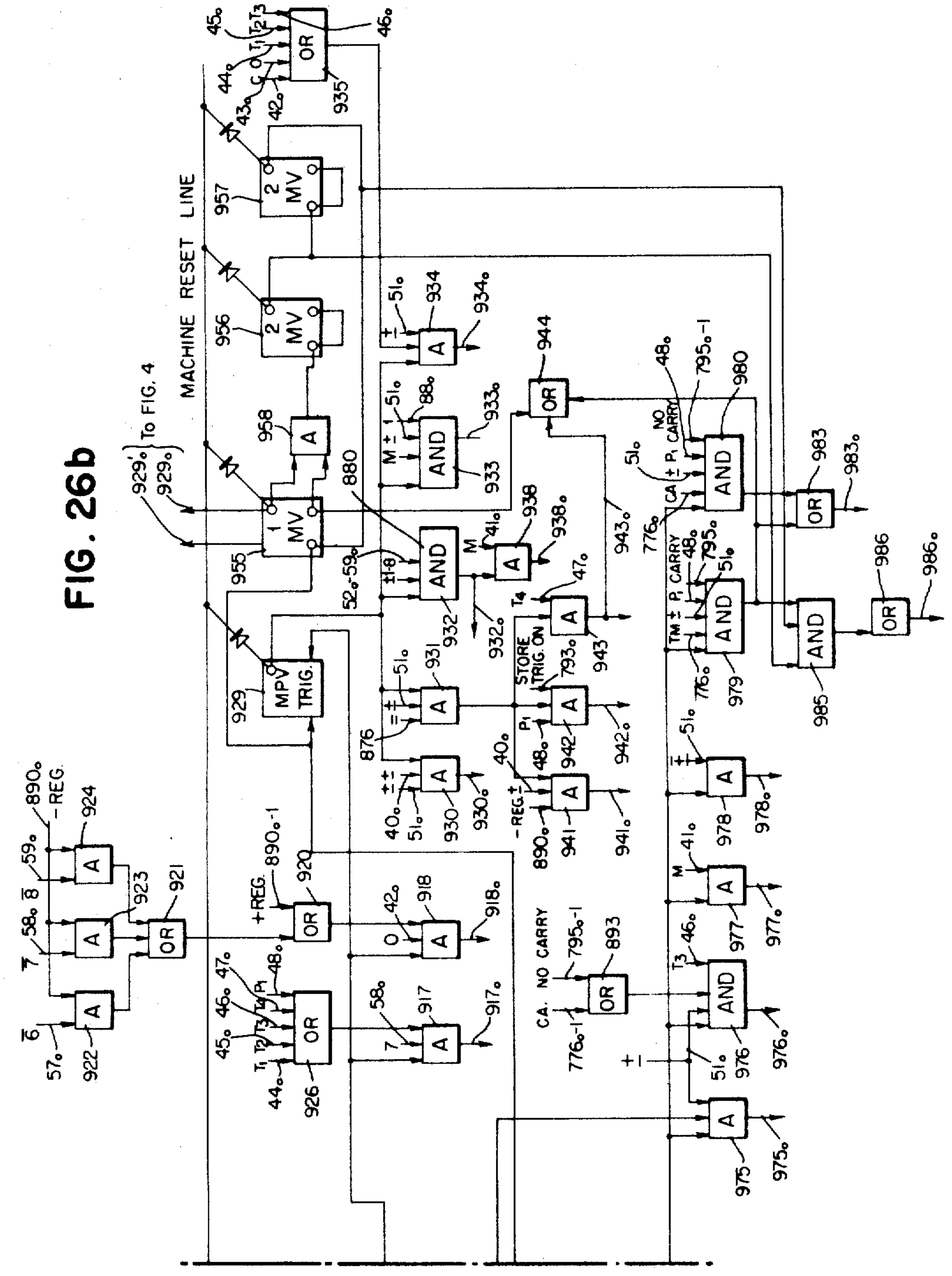
Figure 28:
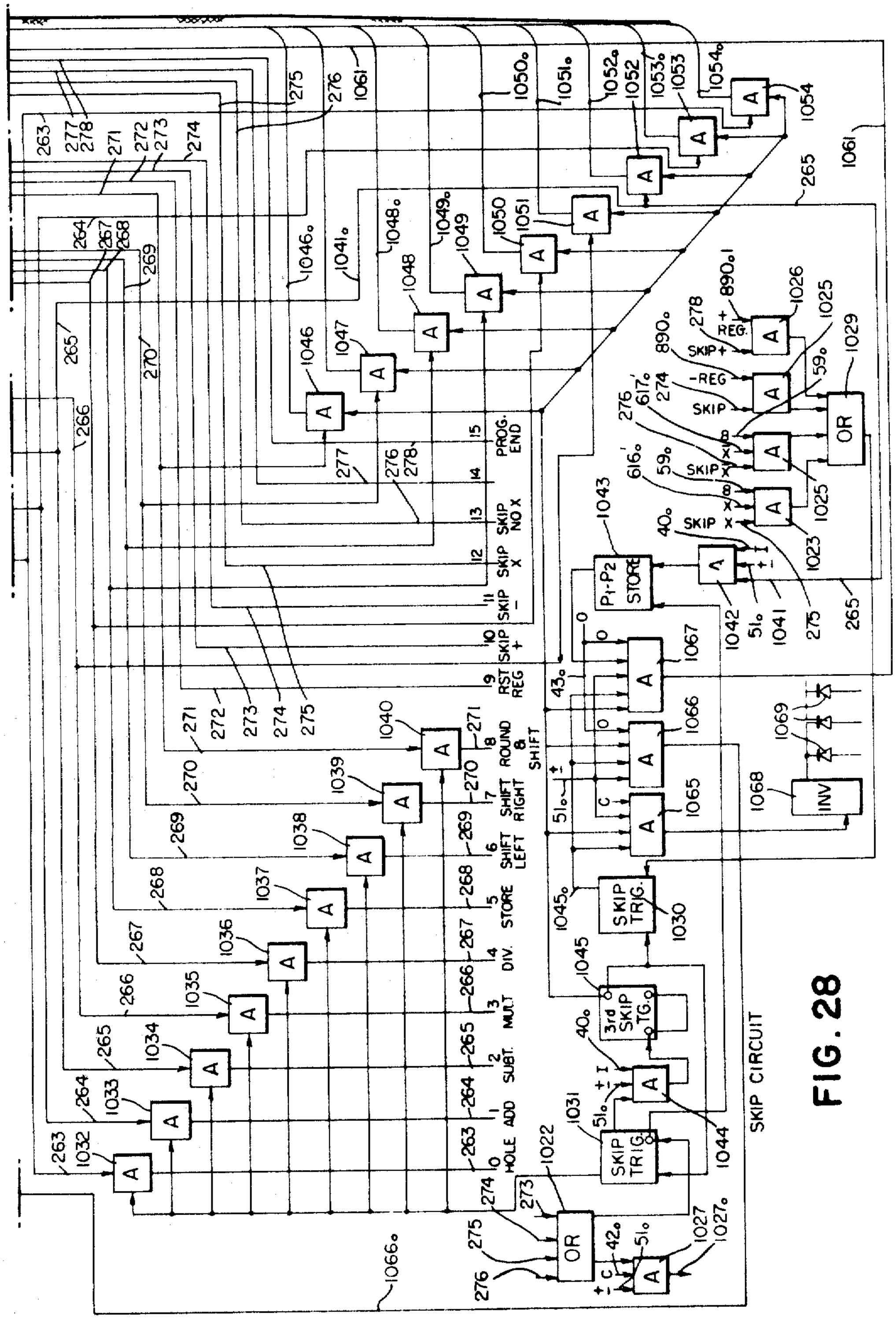

FIGS. 3*a*–3*b* represent schematically an address-ring generator employed in an illustrative embodiment of the invention;

FIG. 4 represents a machine program unit employed in the calculating machine herein described;

FIGS. 5*a*–5*b* and 6*a*–6*b* represent the schematic arrangement of a PROGRAM SEQUENCE SELECTOR, and FIG. 7 the manner in which these figures should be arranged for consideration as a unit, employed in the calculating machine described herein;

FIG. 8 schematically represents the arrangement of a PROGRAM DECODER, and FIG. 9 shows the manner in which FIGS. 5*a*–5*b*, 6*a*–6*b* and 8 should be considered together as a unitary structure, employed in the described calculating machine;

FIGS. 10, 11 and 12 show schematically the INPUT MATRIX and write-out amplifier arrangement of the calculating machine, and FIG. 13 the manner in which these figures should be considered together;

FIGS. 14 and 15 represent a read-out system and OUTPUT MATRIX suitable for use in the present invention, FIG. 16 showing the manner in which FIGS. 14 and 15 should be considered together, and FIG. 16–1 graphically represents certain voltage wave forms appearing at selected points in this MATRIX and is used as an aid in explaining the MATRIX operations;

FIG. 17 schematically represents an ADDER unit, FIG. 18 the manner in which FIGS. 12, 14 and 17 should be considered together to effect transfer of information from storage in one mode of the storage medium to storage in another mode thereof, and FIG. 18–1 certain storage position relationships with respect to read-out and write-in magnetic heads employed in the present arrangement;

FIG. 19 represents the arrangement of a buffer unit, FIG. 20 that of a control system, FIGS. 21*a*–21*b* represent schematically the arrangement of an 8-position register, FIGS. 22*a*–22*g* the arrangement of an additional control system, and FIG. 23 shows the manner in which these latter figures should be considered in combination by which to provide a machine suitable for performing arithmetic addition and subtraction processes;

FIG. 24 schematically represents the arrangement of a 5-position register, FIG. 25 that of a compare unit, FIGS. 26*a*–26*b* that of an additional control system, and FIG. 27 the manner in which certain of the figures should be considered together as a unit by which to provide a calculating machine adapted to perform multiplication and division arithmetic operations; and FIG. 28 represents schematically a skip control circuit by which to program the calculating machine for certain skip operations, and FIG. 29 indicates the manner in which FIG. 28 should be considered with FIGS. 5*a*–5*b*, 6*a*–6*b* and 8 as an operative unit.

In order that the detailed description of the nature and operation of the invention may be more readily understood, it is believed that a brief preliminary statement of the general organization, without reference to details, of a representative calculator embodying the invention may be helpful.

GENERAL DESCRIPTION

The present invention has general utility in data processing machines and particularly those where the data processing involves arithmetic calculations. Many present day data processing machines employ standard tabulating cards which are punched or perforated to record the data to be processed and the results of the processing. The illustrative embodiment of the invention described herein is of this type, and comprises a calculating machine capable of performing the more usual mathematical calculations such as addition, subtraction, multiplication and division.

Present day tabulating cards conventionally include several hundred index-points arranged in plural rows of columns, one size of card widely used having at least 10 rows of 80 index-point columns used to record the numeric intelligence or data to be processed. Two additional rows of 80 index-point columns may also be provided for use in controlling one or more machine functions.

In the calculating machine to be described herein, two control-function rows of index-points are used for machine functional control purposes, and ten additional rows are used for both program control cards and for data cards. The program control cards automatically set up the calculating machine to perform a maximum of 218 successive program-controlled calculation operations, although it is to be understood that this number of program instructions is merely one used by way of example, and the scope of the invention is not so limited. Thus in the machine described, four standard tabulating cards are used for program instruction, and are actually used in pairs of which 72 index-point columns on a first card of the pair and 36 index-point columns on the other card of the pair provide a first group $P_1$ of program instructions totaling 109 in number. The second pair of program cards similarly provide a group $P_2$ of program instructions likewise totaling 109 in number, thus giving a total of 218 programs for the two pairs of program cards. Data furnished to the calculating machine for processing also uses standard tabulating cards, each data card being used to a capacity of 108 digits or characters, including the digit numerical sign, which may be processed by suitable programming either individually or in selectable groups.

Both the program and data cards are fed into a form of business machine having a card reading station followed by a card punching station. The program cards are first supplied to the machine and are read at the reading station automatically to establish a preselected number of sequences of data processing programs or instructions to be performed on data subsequently supplied to the machine by the data cards. The latter likewise are read at the reading station, and they move on toward the punching station where this card, or a blank card substituted for it in transit between the reading and punching station is punched to record the results of the programmed calculations. The latter are performed during the interval required for the data card to move between the reading and punching stations. During this transit interval, one or more succeeding data cards are also read at the reading station and the data information on them is stored ready for the initiation of programmed calculations as soon as the calculations are completed for the preceding card. Thus the data feed to the calculation machine from one card occurs during the calculation interval of a preceding card, and the results of calculation of an even earlier card are punched out during this same interval, thereby substantially to enhance the data processing capacity of the machine. If desired, the machine may be so arranged that the results of preceding data processing may be stored and subsequently used under program control in subsequent data processing operations.

In the calculating machine herein described, both the program instructions and the information data are handled as arabic numerals which are automatically transformed by the calculating machine to corresponding numerals of binary form for storage and processing. They are then automatically reconverted by the machine to arabic form to record at the punching station the results of the data processing. The inter-related data processing operations of the machine are entirely under self-synchronizing control, although data feed in and processing data feed out of the machine are under control of the associated business machine at the initiation of each programmed processing interval. Both programs and data are stored by the use of a magnetic drum storage medium in the machine herein described, thus enabling extreme flexibility in establishing and maintaining desired program instructions and in continuously processing data through the machine. This form of storage medium also facilitates, as will presently become apparent, extreme flexibility in changing program instructions since any such change merely requires that new program cards incorporating the desired changes be read into the machine. When this is done, all previous program instructions are automatically erased and the new program instructions stored. Thus an entire change of programming may be accomplished within the short interval required to feed the program cards through the reading station, an interval which in practice may be no longer than two and one-half seconds. In contrast, most calculating machines heretofore known require much longer intervals for manual substitution of control panels when changing from one data processing program to another. Further, the time required for an operator to punch new program cards is materially shorter than that required to rewire a program control panel.

In using magnetic drum storage for programming and data processing purposes, the program instructions are stored in physically fixed relation to the storage of data to which the program instruction applies, so that no addresses or other identification need be provided for either the program instruction or data by which subsequently to locate them in storage. As thus arranged, data and their programs are successively interleaved in the storage process. While the data digit storage constantly changes with changes of data fed into the machine from data cards, all data nevertheless are fed into storage in fixed, spatial relation to the unchanging program instructions applicable to each unit or digit of data processed. As earlier mentioned, new data to be processed are supplied into storage, while calculations are in process on data earlier placed in storage, and cumulative results of earlier processing of data may likewise be stored for selected intervals if desired. This cumulative data may be used from storage or transferred in storage under program control.

As will presently be explained in more detail, the peripheral surface of the drum storage unit used in the calculating machine herein described by way of example is divided into 12 sectors, each having 8 digit capacity together with the algebraic sign applicable to the digits of that sector. Each digit space of the drum, including the algebraic sign space, is again subdivided into a number of storage modes within which both the program instructions and the data (both intially and as resulting from processing) are stored in pre-established spatial relationship. In particular, the program instructions contained within a given sector serve as instructions for the digit information stored in a succeeding sector of the storage drum.

Thus, program instructions are always one step ahead of the particular data to which they relate. For this reason it is possible in successive sectors throughout the storage drum to perform entirely separate and unrelated operations so that, for example, within one drum revolution it is possible to make 12 successive mathematical calculations and to store the results of each such calculation. This system results in the utilization of the card cycle time as the actual processing time for the information. The card cycle time is the maximum time that is available in any card-fed data processing machine, and the calculating machine herein described thus has this full time available for processing operations. This is in contradistinction to the systems now known in the art in which only about twenty percent of the card cycle time is available for data processing operations. The modal arrangement of the information stored on the drum lends itself to high speed execution of program instructions with a minimum amount of circuitry and permits a complete change of program operation for each sector. The enhanced flexibility and minimized circuitry employed permits the ready adaptation of the calculating machine described for use in association with existing card processing machines as well as the easy adaptation thereof to specialized problems.

CONVENTIONS USED IN THE DESCRIPTION

In view of the relatively complicated nature of the calculation machine described herein, certain conventions are adapted in the interests of brevity of description. Thus, conventional elements and components are shown in block form and have a conventional mode of operation unless otherwise noted.

Each side of bistable multivibrator or "trigger" units has an input circuit denoted by a terminal at the bottom of the block and an output circuit denoted by a terminal at the top immediately above the input terminal, and the unit is assumed to be "on" when the left-hand side is conductive with resultant lowered output potential at the left-hand output terminal. Such unit is assumed to be "off" when the right-hand side is conductive with resultant lowered potential at the right-hand output terminal. Each "trigger" unit is understood to change from "on" to "off," or vice versa, by a negative potential pulse applied to the input circuit of the conductive side or by a positive potential pulse applied to the input circuit of the non-conductive side. In one or two instances, trigger control is effected in conventional manner by applying a negative pulse to an output circuit terminal of the non-conductive side of the trigger.

Potential pulses or potential changes are referred to as "negative" when decreasing positive or increasing negative values occur (i.e. when decreasing from +100 volts to +70 volts or when increasing from −70 volts to −100 volts) and as "positive" when increasing positive or decreasing negative values occur. The "leading edge" of a pulse occurs on a change of potential value in one sense and the "lagging edge" on the succeeding change of value in opposite sense.

AND circuits or gates are either of conventional construction or of the type shown in the U.S. Patent No. 2,580,771 to L. R. Harper, the latter type generally being specifically indicated in connection with certain trigger control operations described below, and have two or more input circuits with a common output circuit. This unit translates potential changes to its output circuit when potential changes concurrently occur in the same sense in all of the input circuits. They may be "positive" AND gates when the input circuit potential changes are in positive sense and "negative" when the input circuit changes are in negative sense.

OR circuits have two or more input circuits and a common output circuit, and translate to the output circuit potential changes occurring in any of the input circuits. An OR circuit may likewise be a "positive" type when the input circuit potential change causing an output change is in the positive sense or a "negative" type when in the negative sense.

Unless otherwise shown, individual circuits are completed in conventional manner through "ground," and specified values of positive and negative unidirectional potentials are related to ground potential. While not specifically indicated in the drawings, the individual conventional units shown in block form are understood to have appropriate ground circuits where conventionally required, and each is assumed to have appropriate energizations where conventionally required and as necessary to perform the function described for the unit. In the interests of brevity, where AND or OR circuits are shown as controlled by an input circuit controllably connected to ground, it will be understood that such input circuit is also coupled to or includes a source of unidirectional potential of correct polarity and value to permit translation by the unit when the one input circuit is disconnected from ground (or is connected to ground as the case may be) and the other input circuit has a potential pulse of appropriate polarity applied thereto.

All reference to time in the machine description denotes the position of the magnetic track read heads relative to specific drum recording areas. For example, a "sector 3" time denotes that the read heads are positioned opposite some recording area of sector 3 of the magnetic drum. This sector 3 time may be made more specific by recitation of a digit time, for example "digit 5" time which denotes that the read heads are opposite the digit 5 position of sector 3 of the drum. Even this time may be subdivided into a smaller time division, as for example reference to "I mode" time would denote that the read heads are opposite the I mode of the fifth digit of the third sector of the drum. In this, and as will be pointed out more fully hereinafter, it should be pointed out that the write heads follow the read heads in the direction of drum rotation by a distance equal to one sector plus one mode spacing. Thus, a time specified as sector 3, digit 2, mode M would locate the write heads as opposite sector 2, digit 2, mode I.

DRUM CONSTRUCTION AND GENERAL MODE OF USE

FIG. 1 illustrates schematically a magnetic storage drum 10 having a peripheral surface exhibiting conventional magnetic storage characteristics. This surface may comprise discrete circumferential storage tracks or, as will generally be the case, may be used in discrete tracks 11, 12, 13, and 14 as indicated by the broken lines. As indicated, these tracks respectively store the binary 1, 2, 4 and 8 of each digit stored. Conventional magnetic read and write heads (not shown) are positioned in aligned relation transversely across the tracks 11–14, and each track with its associated read and write heads translates to or from storage one digit of a number in binary form. It will be understood that larger and more complex calculating machines of the type described may include a larger number of such magnetic tracks, but only 4 tracks are illustrated here for purposes of simplifying the description of the invention. The magnetic storage tracks as thus provided extend continuously around the the drum periphery and are used in 12 equi-angular sectors designated 1–12. Each sector length of the track is further subdivided into 9 equi-angular subsectors designated as a ± digit length followed by digit lengths identified as 1–8, Each such digit length of track is further subdivided into 10 equi-angular subsectors designated "mode" lengths which are identified by their function as follows:

I—input storage
M—multiplicand or divisor storage
C—calculate storage
O—output storage
$T_1$, $T_2$, $T_3$, $T_4$ — additional storage modes under program control
$P_1$—program instruction storage (program numbers 1–108)
$P_2$—program instruction storage (program numbers 109–218)

In this specific type of information and program storage, consolidation is effected by digit and not by function and as such it affords tremendous flexibility with the ability completely to change the type of calculation operation within each digit position. Each "mode" may be considered as a separate storage unit, and each has a specific functional duty for that particular digit as last indicated. The program instruction modes $P_1$ and $P_2$ only affect an entire sector (actually the sector following that in which the program instruction occurs) in contradistinction to all the other modes which relate only to the specific digit within the sector. Thus, as illustrated, the unit with its 12 sectors is capable of executing 12 individual and distinct program instructions in each revolution of the drum, and each of the 12 sectors with its 8 digit subdivisions and the digit sign can contain all of the information pertaining to an 8 digit "word."

Associated with the drum 10 and rotating in unison with it is a sync track 15. The latter may take either the form of a toothed disc having individual magnetized teeth thereof fixedly positioned in aligned relation to and defining the position of individual ones of the mode subsectors as indicated, or a permanently magnetized track or drum having similarly aligned poles positioned with north and south pole orientations alternating around the drum periphery. This sync track is used in association with a read head to generate a synchronizing voltage of alternating wave form of which each peak amplitude of given polarity occurs in synchronous relation with the movement of an individual one of the drum modes past the read heads. There is also provided in association with the drum 10, and likewise rotating in unison with it, a home pulse synchronizing track 16 which may be provided with a single pair of magnetized teeth 17 or a pair of permanently magnetized incremental areas to generate in an associated read head a singled discrete synchronizing pulse once each drum revolution and serving to identify the beginning of a train of sync pulses at the initiation of the I mode of the ± digit of sector 1.

The magnetic drum 10 with its associated synchronizing tracks 15 and 16 is supported by means, not shown, for rotation at a predetermined angular velocity as by suitable drive from a synchronous electric motor, not shown. In the arrangement described, the speed of rotation of the drum 10 is preferably such that the frequency of the sync alternating potential obtained from the sync track 15 is approximately 100 kilocycles.

In using the magnetic drum as thus constituted, each item of data on a tabulating card is automatically converted into a numeral in binary form and is stored in an individual I mode on the drum. As will presently become more fully apparent, each "bit" of data information is identified with a preselected index-point position in a column of such points on the tabulating card, and the conversion to a binary-encoded decimal number identifies the particular one of the several rows of columns in which the data bit is recorded. After the first card is read and the data thereon stored in the I modes of the drum 10, as will occur in approximately 35 successive revolutions of the drum, the information in these I modes is automatically transferred into the C modes where it is available for further processing. This leaves the I modes free to accept data information from a second card read at the reading station. The latter information is thus immediately available for transfer to the C mode as soon as the programmed instructions have been performed on the data of the first card and the results of such processing have been automatically stored in the O modes. Transfer of processed data to the O mode leaves the C modes free to accept transfer thereto of the data information stored in the I mode from the second card. Thus the flow of data information into the magnetic drum 10 and the flow of processed information out of the drum are essentially continuous processes as successive cards are read at the reading station of the business machine.

In using the recorded program instructions, the $P_1$ programs are executed starting with the ± digit of sector 12 and continue successively through the ± digits of the remaining sectors 1—11 during one drum revolution. The next drum revolution executes the $P_1$ programs of all 1 digits, followed by those of all 2 digits and continuing through successive digits 3–8 in turn. After all $P_1$ program instructions have been thus executed, the $P_2$ program instructions are similarly executed. All of these program instructions are executed on the data stored in the C modes after transfer from the I modes, or temporarily stored in the several other modes.

The results of data processing are stored in the O mode, as earlier mentioned, and thereafter are applied to the punch station of the business machine (after automatic reconversion from binary form to arabic form) to record the results of the processing. The intermediate or final results of processing as stored in the C or O modes may also at the same time be temporarily stored or accumulated in the $M_1$, $T_1$, $T_2$, $T_3$ and $T_4$ modes under program instruction as desired. When stored in these latter modes, the results may be programmed to the output mode and thereby to the punching station or may be used under program instructions in specific calculations.

CONTROL SYSTEMS EXERCISING GENERAL OVERALL CONTRAL

*(1) Mode Pulse Sync Signal Generator*

The mode synchronizing signal is of pulse wave form of which each pulse corresponds to an individual one of the 1080 modes used for storage on the drum 10. One synchronizing signal is referred to herein as the "A" signal, which may be used with either positive or negative polarities (referred to as +A and —A pulses). A second synchronizing signal is identical in wave form but has 180° phase displacement with respect to the "A" synchronizing signal. This second signal is referred to herein as a "B" synchronizing signal and it also may be used with both positive and negative polarities, identified as +B or −B pulses.

The synchronizing signal generator is shown schematically in FIG. 2, and includes a read head 20 which is physically positioned in alignment with the read heads for the drum 10 but in opposing relation to the teeth of the synchronizing track 15. The signal of alterating wave form generated in the read head 20 is applied to an amplifier and wave shaper 21 to develop in its output circuit $21_O$ a −B synchronizing signal of rectangular pulse wave form having 5 microsecond pulse duration with 5 microsecond spacing between successive pulses. This signal is applied to a phase inverter 23 to develop at an output circuit $23_O$ of the latter a −A synchronizing signal. The latter is used directly or may be translated through a second inverter stage 25 to develop in an output circuit $25_O$ a +A synchronization signal. In similar fashion the −B synchronizing signal may be used directly or may be translated through an inverter 27 to provide in an output circuit $27_O$ a +B synchronizing signal.

The +A signal is also translated through a differentiating inverter 26 to develop in the output circuit $26_O$ of this unit a potential of triangular-pulse wave form of short pulse duration and with the leading edge of each pulse coinciding in time with the leading edge of a corresponding +A pulse. A similar potential, having pulses occurring midway between the pulses of the differential +A pulses is provided by translating the +B pulses through a differentiating inverter 28.

(2) *Mode-Digit Sector Address Rings and OUT OF SYNC Control*

There are three address rings which generate output timing pulses corresponding to the mode, digit, and sector subdivisions of the storage drum. The purpose of these address rings is to indicate to the calculating machine the actual location of the read or write heads with respect to the drum sectors and subsectors at any given time. The drum has 1080 separate and distinct modes, and in order to operate in conjunction with any particular mode address it is necessary for the calculating machine to know when that particular mode is positioned opposite the read or write heads as the case may be.

Since the storage capacity of the drum is divided into 12 sectors, each having 9 digital subsectors, and each of the digital subsectors being further divided into 10 modes, the address rings consist of a 12 stage sector ring, a 9 stage digit ring, and a 10 stage mode ring. These rings are shown schematically in FIG. 3, and it will be seen that the mode ring includes 10 bistable multivibrator or trigger units 40–49, the digit ring includes 9 trigger units 51–59, and the sector ring includes 12 trigger units 61–72. Each trigger unit has input circuits with associated AND gates of the type shown in the Harper U.S. Patent No. 2,580,771, identified by the trigger reference numeral but with *a* and *b* subscripts. These trigger units and their associated input AND gates are interconnected to constitute a timer chain.

+A synchronizing pulses are applied from the output circuit $25_O$ of the synchronizing generator, previously described, to an inverting amplifier and wave shaper 74 where the synchronizing signal of rectangular pulse wave form is changed to a signal of triangular pulse wave form in an output circuit 75. The latter signal is applied to an AND gate 76 and, assuming the gate is conditioned to translate the signal, is applied through an advance circuit $76_O$ to the input circuits of the several AND gates associated with the mode ring trigger units 40–49. The pulses of this signal cause the trigger units to be successively turned "on" starting with trigger 40, continuing to the trigger 49, and starting again with the trigger 40 in continuous ring fashion. These trigger units have output circuits identified at $40_O$–$49_O$, and the output circuit $40_O$ of the trigger unit 40 is translated through a differentiating inverter 50 to an output circuit $50_O$ which constitutes an advance circuit coupled to the input circuits of the AND gates associated with the digit ring trigger units 51–59. As the mode ring completes successive cycles of operation during each of which the mode trigger 40 turns on and off, the change from off to on of the latter causes the digit ring triggers 51–59 likewise to be turned "on" in succession and in ring manner like the mode ring. In other words, as the mode ring goes through a complete cycle of operation from unit 40 through unit 49 and back to unit 40, a successive one of the trigger units 51–59 will be turned on.

The units 51–59 also include output circuits respectively identified as $51_O$–$59_O$, and the output circuit 51 of the unit $51_O$ is coupled through a differentiating inverter 60 and an output circuit $60_O$ to the AND gates of the sector ring 61–72. Thus each successive cycle of the digit ring causes the triggers of the sector ring to be turned "on" in succession and in ring manner.

The trigger units 61–72 also include output circuits identified as $61_O$–$72_O$, and the output circuit $72_O$ of the trigger 72 is applied to an input circuit of an AND gate 77 which forms one component of an "OUT OF SYNC" control circuit. The AND gate 77 has a second input circuit connected through a conductor 78 to an output circuit of a trigger unit 79. The latter has an input circuit coupled through a conductor 80 to the output circuit of an amplifier and wave shaper 81, the input circuit of which is coupled to a read head 82 aligned with the read heads of the magnetic drum but positioned in association with the home synchronization track 16. The read head 82 has generated therein by the tooth 17 of the home sync track 16, and at "home" time as established by the position of the tooth 17, opposite the $P_2$ mode of the eighth digit of the twelfth sector, a potential essentially of pulse wave form having one pulse for each complete drum rotation. This signal after amplification and wave shaping by the amplifier 81 is applied through the conductor 80 to the trigger unit 79. There is also applied to a second input circuit of the latter unit +A synchronizing pulses translated through a wave shaper and inverter unit 83 which inverts the polarity of the synchronizing signal and modifies it to a signal of triangular pulse wave form.

The "home" synchronizing pulse is applied with negative polarity through the conductor 80, and causes the trigger 79 to turn on upon receipt of each home pulse. It is turned off by the next +A sync pulse applied to its other input circuit through unit 83. During the time the trigger 79 is on, it applies a negative pulse (curve A) to the AND gate 77 which is of the type shown in the U.S. Harper patent No. 2,580,771 and includes a diode rectifier $D_1$, a condenser $C_1$ and a resistor $R_1$ as shown. Since the potential of the sector ring output circuit $72_O$ is also applied to this gate (curve B) to render the diode rectifier $D_1$ non-conductive during the twelfth sector time, the negative pulse of the home pulse trigger unit 79 is integrated by the resistor $R_1$ and $C_1$ relatively slowly to drop the potential (curve C) of the off input circuit of the out-of-sync trigger 84. If the latter potential has decreased substantially to its lowest value at the time the sector trigger unit 72 turns off to decrease its output potential (curve B), the potential on each side of the diode rectifier $D_1$ is approximately equal and it does not become conductive. If, however, the sector trigger 72 turns off either too early or too late, the drop in potential of its output circuit $72_O$ occurs at a time when the potential in the input circuit of the out-of-sync trigger unit 84 has a value appreciably larger than its minimum value (curve C) and the diode is thereupon rendered conductive sharply to decrease the input circuit potential of the trigger 84 and turn it on. Thus if the sector trigger 72 turns off either early or late, it causes the out-of-sync trigger 84 to be turned on and it is only when the sector trigger 72 turns off at the proper time with relation to the on period of the home pulse trigger 79 that the out-of-sync trigger 84 is not turned on.

If the out-of-sync trigger 84 is turned on by lack of proper synchronization of the sector ring trigger 72, the trigger unit 84 in turning on develops in its output circuit 85 a negative potential pulse which is applied to the AND gate 76. This terminates further translation by the latter of +A pulses to the mode ring advance circuit $76_O$, and operation of the mode ring, and with it the digit and sector rings, ceases. Such cessation of ring operation is proper since it is responsive to the fact that the sector ring is advanced or retarded in its operation, as evidenced by the fact that the trigger 72 has turned off too early or too late with reference to the time of occurrence of the home pulse.

If the operation of the address rings is terminated by the out-of-sync control circuit in the manner above described, it is necessary manually to reset the address rings to an initial operating state in which they are conditioned to resume operation in synchronized relation with the home pulse. The following describes a reset procedure necessary only if the rings are incorrect. It is also possible to restart the machine only by pressing a switch 86, as the rings will already be at "home." A ring reset operation is accomplished by manually actuating a switch 90 to apply a positive voltage from a supply circuit 91 to a reset circuit 92. The latter circuit is coupled to each of the triggers of the several rings through diode rectifiers 93, 95 and 96. These are connected between the reset conductor 92 and an output circuit of each of the triggers, in the manner shown for the first several triggers of each ring, to cause the triggers 40, 51, and 61 to turn on and all of the remaining triggers to turn off when the switch 90 is closed. The value of the potential applied to the conductor 92 is approximately equal to the output potential appearing at the reset output circuit of the trigger unit when the latter is conductive on the reset side, so that if the trigger unit should happen to be in its nonconductive state on its reset side (so that the output potential on that side is high) at the time the switch 90 is closed, the diode rectifier becomes conductive and thereby drops the reset output circuit potential. This causes the trigger unit to change over from its on condition to its off condition. If the trigger unit is off at the time the reset potential is applied to the reset conductor 92, there is no potential difference existing across the rectifier and the off condition of the trigger unit is accordingly not changed. Resetting of the trigger units 40, 51 and 61 to their on conditions occurs in the same manner as described.

After the address rings have been thus reset by manual actuation of the switch 90, the normally closed manually operated switch 86 is actuated to apply a positive potential to an input circuit of an AND gate 87. This gate also receives through a conductor 88 a positive potential from the trigger 79 at the time that the latter is turned on by the home sync pulse. When the trigger unit 79 turns off again under actuation of the next —A pulse from the amplifier 83, the trigger 84 turns off again and the synchronized operation of the mode, digit and sector rings is again initiated by +A pulses translated through the AND gate 76.

It will be apparent from the foregoing description that the purpose of the OUT OF SYNC control circuit is to insure that the address rings shall always accurately identify the relative position at any time of the read heads on the storage drum with respect to the sector, digit and mode storage increments. Thus the home pulse, generated at the position of the $P_2$ mode of the eighth digit of the twelfth sector insures that the first trigger unit 40 of the mode ring is triggered from on to off by the next +A pulse applied from the synchronization track 15 and inverted and gated through units 74, 76 and **49*b* to this trigger unit to produce a negative pulse in its output circuit $49_O$. This synchronization pulse is also applied through the AND gate 40*a*, conditioned by the previous positive potential applied to its other input circuit from the output circuit $49_O$ of the trigger unit 49, and changes trigger unit 40** from off to on to develop a positive potential pulse in its output circuit $40_O$.

The next succeeding +A synchronizing pulses successively trigger the remaining mode ring triggers to their on condition, thereby indicating the position of the read heads through the modes of the ± digit of the first sector, the ± trigger 51 and the first sector trigger 61 being on at this time. Subsequent cycles of the mode ring successively trigger the digit ring trigger units to their on condition, thereby indicating the position of the read heads successively at positions corresponding to the digits of the first sector. Successive cycles of the digit ring in turn change the trigger units of the sector ring to their on condition, thus indicating the position of the read heads successively through sectors 1–12. Thus the mode, digit and sector address rings being maintained in synchronism with the drum movement under control of the generated +A pulses develop output potentials which at any time accurately indicate the position of the read heads relative to the mode, digit and sector increments of the drum. Should this synchronized relationship be impaired for any reason, the OUT OF SYNC control circuit terminates operation of the address rings until manually reset to insure synchronized operation in the manner above described.

As will become more fully apparent hereinafter, the contro potentials developed in the numerous output circuits of the address rings are employed to control the operation of the calculating machine so that transfer of information into and out of storage in the storage drum with respect to its mode, digit and sector storage increments is always under precisely timed control. In this manner the calculating machine is enabled under precise control of the address rings to transfer information into storage or receive information out of storage with respect to any mode of any digit of any sector of the storage drum as required by a particular program instruction. At the same time, the program instructions are precisely identified in spatial relation to the stored data information to which the instruction relates so that the calculating machine operates under precise program instruction with respect to each item of data stored on the storage drum at any given time.

(3) *The MACHINE PROGRAM Control*

The MACHINE PROGRAM control circuit has its operation initiated by the business machine which reads the program and detail data card records. Having initiated operation, the MACHINE PROGRAM control circuit effects automatic transferral of information stored in the input or I modes to storage in the C or calculate modes, thereafter initiates the calculation operations which proceed according to program instructions, and at the end of the calculation program effects transferral of the results stored in the calculate modes to storage in the output modes of the drum where it is available for use by the punching station of the business machine or for transferral to other modes of the drum under the control of the program instructions.

The MACHINE PROGRAM circuit is schematically shown in FIG. 4 and includes a number of trigger units initially reset off by a machine reset line (not shown, but like that shown in FIG. 26). A trigger unit 100 has an input circuit 101 to which is applied from the associated business machine a negative pulse potential after card reading is completed and the time has arrived for processing the data read from the card. This negative control pulse turns the trigger 100 to its on condition, and thereby develops a negative pulse in an output circuit 102 which is applied to an input circuit of a trigger unit 103 to turn the latter on. There is accordingly developed in an output circuit 104 of the trigger unit 103 a positive potential which is applied to input circuits of two AND gates 105 and 106. There is also applied to a second input circuit of the AND gate 105 I mode pulses derived in the output circuit $40_O$ of the mode address ring described above. The I mode pulses are accordingly translated to an output circuit 107 of this AND gate during the interval that the trigger 103 is turned on. The output circuit 107 is a control circuit for the read gates of the storage drum, as will become apparent hereinafter, and also controls the advance operation of the adder unit used in the calculating machine. The AND gate 106 similarly has applied to its other input circuit C mode pulses derived from the output circuit $42_O$ of the mode ring, these pulses being translated to an output circuit 108 during the on period of the trigger 103. The control circuit 108 controls the write gates to the write heads of the storage drum as will later become apparent.

When the trigger 103 turns on, the positive pulse developed in its output circuit 104 is also applied through an OR unit 109 to an input circuit of an AND gate 110 having a second input circuit which receives eighth digit pulses from the output circuit $59_O$ of the digit ring previously described. Thus, while the trigger unit 103 is on, the AND gate 110 is conditioned to translate eighth digit pulses to the advance line 111 of a twelve step counter-ring 112 which may have a construction similar to the sector ring above described in reference FIG. 3. The output circuit 113 of this counter-ring is applied to the other input circuit of the trigger 103 to turn the later unit off after the counter-ring 112 has counted twelve eighth digit pulses. The purpose of this is to insure that the trigger 103 remains on sufficiently long that the read and write gates, controlled by the I and C pulses translated by the AND gates 105 and 106 to their respective output circuits 107 and 108, remain open during passage of the read and write heads past all of the twelve sectors of the storage drum. As will be explained later, this has the effect of transferring the information stored in all of the I modes of the drum to storage in the C modes of the drum.

When the trigger 103 is turned off again under control of the counter-ring 112, a positive potential pulse is developed in its output circuit 130 and is translated by a cathode follower 131 to a reset program control circuit 132 for purposes of resetting the PROGRAM SEQUENCE SELECTOR hereinafter described. At the same time, the trigger 103 in turning off develops a negative potential pulse in its output circuit 104 which is translated through an OR unit 114 to a calculate trigger unit 115 to turn the latter on. There is accordingly developed in an output circuit 116 of this trigger unit a positive potential pulse which is applied to the PROGRAM SEQUENCE SELECTOR just mentioned.

The latter initiates the calculating operations of the calculating machine which continue under program control and until such time as a "multiply" (circuit 266), a "divide" (circuit 267), or an "end of program" (circuit 278) positive potential is developed by the calculation operations or the PROGRAM DECODER and applied to an OR unit 118. This potential is translated through the OR unit 118 to an input circuit 119 of an AND gate 120. The AND gate 120 is subsequently conditioned by ±digit pulses applied from the output circuit $51_O$ of the digit ring to a second input circuit of the AND unit and by M mode pulses applied from the output circuit $41_O$ of the mode ring to a third input circuit of this AND unit. Thus when the OR unit 118 potential is applied, a±digit pulse is received on conductor $51_O$, and an M mode pulse on conductor $41_O$, the latter pulse is translated by the AND gate 120 to the other input circuit of the calculate trigger unit 115 and the lagging edge of the translated mode pulse turns this trigger unit off.

This results in developing a negative potential pulse in the output circuit 116 of the trigger unit 115, and this negative pulse is applied to an input circuit of an AND gate 121. The latter is conditioned to translate this negative pulse if there is applied to second and third input circuits 266 and 267 of the gate a positive potential which is generated at all times except when a multiplication or division program is called for. The negative pulse when translated is applied through the output circuit 123 of the AND gate 121 to the off input circuit of a C to O trigger 124. The negative pulse is effective to turn the latter unit on, thereby developing a positive potential pulse in its output circuit 125 which is applied to an input circuit of each of two AND gates 126 and 127.

C mode pulses from the output circuit $42_O$ of the mode ring are also applied to the AND gate 126 for translation through the output circuit 128 of the latter to the advance line of the adder and to the read gates employed in the calculating machine. As will presently be explained more fully, this effects translation of the information stored in the C modes of the drum to the adder and at the same time advances the latter to store the information in the adder. The AND gate 127 has applied to its other input circuit O mode pulses from the output circuit $43_O$ of the mode ring, and there is accordingly developed in the output circuit 129 of this gate O mode pulses which are applied to the write gates of the calculating machine. The write gates upon opening translate the information stored by the adder to storage in the O modes of the storage drum where such information is available to be supplied to the punch station of the tabulating machine and for other use in the calculating machine as required by program control.

The positive potential developed in the output circuit 125 of the C to O trigger 124 is also applied to a second input circuit of the OR unit 109 and is translated thereby to an input circuit of the AND gate 110. This conditions the gate 110 to translate the eighth digit pulses in the manner previously described to cause the counter-ring 112 again to count twelve eighth digit pulses and thereafter to develop in its output circuit 113 a negative pulse which is applied to a second input circuit of the C to O trigger 124 to turn the latter off. The reason that it is necessary for the counter-ring 112 to count twelve eighth digit pulses is to insure that the C to O trigger 124 remains on sufficiently long that the read and write heads transfer all twelve sectors of the storage drum so that all of the information stored in the C modes is transferred to an associated O mode of the drum. The trigger 124 in turning off terminates translation of the C and O mode pulses by the AND gates 126 and 127. At the same time, the output circuit 125 of the trigger unit 124 develops a negative pulse when this unit turns off and applies this pulse through its output circuit 125 to an input circuit of the trigger unit 100 to turn the latter off and condition it to receive and act upon a subsequent start pulse applied through the conductor 101 from the tabulating machine to start a second machine program cycle.

*(4) PROGRAM SEQUENCE SELECTOR*

The purpose of the PROGRAM SEQUENCE SELECTOR is to instruct the calculating machine where to look for the next bit of program information. As was earlier mentioned, calculation programs are stored on the storage drum prior to the calculations which take place on the detail data fed into the calculating machine. The program information is entered into the machine by punch program cards which it was stated above are read by a reading station of the tabulating machine. It will also be recalled that the program instructions are stored in the $P_1$ and $P_2$ modes of the various digits of the various sectors. These program instructions in the machine described herein are identified by numerals which are converted to binary form prior to storage on the drum, and it is the purpose of the PROGRAM DECODING unit to be described below to decode the stored program instruction members and to apply a voltage to an individual one of its 16 program control circuits indicative that a particular program instruction is to be executed. The PROGRAM SEQUENCE SELECTOR operates to route the stored program instructions in a particular order to the PROGRAM DECODING unit.

In particular, the PROGRAM SEQUENCE SELECTOR operates to insure that the program instructions are applied to the PROGRAM DECODING unit from all programs stored in the $P_1$ mode of successive ones of the ± digits of all twelve sectors of the drum. The $P_1$ modes then are read in similar manner from successive 1 digits of all sectors, successive 2 digits, etc. until all of the $P_1$ mode digit instructions are read out to the PROGRAM DECODING unit. Thereafter, the PROGRAM SEQUENCE SELECTOR translates to the latter all $P_2$ mode program instructions by reading from the $P_2$ modes in similar fashion.

The PROGRAM SEQUENCE SELECTOR is shown in FIGS. 5 and 6, and these figures should be arranged as shown in FIG. 7 to be read together as a composite unit. The SELECTOR includes a sector ring shown in FIG. 5 which includes twelve trigger units 135–146 arranged as a counter-ring identical to the sector ring described in connection with FIG. 3. This ring is reset by a positive voltage applied to the reset line 132 which originated in the MACHINE PROGRAM unit last described, and is coupled to the trigger units 135–146 through individual ones of the diode rectifiers 147 to effect a reset operation in the same manner as described in connection with the sector ring of FIG. 3.

The trigger units 135–146 have respective output circuits $135_O$–$146_O$ which comprise one input circuit of respective AND gates 148–159. The other input circuit of these gates comprises the respective output circuits $61_O$–$72_O$ of the sector ring described in FIG. 3 . The output circuits of the gates 148–151 comprise input circuits of an OR unit 160, the output circuits of the gates 152–155 comprise the input circuits of an OR unit 161, and the output circuits of the gates 156–159 comprise the input circuits of an OR unit 162. The output circuits of the OR units 160–162 comprise the input circuits of an OR unit 163 having an output circuit 164.

It will shortly become apparent that the trigger units 135–146 operate to indicate periods of sector coincidence with the timing established by the sector ring of FIG. 3, and at each such coincidence condition the AND gates 148–159 to translate in turn the sector pulses I–XII developed by the sector ring. These translated sector pulses are in turn translated through the OR units 160–163 to the output circuit 164. The operation of the sector unit described is controlled by positive potential pulses applied to an advance line 165 in a manner presently to be explained.

The PROGRAM SEQUENCE SELECTOR also includes a digit ring shown in FIG. 6 and including trigger units 166–174 which are arranged in identical manner to the digit ring of FIG. 3 and likewise are reset through individual ones of the diode rectifiers 175 from the reset line 132 of the MACHINE PROGRAM circuit. The respective output circuits $166_O$–$174_O$ of these trigger units comprise an input circuit of respective AND gates 176–184. The output circuits of the AND gates 176–179 comprise the input circuits of an OR unit 185, while the output circuits of the AND gates 180–183 comprise the input circuits of an OR unit 186. The output circuits of the OR units 185 and 186 and the output circuit of the AND gate 184 comprise the input circuits of an OR unit 187 having an output circuit 188. As with the sector ring selector, the operation of the digit ring triggers establish periods of digit coincidence with the timing established by the digit ring of FIG. 3, and each such coincidence conditions the AND gates 176–184 to translate digit pulses appearing in the output circuits $51_O$–$59_O$ of the latter ring which comprise the second input circuits of individual ones of these AND gates as indicated. Each such translated digit pulse passes through one or more of the OR units 185–187 to the output circuit 188 of the selector digit ring. The latter includes an advance line 189, which controls the operation of this ring in a manner presently to be explained.

The output circuit 164 of the sector ring and the output circuit 188 of the digit ring comprise two input circuits of an AND gate 190 and condition the latter for translation whenever the sector ring translates to its output circuit 164 a sector pulse and the digit ring translates to its output circuit 188 a digit pulse.

The control circuit 116 of the MACHINE PROGRAM unit, described in connection with FIG. 4, constitutes a third input circuit of the AND gate 190 and thus conditions the gate for translation whenever the calculate trigger unit 115 of the MACHINE PROGRAM unit calls for calculation to proceed. The fourth input circuit of the AND gate 190 is comprised by the output circuit of an OR unit 191 having one input circuit comprised by the output circuit of an AND gate 192 and a second input circuit comprised by the output circuit of an AND gate 193. One input circuit of the AND gate 192 is comprised by the output circuit $49_O$ of the $P_2$ mode trigger 49 of the mode ring described in connection with FIG. 3, and the other input circuit of this gate is comprised by the on output circuit 194 of a $P_1$–$P_2$ trigger unit 195. One input circuit of the AND gate 193 is comprised by the output circuit $48_O$ of the $P_1$ mode trigger 48 of the mode ring of FIG. 3, and the other input circuit is comprised by the off output circuit 196 of the $P_1$–$P_2$ trigger 195. The latter is initially reset to its off condition by a diode rectifier 197 connected to the reset line 132 as shown.

Whenever the four input circuits of the AND gate 190 are all positive, the latter develops in its circuit 198 a positive mode pulse ($P_1$ if the trigger 195 is off or $P_2$ if the latter is on) and this pulse is supplied through a circuit 198 to an input circuit of an AND gate 199 having a second input circuit to which differentiated +A pulses are applied from the output circuit $26_O$ of the pulse generated described in connection with FIG. 2. The positive potential applied by the output circuit 198 to the gate 199 causes this gate to translate to its output circuit 200 the +A pulses, and these are applied to the on input circuit of a coincidence trigger unit 201 which is accordingly turned on on the lagging edge of each +A pulse applied from the gate 199. The on output circuit 202 of the trigger 201 comprises one input circuit of an AND gate 203 having three additional input circuits as follows: one is the calculate trigger control circuit 116 originating in the MACHINE PROGRAM circuit of FIG. 4, the second is comprised by the output circuit $43_O$ of the O mode trigger 43 of the mode ring of FIG. 3, and the last is comprised by the output circuit $51_O$ of the ± digit trigger 51 of the digit ring in FIG. 3.

Thus when the MACHINE PROGRAM develops a positive potential in its control circuit 116 to initiate calculations, when the coincidence trigger 201 turns on to develop a positive potential in its output circuit 202, and at the O mode of the ± digit the AND gate 203 translates the O mode pulse to its output circuit 204. The latter comprises one input circuit of an AND gate 205 having a second input circuit to which differentiated +A pulses are applied from the output circuit $26_O$ of the A pulse generator of FIG. 2. The output circuit of the AND gate 205 comprises the advance line 165 of the FIG. 5 sector ring, and each +A pulse translated by the gate 205 is effective to advance the sector ring triggers one step.

The coincidence gate 201 is initially reset to its off condition by a diode rectifier 206 connected to the reset line 132. When the coincidence trigger 201 has been turned on by a $P_1$ or $P_2$ pulse from the AND gate 199, it is restored to its off condition by a +A pulse developed in the output circuit 207 of an AND gate 208. This gate has five input circuits as follows: the first is comprised by the output circuit 202 of the coincidence trigger 201, the second by the output circuit $26_O$ of the differentiated +A pulse generator of FIG. 2, the third by the output circuit $44_O$ of the $T_1$ mode trigger 44 of the FIG. 3 mode ring, the fourth is comprised by the output circuit $51_O$ of the ± digit trigger 51 of the FIG. 3 digit ring, and the last by the output circuit 116 of the FIG. 4 MACHINE PROGRAM calculate trigger 115.

It will be helpful to consider the coordinated operation of the FIG. 4 MACHINE PROGRAM control circuit and the FIGS. 5 and 6 PROGRAM SEQUENCE SELECTOR starting with the time when the associated business machine supplies a start pulse to the start program trigger 100 which thereupon turns on to turn the I to C trigger 103 on. A negative potential pulse is thereupon applied by the trigger 103 to the cathode follower 131 of MACHINE PROGRAM, and the latter translates this negative pulse to reset line 132 to reset in the PROGRAM SEQUENCE SELECTOR all of the sector triggers 135–146, all of the digit triggers 166–174, the $P_1$–$P_2$ trigger 195, and the coincidence trigger 201. This reset potential is removed from the reset line when the MACHINE PROGRAM I to C trigger 103 is again turned off by the counter ring 112, as earlier described, which at the same time turns the calculate trigger 115 on to develop a start calculate positive potential in its output circuit 116. This potential is applied to the AND gates 190, 203 and 208 to condition these gates for translation during the calculation interval.

Since only the first sector trigger 135 of the sector ring and the ± digit trigger 166 of the digit ring are reset to their on condition, only the AND gates 148 and 176 are conditioned to translate respective I sector pulses and ± digit pulses supplied from the address rings of FIG. 3. Further, the $P_1$–$P_2$ trigger 195 was reset off so only the AND gate 193 is conditioned to translate $P_1$ pulses from the $P_1$ mode trigger 48 of the FIG. 3 address rings. Accordingly, all of the four input circuits of the AND gate 190 become positive only when coincidence is established by the read heads being opposite the $P_1$ mode of the ± digit of the first sector of the storage drum. At this time the AND gate 190 translates a $p_1$ pulse through its output circuit 198 to the AND gate 199 to condition this gate to translate the next +A pulse of the A pulse generator. When this occurs the coincidence trigger 201 is turned on by the lagging edge of the +A pulse.

The AND gates 203 and 205 thereupon apply a +A advance pulse to the advance line 165 of the sector ring upon opening of the gate 203 at O mode and ± digit times to condition the AND gate 205 to translate the next +A pulse. The first sector trigger 135 being on conditions the AND gate 136*a* to translate the advance pulse and the second sector trigger 136 is accordingly turned on. At the same time, the twelfth sector trigger is off and conditions the AND gate 135*b* to translate the advance pulse to turn the first sector trigger 135 off. The gate 148 is thereupon no longer conditioned to translate the first sector pulses, but the AND gate 149 is now conditioned to translate the II sector pulses. Note at this point that immediately following the translation of the advance pulse to the advance line 165, and specifically at the immediate $T_1$ mode pulse, the AND gate 208 is conditioned to translate a ± pulse to its output circuit 207 which turns the coincidence trigger 201 off. The latter is then ready again to be turned on by the next pulse developed in the output circuit 198 of the AND gate 190 when coincidence is established between the second sector and ± digit times. The sector triggers are advanced in succession, in the manner just described, when coincidence is established between the ± digit and successive sector times.

When the twelfth sector trigger 146 having been turned on is now turned off, it develops a negative pulse in its output circuit $146_O$ which is applied through an OR unit 211 to the advance line 189 of the digit ring. The ± digit trigger 166 is thereupon turned off and the first digit trigger 167 is turned on to shut down the AND gate 176 and open up the AND gate 177. The sector ring advance now occurs with each coincidence of the first digit time with each successive sector time.

The operation described will continue and programming will advance at the $P_1$ mode time first from sector to sector and secondly from digit to digit until an output pulse has been developed by the AND gate 190 corresponding to each of the 108 possible $P_1$ programs. At this time the digit ring trigger 174 will previously have been turned on, and upon turning off in response to the advance pulse corresponding to the 108th $P_1$ program is effective to apply a negative pulse from its output circuit $174_O$ to an OR unit 212. The latter translates this negative pulse to its output circuit 213 and the $P_1$-$P_2$ trigger 195 is thereupon turned on. This now conditions the AND gate 192 to translate $P_2$ mode pulses, and thereafter the sector and digit trigger advances occur at $P_2$ mode time in the same manner as described for the $P_1$ mode programs. When the last of the 108 $P_2$ program modes occur, the digit trigger 174 will go through a cycle of operation again to develop a negative output pulse which is effective to turn the $P_1$-$P_2$ trigger 195 again to its off condition. At this time, or more likely somewhat previous thereto, an end of program control signal will have been applied from the output circuit 278 of the PROGRAM DECODER (described hereinafter) through the OR unit 114 to turn off the calculate trigger 115 of the FIG. 4 MACHINE PROGRAM circuit. This closes down the AND gates 190, 203 and 208 to terminate operation of the PROGRAM SEQUENCE SELECTOR.

PROGRAM DECODER

The purpose of the PROGRAM DECODER is to take a program instruction number which is initially written on the storage drum in the 1, 2, 4, 8 binary code and convert this program instruction number to a single voltage which will indicate to the calculating machine the program to be executed. The calculating machine herein described has a 16 program instruction capacity, and the program instruction voltages developed by the PROGRAM DECODER unit accordingly appear in individual ones of 16 output circuits of the DECODER. The program numbers used to identify the several program instructions are as follows:

0—Idle
1—Add
2—Subtract
3—Multiply
4—Divide
5—Store
6—Shift Left
7—Shift Right
8—Round and Shift Right
9—Reset Register
10—Skip On +
11—Skip On −
12—Look For −
13—Look For +
14—Store Register Sign
15—End of Program The program instruction numbers in binary form on the storage drum are always available at the input of the PROGRAM DECODER as the storage drum revolves. It is the $P_1$ and $P_2$ mode pulses appearing in the output circuit 198 of the AND gate 190 of the PROGRAM SEQUENCE SELECTOR last described which selectively allow the program instruction numbers to be entered into the PROGRAM DECODER.

The PROGRAM DECODER is shown in schematic form in FIG. 8, which should be considered in conjunction with FIGS. 5 and 6 in the manner shown in FIG. 9. The DECODER includes four binary trigger units 218–221, having associated input AND gates of the Harper type identified by the same reference numeral as the trigger unit but with *a* and *b* subscripts. One input circuit of each of the gates 218*a*–221*a* is comprised by a respective binary trunk line 520–523 (these are output circuits of the read amplifiers later to be described) which have positive energizations whenever the binary number read from the storage drum has a "one" in the respective 1, 2, 4 and 8 digit positions. One input circuit of the AND gates 218*b*-221*b* is comprised by respective trunk lines 524–527 which have positive potentials impressed upon them whenever the binary digit number read from the storage drum has a "zero" in the respective 1, 2, 4 and 8 digit positions. A second input circuit of all of the gates 218*a*–221*b* is comprised by an output circuit 222 of an AND gate 223. The latter has one input circuit comprised by the output circuit 198 of the PROGRAM SEQUENCE SELECTOR gate 190 previously described, and a second input circuit comprised by the output circuit $26_O$ of the differentiated +A pulse generator of FIG. 2.

When the PROGRAM SEQUENCE SELECTOR applies $P_1$ and $P_2$ pulses to its output circuit 198, the next succeeding +A pulse applied to the AND gate 223 is translated by this gate to the gates 218*a*–221*b* and causes the triggers 218–221 to be turned either on or off depending upon whether the binary number supplied to a particular trigger from its input trunk lines is a zero (trigger turned off) or a "one" (trigger turned on) as the case may be. The triggers 218–221 thus temporarily store the binary program number corresponding to a selected $P_1$ or $P_2$ program instruction.

The PROGRAM DECODER also includes four additional program storage triggers 225–228 having associated pairs of input AND gates of the Harper type identified by the same reference numeral as the trigger but with *a* and *b* subscripts. One input circuit of the gates 225*a*–228*a* is comprised by the off output circuit of the respective triggers 218–221, while one input circuit of the gates 225*b*–228*b* is comprised by the on output circuit of the latter triggers. The other input circuit of all of the AND gates 225*a*–228*b* is comprised by the output circuit 229 of an AND gate 230 having three input circuits as follows: the first input circuit is comprised by the calculate control output circuit 116 of the MACHINE PROGRAM circuit, the second input circuit by the output circuit $51_O$ of the ± digit trigger unit 51 of the digit address ring (FIG. 3), and the third input circuit by the output circuit $40_O$ of the I mode trigger 40 of the address mode ring.

Accordingly, when the MACHINE PROGRAM calculate trigger 115 in FIG. 4 turns on to initiate a calculation interval, it develops a positive potential in its output circuit 116 which conditions the AND gate 230 to translate ± digit and I mode pulses throughout the calculation interval. Thus at the I mode time of the ± digit of each of the twelve sectors the AND gates 225*a*–228*b* are conditioned by the positive potential pulse developed in the output circuit 229 of the gate 230 and the trailing edge of this pulse will change the triggers 225–228 to on or off in accordance with the corresponding on or off condition at this time of their associated storage triggers 218–221. This control of the decoder triggers 225–228 occurs on the lagging edge of each I mode pulse, so that the setting of the decoder triggers 225–228 at the ± digit I mode time of each of the twelve sectors occurs after the storage triggers 218–221 have stored the program instruction binary number at the preceding $P_1$ or $P_2$ time of the selected ± digit or digits 1–8 of the preceding sector as established by operation of the PROGRAM SEQUENCE SELECTOR previously described. Further, once the decoder triggers 225–228 have received and stored the program binary number temporarily stored in the triggers 218–221, the triggers 225–228 retain this instruction number through the remainder of the sector interval and until the I mode time of the ± digit of the succeeding sector occurs.

The output circuits of the decoder triggers 225–228 are identified by the same reference numerals but with the subscripts O1 for the on output circuit and O2 for the off output circuits. The eight output circuits of the decoder triggers 225–228 comprise input circuits of a plurality of AND gates 231–238 arranged as shown and in such manner that the respective output circuits 239–246 of these gates develop positive potentials which represent certain discrete combinations of binary numbers which may happen to be stored at any given time in the decoder triggers 225–228. For example, a positive potential developed in the output circuit 239 for the gate 231 results from the on condition of both decoder triggers 225–226, thus indicating that the stored program binary number may be any of the numbers 3, 7, 11 or 15. Similarly, a positive output potential developed in the output circuits 240 of the gate 232 indicates that the stored program binary number may have any of the values 2, 6, 10 or 14. These possible values of the stored binary number of the several gate outputs are indicated in FIG. 8 in association with the output circuits 239–246.

The latter comprise input circuits of a plurality of gates 247–262 having respective output circuits 263–278, arranged as shown. This arrangement of the input circuits of the gates 247–262 is one wherein all of the possible program binary numbers represented by the outputs of any two of the AND gates 231–238, only one distinctive program binary number occurs in common to both inputs of any given one of the gates 247–262 and this unique binary number is actually the binary number stored in the decoder triggers 225–228. Thus for the AND gate 248, only the program number one is common to both of the possible groups of binary numbers applied to this gate. That this is the correct number will be apparent when it is considered that the binary 1 storage trigger 225 must be on and the binary 2 storage trigger 226 off to develop a positive voltage in the output circuit 240 of the gate 232, and both of the binary 4 and 8 storage triggers 227 and 228 must also be off to develop a positive voltage in the output circuit 246 of the gate 238.

It will thus be apparent that the PROGRAM DECODER temporarily stores the program instruction numeral in the storage triggers 218–221 at the $P_1$ and $P_2$ mode times of a given sector, and transfers the stored program number to the decoder triggers 225–228 during the immediately following I mode time of the ± digit of the next sector. The stored number is retained during the entire sector interval to develop in one of the decoder output circuits 263–278 a positive potential corresponding to the particular program of the then stored program instruction number. Each such energization of the DECODER output circuit accordingly continues during the sector interval, but changes from sector to sector in accordance with the succeeding $P_1$ and $P_2$ program instructions as selected under control of the PROGRAM SEQUENCE SELECTOR previously described.

By way of clarification it may be advantageous to consider the overall decoder operation for a particular program instruction. Assume that the latter is a $P_1$ instruction corresponding to a program numeral 9 meaning "reset register." The binary number corresponding to the arabic numeral 9 is 1001 which, when read from the storage drum, would produce positive energizations of the trunk lines 520, 525, 526 and 523. Accordingly at the $P_1$ mode and +A pulse times, the AND gate 223 in controlling the AND gates 218*a*–221*b* would cause the storage trigger 218 to be turned on, the triggers 219 and 220 to be turned off if they were on at this time, and the trigger 221 to be turned on. At the succeeding I mode and ± digit times, the AND gate 230 in controlling and AND gates 225a–228b would cause the decoder triggers 225 and 228 to be turned on (or to remain on) and the triggers 226 and 227 to be turned off (or to remain off). This condition of the triggers 225–228 developes a positive output potential in the output circuit 241 of the gate 233 and develops a positive potential in the output circuit 244 of the gate 236. These positive potentials in turn produce a positive potential only in the output circuit 272 of the gate 256, thereby decoding the program instruction and identifying it as the program instruction 9 which corresponds to the assumption previously made.

Operation of the DECODER continues as long as the AND gate 230 is conditioned by a positive potential applied to the calculate control circuit 116, and this is as long as the FIG. 4 MACHINE PROGRAM calculate trigger 115 is on during the calculate interval.

The reason for providing the two sets of storage triggers, namely the storage triggers 218–221 and the decoder triggers 225–228, in the DECODER may be pointed out. Obviously, the program instruction must be received to be read for execution prior to the time that the detail data to which the instruction relates is read out of storage into the calculating machine. Accordingly the program instruction is read, as previously mentioned, in the sector preceding that in which the detail data to be processed is read out of storage. Since the program instruction is read during one sector and must be available for use during an entire following sector, and not merely a portion of it, the program transient storage occurs in triggers 218–221 but is transferred for sector interval storage to the decoder triggers 225–228 where it is retained to develop a corresponding output program instruction voltage during the entire sector time. During the latter interval, therefore, the temporary storage triggers 218–221 are available to provide temporary storage of the next program instruction. In this manner each program instruction is received and temporarily stored during one sector interval but is restored and decoded for use during the entire succeeding sector interval.

PROGRAM INSTRUCTION AND DATA INPUT MATRIX

It is the function of the INPUT MATRIX to receive from the reading station of the tabulating machine both program instructions and data to be processed as recorded on the program and data cards, and to supply this information in proper sequence and at proper times for mode storage on the storage drum. The calculating machine herein described is arranged for use with a business machine having eighty reading brushes at the reading station and thus one using standard tabulating cards having index-points arranged in eighty-point columns with at least nine rows of columns and with one or more rows used for calculating machine control purposes.

As earlier mentioned, four program cards are supplied in successive pairs to the reading station and the programs are stored in appropriate mode form on the storage drum. Thereafter, detail data cards are successively read at the reading station and the previously recorded program instructions are performed on the data periodically supplied by the data cards. This data is initially stored in the I modes of the digit subsectors of each sector, and after all data from a given card has been thus stored, the calculating machine automatically transfers the stored data in each I mode to an associated C mode. As thus stored in the C mode, the transferred data is available for processing by calculation under program instruction while the I modes are free to receive storage of new data from the next data card read at the reading station.

The INPUT MATRIX is shown schematically in FIGS. 10, 11 and 12 which should be considered together arranged as shown in FIG. 13. The INPUT MATRIX is comprised in large part of a matrix of AND gates and OR units. As here shown schematically, rows of AND gates are arranged in rows identified as ± and 1–8 and also in twelve columns identified as Ia–XIIa for simplicity. Any individual gate will hereinafter be identified simply by its position in a particular row and column by reference to the row and column identification. There are applied to one input circuit of the AND gates of the ± row digit pulses developed in the output circuit $51_O$ of the ± digit trigger 51 of the digit ring described in connection with FIG. 3. There are similarly applied to an input circuit of each of the AND gates in the other rows 1–8 digit pulses generated in the respective output circuits $52_O$–$59_O$ of the respective digit triggers 52–59 of the FIG. 3 digit ring.

Thus each of the gates in each row has periodically supplied thereto digit pulses from one of the triggers of the digit ring. The other input circuit of these AND gates is connected to the reading brushes at the reading station of the business machine. This connection, however, is arranged in one manner while reading program cards and in another for reading detail data cards. Thus, the numerals appearing in circles in FIGS. 10 and 11 designate the particular numbers of the reading brushes at the reading station when arranged to read program cards, and it will be seen that the first reading brush is connected to an input circuit of the AND gate IaS while brush number 72 (brushes 73–80 of the reading station are not used at this time) is connected to the AND gate XIIa4.

This is the connection of the reading brushes while reading the first program card of each pair, and the reading brush connections are then switched by relay control during reading of the second program card of each pair. This relay switching control forms no part of the present invention, and accordingly is not shown, but is actuated by a control hole punched at a selected index-point in the control row of the tabulation card. After relay switching, the first reading brush is connected to the AND gate Ia3 as indicated by the encircled primed numeral and the thirty-sixth reading brush is connected to the AND gate XIIa1 again as indicated by the encircled numeral 36′. These connections of the reading brushes provide 72 reading positions for the first program card and 36 reading positions for the second program card of each pair, giving a total of 108 program instructions for each pair of program cards.

After the reading of the program cards has been completed, the connection of the reading brushes to the AND gates is again switched under relay control. In this case the eighty reading brushes are connected conventionally through eighty input switching relays (not shown) to 80 brush output plug hubs, which may then be plugged to 80 of 108 input plug hubs, and subsequently to eighty AND gates, the first such brush being here shown as connected to the gate IIIa1 as indicated by the numeral 1 enclosed in a rectangle and succeeding brushes being connected to the AND gates in succession in their arrangement in columns as shown with the eightieth brush connected to the AND gate XIa8 as indicated by the numeral 80 enclosed in a rectangle. It may be noted that there are 108 digit storage spaces (including the word algebraic signs) available, and the actual connections of the eighty reading brushes to the available 108 INPUT MATRIX gates will be determined in practice by the nature and extent of particular programmed calculations which it is desired shall be performed on specific detail data information involved in each given situation. To this end, the calculating machine is initially set up for each problem by the use of conventional control panels, not shown, through which the reading brushes are connected as desired to the 108 memory input positions above mentioned.

The output circuits of the AND gates are connected in groups of three to OR units which in turn are connected to multiple input circuits of an OR unit for each column of AND gates. These terminal OR units for each column of AND gates are identified as Ic5–XIIc5, and have respective output circuits 300–311 which comprise one input circuit of AND gates 312–323, as shown. The other input circuit of the AND gates 322, 323 and 312–321 are comprised by the respective output circuits $61_O$–$72_O$ of the sector ring of the FIG. 3 address rings.

All of the output circuits of the AND gates 312–323 are connected to a twelve-input circuit OR unit 325 having an output circuit 326 which comprises one input circuit of an AND gate 327. The other input circuit of this gate is comprised by the output circuit of an OR unit 328 having three input circuits which are comprised by the output circuits of three AND gates 329, 330 and 333. One input circuit of the gate 329 is comprised by the output circuit $48_O$ of the $P_1$ mode trigger 48 of the FIG. 3 mode ring, one input circuit of the AND gate 330 is comprised by the output circuit $49_O$ of the $P_2$ mode trigger 49, and one input circuit of the AND gate 331 is comprised by the output circuit $40_O$ of the I mode trigger 40 of the mode ring. The other input circuit of the AND gate 329 is connected to the movable contact 332 of a relay having a grounded stationary contact 333 and a stationary contact 334 connected to the movable contact 335 of a second relay having a fixed grounded contact 336. The second input circuit of the AND gate 330 is connected to a movable contact 337 (mechanically connected to the movable contact 332 as indicated by the broken line), which engages a fixed grounded contact 338. The second input circuit of the AND gate 331 is connected to the movable contact 339 (mechanically connected for movement in unison with the movable contact 335 as indicated by the broken line) which engages a fixed grounded contact 340.

The output circuit 441 of the AND gate 327 is connected to an input circuit of four AND gates 442–445. These gates 442–445 have a second respective input circuit 446–449 which are connected to individual ones of four binary coding cam actuated contacts on the business machine and operated in synchronism with the movement of a tabulating card from row to row of the index-points of the card. These cam actuated contacts supply positive potentials to the gate input circuits 446–447 in a manner which identifies by binary code the number of the index-point row being read by the reading brushes at any time as the tabulating card moves through the reading station of the business machine.

Thus, the input circuit 446 alone will be energized (corresponding to the binary 1) when the reading brushes are on the first row of index-points of the tabulating card, while only the input conductor 447 will be energized (corresponding to the binary numeral 2) when the reading brushes are on the second row of index-points of the tabulating card. Both of the conductors 446 and 447 will be energized (corresponding to the binary numeral 3) when the reading brushes are on the third row of index-points, while only the input circuit 448 will be energized (corresponding to the binary 4) when the reading brushes are on the fourth row of index-points. Input conductors 446 and 448 are energized (binary 5) for the fifth row, and input conductors 447 and 448 are energized (binary 6) for the position of the reading brushes on the sixth row. In similar fashion, input circuits 446, 447 and 448 are energized for the seventh row, only input circuit 449 for the eighth row, and both input circuits 446 and 449 for the ninth or S (the ± sign) row. In regard to the last mentioned energization, it should here be pointed out that a positive algebraic sign is represented by a zero, whereas a negative algebraic sign is represented by the numeral nine. This will become more apparent in the subsequent description of the calculating operation.

The respective output circuits 450–453 of the AND gates 442–445 comprise one input circuit of respective OR units 454–457, the output circuits of the latter constituting an input circuit of respective AND gates 458*a*–461*a*. Associated with the latter gates in a paired-gate arrangement are AND gates 458*b*–461*b*, each having an input circuit comprised by respective OR units 462–465, the input circuits of which are comprised by the output circuit of an OR unit 466. The latter has four input circuits as follows: first, an input circuit 477 which is connected through a manually operable switch 478 to a source of positive potential indicated as having a value of 100 volts, and second, third and fourth input circuits comprised by the output circuits of respective AND gates 480, 481 and 482. One input circuit of the AND gate 480 is comprised by the output circuit $40_O$ of the I mode trigger 40 of the mode ring of FIG. 3, one input circuit of the AND gate 481 is comprised by the output circuit $48_O$ of the $P_1$ mode trigger 48 of the mode ring, and one input circuit of the AND gate 482 is comprised by the output circuit $49_O$ of the $P_2$ mode trigger 49 of the mode ring. The second input circuit of the gate 480 is connected to a movable relay contact 483 which engages a stationary grounded contact 484 or a stationary contact 485 which is connected to a fixed contact 486 of a cam actuated grounded movable contact 487. The other input circuits of the AND gates 481 and 482 are connected together to a movable relay contact 488, mechanically connected for movement in unison with the movable contact 483 as indicated by the broken line, which engages a contact 489 connected to the contact 486 or engages a fixed grounded contact 490.

The other input circuit of each of the AND gates 458*a*–461*b* is comprised by the output circuit 491 of a polarity inverter 492 having a differentiating type of input circuit to change translated —A pulses from rectangular pulse to triangular pulse wave form. The —A pulses are applied to the input circuit of the inverter 492 from the output circuit $23_O$ of the pulse generator of FIG. 2. The output circuits of the AND gates 458*a*–461*b* are coupled to individual input circuits of respective dual-channel write amplifiers 493–496 having output circuits which include the unit and zero write head energizing windings identified by the same reference numeral as the associated amplifiers but with respective *a* and *b* subscripts. As thus arranged, the write head 493*a* records the binary 1 digit, the write head 494*a* the binary 2 digit, the write head 495*a* the binary 4 digit, and the write head 496*a* the binary 8 digit. The write heads 493*b*–496*b* may record a zero in the absence of a binary 1, 2, 4 or 8.

In considering the operation of the INPUT MATRIX just described, it may be stated at the outset that manual actuation of the switch 478 places a positive potential through the OR unit 466 and the OR units 462–465 upon the AND gates 458*b*–461*b* to condition these gates to translate repetitive —A pulses from the inverter 492 to the zero channel of the amplifiers 493–496. This causes zeros to be recorded in all modes of the recording drum, thus to clear the drum of all previously stored program instructions and previous data information.

To store the $P_1$ and $P_2$ program instructions, the switch 478 is opened and the program cards which are then fed to the reading station automatically effect relay actuation to provide the program connections of the reading brushes 1–72 (first and third cards) and 1′–36′ (second and fourth cards) to the AND gates of the INPUT MATRIX. These cards also effect relay energization (1) to move the relay contacts 483 and 488 to engage their respective contacts 484 and 489, and (2) to effect movement of the relay contacts 335 and 339 to disengage the relay contact 336 and to engage the relay contact 340. Movement of the relay contacts 483 and 488 to engage their respective contacts 484 and 489 renders the AND gate 480 ineffective to translate any I mode pulses, since one input circuit of this contact is connected to ground through the relay contacts 483 and 484, and conditions the AND gates 481 and 482 to translate respective $P_1$ and $P_2$ mode pulses during a very short interval just prior to the card reading time when the cam actuated contacts 486 and 487 are disengaged. $P_1$ and $P_2$ mode pulses translated by the AND gates 481 and 482 through the OR units 466 and 462–456 cause zeros to be written in the $P_1$ and $P_2$ modes of the drum at the outset of the card reading cycle so that any previous program instructions are erased and the program modes are available to store new program instructions.

In this regard, it will be noted that it is thus possible to change the program instructions at any time without affecting initial or processed data stored at this time in other modes of the storage drum, such being accomplished merely by feeding new program cards into the reading station of the business machine.

The actuation of the relay contacts 335 and 339, previously mentioned, by the program cards grounds one input circuit of the AND gate 331 and thus prevents translation by this gate of any I mode pulses. At the same time, opening of the relay contacts 335–336 conditions one of the AND gates 329 or 330 to translate $P_1$ or $P_2$ mode pulses, the first pair of program cards leaving the relay contacts 337 and 338 in engaged position to ground one input circuit of the AND gate 330 and prevent translation of $P_2$ mode pulses at the time that the AND gate 329 is conditioned to translate $P_1$ mode pulses. The second pair of program cards energize the relay contacts 332 and 337 to ground one input circuit of the AND gate 329 and thereby terminate any translation of $P_1$ mode pulses while at the same time conditioning the AND gate 330 to translate $P_2$ mode pulses.

Thus as the first pair of $P_1$ program cards is read at the reading station from row to row of the 72 index-points on the first card and the 36 index-points used on the second card, the sector pulses applied to the AND gates 312–327 and the digit pulses applied to the rows of AND gates of the INPUT MATRIX cause the reading brush potentials to be translated through the OR unit 325 to the AND gate 327. This gate is controlled at $P_1$ or $P_2$ mode times by the AND gates 329 or 330 (the AND gate 331 being closed at this time by closure of the contacts 339, 340) to effect translation of the program instructions to the AND gates 442–445 for appropriate conversion to corresponding binary numerical form by the cam actuated energizations of the input circuits 446–449 of these gates. The potentials translated through the gates 442–445 are applied through OR units 454–457 to the gates 458a–461a, which conduct at −A pulse time to effect translation by the amplifiers 493–496 of the binary form program instruction to the write heads 493a–496a and thereby effect program storage in the $P_1$ and $P_2$ modes on the storage drum.

In thus storing the program instructions, it will be noted that the reading brushes are connected in order from one column to another through the AND gates of the INPUT MATRIX, and further that columns of gates are associated with individual ones of the AND gates 312–323 which are controlled by individual ones of the sector pulses I–XII. By this arrangement the sector pulses in controlling the gates last mentioned cause all of the program instructions to be stored in succession in the $P_1$ mode of successive ± digits from sector 1 through sector 12, thereafter in the first digit subsector successively from sector 1 through sector 12 and so forth until all $P_1$ program instructions have been stored. The $P_2$ programs are stored in the $P_2$ modes in the same fashion. This storage of all program instructions contained on one card requires a total of approximately 35 drum revolutions, including idle revolutions between brush impulses, for its completion.

One further fact should be noted at this point in connection with the program instruction storage. While the gates 312–323 are controlled by sector pulses which designate the position of the read heads on the storage drum at any given moment, the write heads precede the read heads by one sector plus one mode spacing as earlier mentioned, so that sector-one time as referred to the read heads is actually sector 12 time as referred to the write heads. It will be helpful to keep this fact in mind when considering the storage of data information, remembering also that program instructions are stored one sector in advance of the data storage to which the program instruction relates to enable the program instruction to be read and decoded and thereby to be available for use at the time the data storage is read and its processing initiated.

It may be helpful to trace one specific program instruction through the INPUT MATRIX to storage in order to clarify the INPUT MATRIX mode of operation. Assume that the instruction under consideration is that to be written into the $P_1$ mode of the ± digilt of the twelfth sector so that it will be available for operation on the data information stored in the first sector data modes. This assumed program instruction is fed by the program card and the first reading brush into the IaS AND gate, which opens up at the ± digit time to translate the brush potential through the succeeding OR units to the input circuit of the AND gate 322. The latter opens up at the I sector time (remember that this is the I sector time of the read heads but is the twelfth sector time of the write heads). Thus at I sector time the brush potential is translated through the OR unit 325 to the AND gate 327 which, under control of the AND gate 329, opens up at the $P_1$ mode time and applies the potential to the AND gates 442–445. Assume that the program instruction is a "reset register" one corresponding to instruction number 9. This program instruction is punched at the first index-point position (brush number 1) of the ninth row of index-point columns, so that when the instruction is read by the reading brush the input circuits 446 and 449 of the AND gates 442 and 445 are energized in the manner above described. The brush potential is accordingly translated by the AND gates 442 and 445 at −A pulse time (under control of the AND gates 458a and 461a and the polarity inverter 492) to the write amplifiers 493 and 496. The latter energizing the write head windings 493a and 496a cause the program instruction to be stored in the $P_1$ mode (gate 329) of the ± digit (gate IaS) of the twelfth sector (gate 322) precisely at mode time (−A pulses through inverter 492).

After the program cards have been read and the program instruction stored, data cards are supplied in succession to the reading station of the business machine. During all data card reading cycles, the relay contacts 483 and 488 are no longer in energized positions and the input circuit of the AND gate 480 is accordingly connected to cam actuated contacts 486, 487. Thus at the outset of each card cycle, the cam contacts 486, 487 close to cause the AND gate 480 to translate I mode pulses through OR units 466 and 462–465, AND gates 458b–461b and write amplifiers 493–496 to the write heads 493b–496b to write zeros in all of the I modes of the storage drum. This erases any previous data storage in these modes and conditions them to receive new data storage from the data card to be read during the particular card cycle. Previous to the time these I modes are so cleared, any information stored in them will be automatically transferred in the manner earlier mentioned to C mode storage in the drum where it is available for program processing. The relay contacts 332, 337 and 335, 339 are also in deenergized position during data card reading time. This connects one input circuit of both AND gates 329 and 330 to ground and prevents further translation of $P_1$ and $P_2$ mode pulses, while at the same time removing the ground connection from the input circuit of gate 331 to permit translation of I mode pulses to the gate 327.

The reading brushes are reconnected under relay switching control, and it will be noted that this connection (shown by numerals corresponding to brush numbering but enclosed by rectangles) is such that the reading brushes are connected successively to the successive AND gates as arranged in columns in the INPUT MATRIX. Since these columns of AND gates have output circuits connected through OR units to an individual one of the sector time controlled gates 312–323, and since the column arranged gates are opened up in succession in their columnar arrangement by the digit time pulses applied to these gates, there is the result that the data information read by the reading brushes in order from number 1 to number 80 is stored on the storage drum in the I modes of successive digits in inverse order of arrangement in each sector, and sequentially from sector to sector, so that the lowest digit orders enter storage first. Note also that reading brush 8 is connected to the AND gate III*a*1 which is opened up by first-digit pulses and supplies its output to the AND gate 312 controlled by the third sector pulse. Since the write heads are positioned in sector 2 at the sector 3 time (the read head position), the initial storage of data information from reading brush eight will actually occur in digit subsector 1 of sector 2.

It may be stated at this point, and as will presently become more apparent, that this information storage occurs in the I mode of the first digit subsector of the second sector as last mentioned, and it will be explained in detail later how this is a temporary storage and that in fact the detail data is transferred from the I mode of digit one of sector II to the C mode of digit one of sector I where it is available for purposes of calculation. Thus data information actually written into sector 2 at read head sector 3 time (the gate 312) ultimately ends up in the C mode of the first sector where it is positioned for program control of the $P_1$ and $P_2$ program instructions stored in the preceding sector 12 as described above.

It will be helpful to trace by way of example a particular bit of data information through the INPUT MATRIX to drum storage. Assume that this data information is punched at index-point number 22 of the fourth row of index-point columns. At the reading station, reading brush number 22 will be energized during the fourth-row card reading interval, and during the fifth digit time gate V*a*5 will be opened up by a fifth digit pulse and translate the brush potential to the AND gate 314. At sector V time (write heads sector IV time), the gate 314 will translate the brush potential through the OR unit 325 to the AND gate 327. The latter under control of the AND gate 331 will open up at I mode time, and will translate the brush potential to the AND gates 442–445. It was assumed that the punched index-point occurs in the fourth row of index-point columns, at which time during the card reading cycle only the input circuit 448 of the AND gate 444 is energized by the cam actuated coding contacts. The reading brush potential is accordingly translated by the AND gate 444 and the OR unit 456 to the AND gate **460*a*. The latter conducts at −A pulse time (under control of pulses translated through the inverter 492), and the gate 460*a* accordingly applies the brush potential to the amplifier 495 which translates it to the write head energizing winding 495*a*. The bit of data information is thus stored as a binary 4 in the I mode (gate 331**) of the fifth digit (gate V*a*5) of the fourth sector (gate 314 controlled at read head V sector time) and precisely at −A time (from the inverter 492) on the storage drum.

In summary of the INPUT MATRIX operation, it will be apparent that the digit pulses and sector pulses applied to the INPUT MATRIX effect distributed storage of data information into the I modes (the AND gate 331) of each successive digit subsector of successive sectors insofar as such data is recorded on the cards in index-point columns. The coding gates 442–445 effect coding of the stored data information to define its index-point location in the several rows of index-point columns. It will also be apparent that the INPUT MATRIX insures proper drum storage of the $P_1$ and $P_2$ instruction programs in predetermined spatial relationship on the storage drum to the stored data to which a particular program instruction relates.

OUTPUT MATRIX

The purpose of the OUTPUT MATRIX is to take the results of the processed data stored in the O modes of the storage drum and to supply this data, after suitable decoding as it was stored on the drum, to a punching station which follows the reading station of the business machine. At the punch station, the results of the data processing may be either punched into the same card from whence the processed data was originally taken or a blank card may be substituted for the data card in transit between the reading and punching stations and the results of the data processing recorded by punching this blank card. Such substitution of a blank card for the data card is often desirable, for example, where the latter contains so much recorded data information that there is not sufficient room left on the data card within which to record the results of the data processing.

The OUTPUT MATRIX is schematically shown in FIGS. 14 and 15 which should be considered together in the manner shown in FIG. 16. The read heads associated with the binary storage tracks 11, 12, 13 and 14 of the storage drum are represented in FIG. 14 by the respective windings 500–503 which are connected to the input circuits of respective amplifiers 504–507. Zeros are stored on the magnetic drum with a magnetic polarity opposite to that of a stored binary digit, so that the output voltage of the read heads 500–503 will effectively be of sinusoidal wave form for successively stored zeros or ones but will experience an effective 180° phase reversal at the moment where a one is followed by a zero or a zero is followed by a one.

Thus referring to FIG. 16–1, which graphically represents certain voltage relationships occurring in the drum reading and writing operations, the relation of the drum surface to a head structure H is indicated and curve *a* represents the voltage induced in a read head for a stored one followed by a zero followed in turn by a one which are stored respectively in the I, M and C modes. The broken line portion of this curve indicates how the voltage would vary in the hypothetical case where neither a one nor a zero is stored in the M mode, and clearly points up the 180° phase change which does occur when a one stored in the I mode is followed by a zero in the M mode which is followed by ones in the C and O modes. The output voltages of the read heads 500–503 are amplified and shaped to a voltage essentially of rectangular pulse wave form in their respective output circuits 508–511, as represented by curve *b* of FIG. 16–1, and this voltage is inverted by respective polarity inverters 516–519 to the form represented by curve *c*.

Binary track triggers 512–515, having associated input circuit AND gates identified with the same reference numeral as the trigger but with *a* and *b* subscripts, have the output voltages and inverted output voltages of the amplifiers 504–507 applied through their input gates to their respective off and on input circuits. There are also applied to both input gates −A pulses, represented by curve *d* of FIG. 16–1, translated through a differentiating polarity inverter 519. The trigger input gates are of the Harper type having, as shown in FIG. 16–1, a rectifier D to which the +A pulses are applied, a resistor R to which the amplifier or inverter voltage is applied, and a condenser C which couples the rectifier D and resistor R to the input circuit of the trigger having inherent input circuit conductance represented by the broken line resistor $R_1$. In this form of gate, the amplifier or inverter output voltage charges the condenser C, and the −A pulses produce with this charge voltage a resultant voltage represented by curve *e* for the "*a*" gate and by curve *f* for the "*b*" gate. The resultant voltage produced in the input circuits of the triggers for the illustrative example above assumed is accordingly that represented by curve *g* for the "*a*" gate and by curve *h* for the "*b*" gate. As shown by curve *i*, the track trigger (for the example assumed) would be turned on by the first pulse of curve *g*, would be turned off by the pulse of curve *h*, and would again be turned on by the second pulse of curve *g* to remain on for the third pulse of the latter. The output voltage of the trigger thus indicates that a one was stored in the C mode, a zero in the M mode, and ones in the C and O modes.

To diverge for a moment, it may be helpful at this point to consider more specifically the precise nature of the write-in operation by which data is stored in the drum. Curve *j* of FIG. 16–1 assumes by way of example that the output of the trigger last considered is applied directly to a binary-digit write amplifier input gate, such as the gate 458*a* of FIG. 12. These amplifier input gates are of the Harper type having the configuration shown in FIG. 16–1, and each trigger output pulse charges (as an exponential function of time) the gate condenser C. The —A pulse occurring at the initiation of the trigger pulse is ineffective to open the gate since the condenser is uncharged at that time. The —A pulse occurring at the end of the trigger pulse is effective, however, sharply to discharge the condenser as indicated by curve *j* to produce a sharply defined and precisely timed pulse in the gate output. It is this pulse which is amplified by the write amplifier and applied to the write head. Curve *k* of FIG. 16–1 represents the operation of the companion zero input gate (i.e. gate 458*b*) for this trigger under the same assumption. Note in regard the writing operation that the write pulse of the write amplifier is developed at the end of the mode time, whereas read-out from the drum occurs at the outset of the mode time. This has the important advantage that the disturbance occasioned by the large amplitude write current supplied to the write heads does not impair the required high sensitivity of the read-in amplifiers at read-in time. This fact, of course, enables much higher speed of operation than heretofore readily available and read-out within a ten microsecond interval after writing is readily accomplished. The further fact that the full mode interval is available between read-out and write-in itself has the important advantage that minimum attention need be given to wide-band low-phase-shift translating channels and high-quality gate components in a calculating machine embodying the present invention.

The output circuits 520–523 of the respective track triggers 512–515 are trunk lines which when at elevated voltage (the associated trigger being on) indicate storage of a binary 1, 2, 4 and 8. The output circuits 524–527 of these triggers when at elevated voltage with their associated triggers off all indicate storage of zeroes. These trunk line 520–527 comprise one input circuit of a plurality of AND gates 528–535 arranged as shown in FIG. 15. The energizing circuits 446–449 of the cam actuated code contacts (previously referred to in connection with the INPUT MATRIX of FIGS. 10, 11 and 12) comprise a second input circuit of the respective AND gates 529, 531, 533 and 535, and are connected to the input circuits of respective phase inverters 536–539 having output circuits which comprise input circuits of the respective AND gates 528, 530, 532 and 534. This arrangement provides decoding of the binary digits stored at any moment in the track triggers 512–514. For example, if the track trigger 512 stores a one binary digit, its output conductor 520 conditions the AND gate 529 to open up when the cam actuated binary code circuit 446 is energized. On the other hand, had the track trigger 512 stored a binary zero, so that its output conductor 524 had an elevated positive potential impressed on it, the binary one cam circuit 446 when deenergized would cause the inverter 536 to open the AND gate 528 and translate the potential appearing on the conductor 524.

The output circuit of the AND gates 528–535 comprises input circuits of OR units 594–597, the output circuits of the latter comprising four input circuits of an AND gate 598. This gate is opened up by O mode pulses applied thereto from the output circuit $43_O$ of the O mode trigger 43 of the mode ring of FIG. 3, and thus is opened when the read heads are over each O mode of the digit subsectors of each sector. The output circuit of the AND unit 598 comprises one input circuit of each of a plurality of AND gates 599–607, the other input circuits of which are comprised by the respective output circuits $51_O$–$59_O$ of the digit ring triggers of the FIG. 3 address rings. Thus the AND gates 599–607 open consecutively starting with the ± digit time through the eighth digit time and translate to their respective output circuits $599_O$–$607_O$ whatever output pulses appear in the output circuits of the AND gate 598 at O mode time and at the digit time when the particular one of the gates 599–607 is open. The output circuits $599_O$–$607_O$ of these gates control gaseous discharge devices which in turn control the punches at the punching station of the business machine.

In order better to understand the operation of the OUTPUT MATRIX it may be helpful to consider a specific example. Suppose that the binary number recorded on the storage tracks of the storage drum and appearing under the read heads 500–503 at a given moment has the binary form 1001. This would cause the trunk line circuit 520 of the track trigger 512 and the trunk line circuit 523 of the track trigger 515 to have elevated potentials to indicate that these triggers stored a binary one and a binary 8, whereas the trunk line circuits 525 and 526 of the track triggers 513 and 514 would be at an elevated potential (to indicate that these triggers store binary zeros). With the trunk lines thus energized, it will be apparent from inspection that the four input circuits of the AND gate 598 are not all raised to a positive potential by the output circuits of the OR units 594–597 until the sequence of decoder energization of its circuit 446–449 is such that both of the circuits 446 and 449 are energized at the time that the circuits 447 and 448 are deenergized. The energized conductors 446 and 449 open the AND gates 529 and 535 since these gates have positive potentials applied to them from the respective trunk lines 520 and 523. The OR units 594 and 597 thereupon supply positive potentials to the AND gate 598. On the other hand, since the conductors 447 and 448 are not energized at this time, the outputs of their respective inverters 537 and 538 cause the AND gates 530 and 532 to open since these gates have positive potentials applied to them by the respective trunk lines 525 and 526. Thus the OR units 595 and 596 also supply positive potentials to the AND gate 598 which thereupon opens on the O mode pulse applied by the output circuit $43_O$ of the FIG. 3 mode ring.

In opening, the gate 598 translates a positive potential to the AND gates 599–607, and if it be assumed that the read heads at the moment are over the O mode of the second digit, only the gate 601 will open at this time by virtue of the second digit pulse applied to it from the output circuit $53_O$ of the FIG. 3 digit ring. Thus under the assumed conditions, a positive output pulse is applied only to the output circuit $601_O$ of the gate 601 and this output controls the operation of the punching station at that moment. For the calculating machine herein described, the punch station utilizes a field or block of index-points nine wide so that in the example above selected the second index-point in the ninth row (the binary 1001 number chosen for the example corresponding to the Arabic numeral 9) of this field would be punched at the punching station.

The gaseous discharge devices mentioned above have a second control element which is controlled by sector pulses in blocks of nine. Thus, while the pulse emitted by 601 in the illustration above may be applied to each second digit gaseous discharge device of each sector block of 9 such devices, the sector pulse from the appropriate sector trigger, which for illustration may be address-ring trigger 65 (sector 5), will select that gaseous dsicharge device which will represent the output of sector 5 digit 2.

It will be apparent from the foregoing description of the OUTPUT MATRIX that the binary number stored by the track triggers 512–514 at each O mode time is continuously available for decoding and translation to the punching station.

DATA TRANSFER FROM I MODE STORAGE TO C MODE STORAGE

It has previously been explained that data from the cards read at the reading station is temporarily stored in the I or input modes of the storage drum and after all such information from each card has been thus stored the calculating machine automatically transfers this stored information from the I mode to storage in the C mode. This leaves the I or input mode available for storage on information from a second card while the information which has been transferred to the C mode is available to be processed under program instruction.

The arrangement of the calculating machine in effecting this transfer of information from the I to the C mode employs an adder having a construction shown schematically in FIG. 17, which should be considered in conjunction with FIGS. 12 and 14 in the manner shown in FIG. 18. The adder arrangement of FIG. 17 receives a binary number in parallel form and supplies a binary number output also in parallel form. For the present purposes only the binary number storage and translation characteristics of the adder will be considered, and a description of its function as an adder in other calculation operations will be deferred until a later time when that function becomes important.

The adder includes a plurality of triggers 615–618, which are initially reset off by the machine reset line (not shown) and respectively translate the binary 1, 2, 4 and 8 digits. The two input circuits of each of these triggers includes an OR unit identified by the same reference numeral but with an "*a*" subscript for the off input circuit and a "*b*" subscript for the on input circuit of the trigger. One input circuit of the OR units 615*a*–617*a* is comprised by the output circuit of a respective AND gate 619–621, while one input circuit of the OR unit 618*a* is comprised by an output circuit of an OR unit 622 having two input circuits comprised by the ouput circuits of AND gates 623 and 624. The OR units 615*b*–617*b* have one input circuit comprised by the output circuit of a respective AND gate 625–627, while one input circuit of the OR unit 618*b* is comprised by the output circuit of an OR unit 628 having two input circuits comprised by the output circuits of AND gates 629 and 630. Other input circuits of the OR units 615*a*, 615*b* is comprised by the output circuits of an OR unit 631, and the other input circuits of the OR units 617*a* and 617*b* is similarly comprised by the output circuit of an OR unit 632. The second input circuits of the OR units 616*a* and 616*b* is comprised by the ouput circuit of an AND gate 633, while the second input circuit of the OR units 618*a* and 618*b* is similarly comprised by the output circuit of an AND gate 634.

Referring now to FIG. 14 the trunk lines 520 and 524 of the track trigger 512 comprise one input circuit of respective AND units 635 and 636, the other input circuit of which is comprised by an OR unit 637. Similarly, the trunk lines 521 and 525 of the track trigger 513 comprise input circuits of respective AND gates 638 and 639, the trunk lines 522 and 526 of the track trigger 514 comprise input circuits of the respective AND gates 640 and 641, and the trunk lines 523 and 527 of the track trigger 515 comprise input circuits of AND gates 642 and 643. The other input circuits of the AND gates 638–643 is comprised by the output circuit of the OR unit 637 which has a number of input circuits of which one is comprised by the output circuit 107 of the AND unit 105 of MACHINE PROGRAM described in connection with FIG. 4. It will be recalled from the description of the latter that the output circuit 107 is energized at I mode times during the period when the I to C trigger 103 is turned on immediately after operation of MACHINE PROGRAM has been initiated by a start pulse received from the business machine.

The potential thus applied to the circuit 107 at I mode times is translated through the OR unit 637 to condition the several gates 635, 636 and 638–643 to translate the binary number stored in the track triggers 512–515 at I mode time. The binary numbers so translated are applied to individual ones of a plurality of OR units 644–651, which have respective output circuits 652–659 comprising input circuits of the respective AND gates 625, 619, 626, 620, 627, 621, 629, and 624 of the adder. The other input circuit of all of these AND gates is comprised by the output circuit of an OR unit 677 having plural input circuits of which one is the output circuit 107 of the AND gate 105 of the MACHINE PROGRAM which, as just explained, translates I mode pulses during the on period of the I to C trigger 103. Accordingly, both input gates of the adder triggers 615–618 are opened up at the same time that the output gates 635, 636, and 638–643 of the track triggers 512–515 open and the binary number stored in the latter at each I mode time is transferred in parallel fashion to the adder triggers 615–618 at the time the trailing edge of the I mode pulse occurs.

Thus if the track trigger 512 stores a one binary digit, thereby raising the potential of its trunk line conductor 520, the elevated output potential of the conductor 520 in being translated through the gate 635, the OR unit 645, the conductor 653, the AND gate 619, and the OR unit 615 would cause (in conjunction with the I mode pulse applied to the gate 619) the adder trigger 615 to be turned on if it had previously been off or to leave it on if that had been its previous condition. Likewise the adder trigger 616 would change to the same condition as the track trigger 513, the adder trigger 617 would change to the same condition as the track trigger 514, and the adder trigger 618 to the same condition as the track trigger 515 so that the adder triggers would store the same binary number as was stored by the track triggers at this time. Accordingly the off trunk line 661 of the adder trigger 615 would have an elevated potential if the adder trigger 615 stored a one binary digit, or the trunk line 660 of this trigger would have an elevated potential if the trigger stored a zero. This would likewise be true for the trunk lines 662 and 663 of the adder trigger 616, the trunk lines 664 and 665 of the adder trigger 617, and the trunk lines 666 and 667 of the adder trigger 618.

The last mentioned trunk lines comprise individual input circuits of the respective AND gates 668–675, the other input circuit of each of which is comprised by the output circuit of an OR unit 676. The latter has plural input circuits of which one is comprised by the output circuit 108 of the AND gate 106 of MACHINE PROGRAM, which is opened up by C mode pulses during intervals when the I to C trigger 103 is in its on condition at the outset of a MACHINE PROGRAM cycle of operation. The output circuits of the AND gates 668–675 comprise input circuits of the respective OR units 462, 454, 463, 455, 464, 456, 465, and 457. Thus during the C mode times when a positive potential is applied to the MACHINE PROGRAM output circuit 108, the AND gates 668–675 open up and translate the binary number stored in the adder triggers 615–618 through the respective AND gates 458*a*–461*b* to the write amplifiers 493–496 at —A pulse time (these pulses being supplied through the inverter 492 to the gates last mentioned) and the binary number then stored in the adder is thereupon stored in the C modes of individual ones of the digit sub-sectors on the storage drum.

In accomplishing the transfer from the I mode to storage in the C mode as last described, it will be remembered that the I and C pulses applied to the MACHINE PROGRAM gates 105 and 106 follow each other in succession. Therefore, the same binary number that is read-out of the track triggers 512–515 at I mode time is stored also at I mode time in the adder triggers 615–618 and almost immediately thereafter is stored in the C modes of the storage drum. However, it is not stored in the C mode of the same sector in which the number had been stored in the I mode, but rather the C mode storage occurs in the corresponding digit of the preceding sector by virtue of the physical displacement of the read heads and write heads earlier mentioned.

This will be made more clear by reference to FIG. 18–1 which shows the read head and write head spacing of one sector plus one mode. It is assumed in FIG. 18–1*a* that the read head at I mode time is opposite the I mode of digit 2 of sector 3, which places the write head at this time opposite the $P_2$ mode of digit 1 of sector 2. The I mode reading operation occurring at this time causes the number in I mode storage to be read and placed in the adder where it is stored when the adder is advanced on the lagging edge of the I mode pulse (the beginning of M mode time), thereafter making the stored number available in the trunk lines of the adder. FIG. 18–1*b* indicates the positions of the read head and write head at the C mode time when the gates 668–675 are opened up to translate the number stored in the adder to the write amplifier gates **458*a*–461*b*. The latter gates thereupon translate an inverted —A pulse to the write amplifiers 493–496 to energize the write head windings 493*a*–496*b*** at the end of C mode time (see description of OUTPUT MATRIX) at which time the write heads are opposite the C modes of the storage drum. Thus the number read-out of the I mode of digit 2 and sector 3 is written back into the C mode of digit 2 of sector 2.

It will be recalled from the preceding description of the MACHINE PROGRAM operation that the I to C trigger 103 remains on for a total of twelve sector times under control of the timing ring 112, so that the I to C mode transfer of information is completed in one drum revolution.

DATA TRANSFER FROM C MODE STORAGE TO O MODE STORAGE

After all programmed calculating processes have been performed on the numbers stored in the C modes of the storage drum and the results of calculation written back into C mode storage, the results are transferred from C mode to storage in the O mode where it is available for transmission to the punching station of the business machine.

While a description of this operation logically should follow the description of the several calculation operations, the C to O mode transfer is considered at this point since it is so similar to the I to C mode transfer last described. By reference to FIG. 4 and the preceding description of the MACHINE PROGRAM operation, it will be seen that the AND gates 105 and 106 under control of the I to C trigger 103 are duplicated by the AND gates 126 and 127 under control of the C to O trigger 124 with the difference that the latter gates are opened up by C and O mode pulses. Thus when the C to O trigger 124 turns on when the calculate trigger 115 turns off, the C mode pulses translated to the output circuit 128 of the AND gate 126 are applied to the OR unit 637 (FIG. 14) which controls the read-out AND gates 635–643 so that each C mode pulse thus translated opens up these gates and permits the number read-out at C mode time to be applied to the adder triggers 615–618. The translated C mode pulses are also applied to the OR unit 677 of the adder to constitute advance pulses which are applied to the input AND gates of the several adder-triggers. The lagging edge of each such translated pulse causes the adder to store the number read at C mode time. The immediately following O mode pulse is translated to the output circuit 129 of the AND gate 127 of MACHINE PROGRAM and is applied to the OR unit 676 to open up the adder output gates 668–675, thereby permitting the number stored in the adder at O mode time to be translated to the write amplifiers and write heads upon occurrence of the next —A pulse (inverter 492). As before, and due to the physical displacement of the read and write heads, the number read-out of C mode of any digit of one sector is actually stored in the O mode of the corresponding digit of the preceding sector.

It will be recalled from the description of MACHINE PROGRAM that the C to O trigger 124 remains on during twelve sector periods under control of the timer ring 112, so that transfer occurs from all C to O modes during one drum revolution.

*Computation—Addition*

The calculating machine as arranged for arithmetic addition is schematically shown in FIGS. 12, 14, 17, 19, 20, 21 and 22 which should be considered together as arranged in FIG. 23.

In the addition process, a buffer shown in FIG. 19 is positioned between the track triggers of FIG. 14 and the adder of FIG. 17. An 8-position register, shown in FIG. 21, is also included between the output of the adder and the input of the buffer. The control circuit of FIG. 20, employing several triggers initially reset off by the machine reset line (not shown), is used essentially for two functions: first to receive any binary carry from the adder and to reinsert it into the adder on the next addition step; and, secondly, to control the additive process in response to the arithmetic sign of the digits newly entering into an additive step. FIG. 22*a* schematically represents an additional control circuit which operates in response to MACHINE PROGRAM control.

For purposes of the additive process, the adder includes an AND gate 690 having one input circuit comprised by the output circuit 661 of the trigger 615 and a second output circuit comprised by the output circuit $618'_O$ of the trigger 618. The output circuit of this gate comprises an input circuit of the AND gate 633 and also an input circuit of an AND gate 691. The other input circuit of the latter gate is comprised by the output circuit 663 of the trigger 616 which further constitutes an input circuit of an AND gate 692 having an output circuit comprising one input circuit of the OR unit 632. The output circuit of the gate 691 comprises an input circuit of an AND gate 693 having an output circuit comprising a second input circuit of the OR unit 632, the latter having an output circuit comprising one input circuit of each of the OR units **617*a* and 617*b*. The output circuit of the AND gate 691 also comprises an input circuit of the AND gate 623, the other input circuit of which is comprised by the output circuit 665 of the trigger 617. An AND gate 694 includes one input circuit comprised by the output circuit 667 of the trigger 618 and one input circuit comprised by the output circuit 661 of the trigger 615. The output circuit of the gate 694 comprises one input circuit of the AND gate 630**.

The buffer arrangement is essentially identical to that of the adder previously described, has its triggers initially reset off by the machine reset line (not shown), and corresponding elements of the adder and buffer are identified in the buffer by the same reference numerals primed. Further, trigger inputs of the buffer with respect to the output circuits of the OR units 644–651 are the same as that of the adder.

The adder above described is of the type wherein one number may be entered in parallel fashion and a second number may be added to the first number by serial addition. The output of the adder will be in parallel form.

In addition, the adder is so operated in the addition process (and in other process later to be described) as to transform the number entered in the adder to its 9's complement at certain times and to restore the complemented number at other times to true form. In this, it makes use of the coupling circuit illustrated in FIG. 1 of U.S. Patent No. 2,580,771 granted to L. R. Harper. The four adder triggers are intercoupled in a manner that allows the pulsing of a single conductor 696 to cause the number standing in the triggers to be converted to its 9's complement. The operation of the adder to convert a number to its 9's complement is accomplished by supplying a pulse potential to an OR unit 695 having an output circuit 696 which is coupled to an input circuit of the AND unit 631 associated with the trigger 615, an input circuit of the AND gate 692 associated with the trigger 617, and an input circuit of the AND gate 634 associated with the trigger 618. Consideration will show that the applied pulse last mentioned will change the state of conductivity of the adder triggers in accordance with the following table:

TABLE I

[A trigger is indicated to be ON if an X appears in the column, and OFF where an 0 appears. The arrows indicate 9's complement]

| Number | Trigger 615 (1) | Trigger 616 (2) | Trigger 617 (4) | Trigger 618 (8) |
|---|---|---|---|---|
| 0 | 0 | 0 | 0 | 0 |
| 1 | X | 0 | 0 | 0 |
| 2 | 0 | X | 0 | 0 |
| 3 | X | X | 0 | 0 |
| 4 | 0 | 0 | X | 0 |
| 5 | X | 0 | X | 0 |
| 6 | 0 | X | X | 0 |
| 7 | X | X | X | 0 |
| 8 | 0 | 0 | 0 | X |
| 9 | X | 0 | 0 | X |

It will be seen from Table I that a 0 stored in the adder will be converted to a 9 or vice versa, a stored 1 will be converted to an 8 or vice versa, a stored 2 to a 7 or vice versa, a stored 3 to a 6 or vice versa, and a stored 4 to a 5 or vice versa.

Any number stored in the buffer shown, in FIG. 19, may also be complemented or returned from complemented to true form by a pulse applied to its OR circuit 695' in the same manner as last described for the adder.

The adder adds one column of numbers at a time, and if a carry occurs when the 10's column is added the carry is stored and inserted slightly before the 100's column is added. It is for this reason in part that the 8-position stepping register shown in FIG. 21 is used. The register also provides a means for storing an 8 digit number whereby the number can be advanced through the register in the manner that the shifting register operates. For a detailed explanation of this stepping register, reference is made to U.S. Patent No. 2,580,771 and only a brief explanation of the register will be here given. The register includes input trigger units 700–703 which respectively store the binary 1, 2, 4, 8 digits and have input circuit AND gates identified by corresponding reference numerals with *a* and *b* subscripts. The output trunk lines 660–667 of the adder comprise input circuits of respective AND gates 705–712 having second input circuits all connected in common to a conductor 713 which during the additive process is at a positive potential and conditions these gates to translate positive potentials applied to their other input circuits. The output circuits of the gates 705–712 comprise input circuits of respective OR units 714–721 the output circuits of which comprise individual input circuits of the register AND gates **700*a*–703*b*** as shown.

The on and off output circuits of the triggers 700–703 are coupled through AND gates to the second row of triggers 722–725, and these in turn are coupled to a third row of triggers 726–729. The trigger arrangement and connections for the trigger rows 726–729 through rows 746–749 is similar. All of the trigger input gates have one circuit in common comprised by an output circuit of individual ones of several AND gates 750–753. One input circuit of the AND gates 750–753 is comprised by the output circuit of a polarity inverter 754 which includes a differentiating input circuit by which to translate +A pulses while transforming them to triangular waveform. The other input circuit of the latter gates is comprised by an output circuit of an OR unit 755 having two input circuits of which one is comprised by the output circuit of an AND gate 756. One input circuit of the latter gate is comprised by the $P_2$ mode output circuit $49_O$ of the mode address ring (FIG. 3), while the other input circuit is comprised by the output circuit of an OR unit 757 having plural input circuits of which one is comprised by the output circuit 264 constituting the ADD program output of the PROGRAM DECODER (FIG. 8).

The on and off output circuits of the register trigger units 746–749 comprise individual input circuits of AND gates 758–765, the other input circuits of each of which is comprised by the output circuit of an OR unit 766 having two input circuits of which one is comprised by the output circuit of the AND gate 756. The output circuits of the AND gates 758–765 comprise a second input circuit of the OR units 644–651 shown in FIG. 14 and included in the trunk lines of the track triggers.

The register comprised by the trigger units 700–749 operates briefly as follows. It will be noted that the AND gates 750–753 of the register are conditioned by a $P_2$ mode pulse applied from the AND gate 756 and the OR unit 755, and thereupon translate the next −A pulse of the inverter 754 to all of the AND gates associated with the register trigger units. Thus the −A pulse is translated through those register AND gates which have been previously conditioned by a binary number applied to the input row of trigger units 700–703 or stored from row to row thereof to the output trigger units 746–749. This causes the applied or stored binary number to be thereupon entered into and stored in the next succeeding trigger row. Thus an input binary number is stored in the first trigger row 700–703, while the number stored in the latter is transferred to the second trigger row 722–725, etc. Each −A pulse translated by the AND gates 750–753 thereby causes any stored number to transfer one step through the register. After eight such translated pulses, a number entered in the first trigger row 700–703 will have been transferred to the output trigger row 746–749 and will be applied to the AND gates 758–765 for translation by the latter whenever these gates open up upon a $P_2$ pulse translated by the AND gate 756 and the OR unit 766.

The operation to perform a calculation by addition will now be considered, reference being made to the control circuits shown in FIG. 22*a* which effect timing of the machine functions. Assume that a number is standing in the adder and 8-position register at the time an "add" program is called for so that there will be added to this number the digits stored in the C mode of the next sector. At the initiation of the sector where an "add" program is called for, an "add" control potential is developed in the output circuit 264 of the PROGRAM DECODER (FIG. 8) and is applied through an OR unit 767 (FIG. 22*a*) to the input circuits of AND gates 768, 769 and 770. The "add" program potential is also applied to an AND gate 771 and to an input circuit of the OR unit 757 (FIG. 21). At digit times ± and 1–8 and specifically at C mode time of each, the AND gate 771 applies a potential through its output circuit 772 to the read OR unit 637 to open up the AND gates 635–643 and thereby cause the binary-coded decimal number which is read out of the storage drum at each C mode time to be applied to the input AND gates of the buffer triggers 615'–618'. The C mode pulse translated by the AND gate 771 is also translated through the buffer OR unit 677' to cause the buffer triggers to advance and thus store the binary-coded number presented to the input AND gates of these trigger units.

During the ± digit time, the AND gate 770 applies a potential through its output circuit 773 to a true complement control OR unit 774 (FIG. 20) and therethrough to one input circuit of an AND gate 775. If at $T_2$ time of the ± digit a binary 9 is standing in the buffer the output circuit 618'$_O$ of the buffer trigger 618' conditions the AND gate 775 to open up so that the $T_2$ pulse is translated through an OR unit 775–1 to a true complement trigger 776. The latter was reset to its off condition at the I mode of each ± digit as long as the calculate trigger 115 of MACHINE PROGRAM is on during the "add" program instruction. To this end, the potential of the output circuit 776$_O$ of the true complement trigger 776 is applied to an AND gate 777 to open this gate if the trigger 776 is on. There is also applied to the gate 777 the output 116 of the calculate trigger and I mode pulse at ± digit time. The I mode pulse translated by gate 777 through the OR unit 777 resets the true complement trigger 776 off. Otherwise note that if the latter were already in the off condition, the AND gate 777 would not be conditioned to translate this I mode pulse.

Accordingly, the $T_2$ pulse translated by the AND gate 775 when a binary 9 stands in the buffer turns the TC trigger 776 on to indicate that the number standing in the buffer is a 9, which in the present calculating machine is used in the ± digit subsector to indicate that the number of that sector has a negative algebraic sign. A positive sector number is indicated by storage in the ± digit of a zero. The reason for setting the TC trigger is that all positive numbers stored in the adder and 8-position register during addition are stored in complement form, so that the number entered into the adder from the buffer must be in complement form in the buffer if the number is positive or must be in true form in the buffer if the number to be entered is negative.

The TC trigger 776 having been thus set according to the algebraic sign of the number to be read in from the storage tracks, at each of digits 1–8 the AND gate 771 (FIG. 22*a*) opens up at C mode time and applies a C mode pulse through the OR unit 637 to the read AND gates 635–643. This applies the number read-in from the track at C mode time to the inputs of the buffer triggers 615'–618', the latter also being advanced by the C mode pulse translated through the OR unit 677'. Also at each of digit times 1–8 the AND gate 769 translates digit pulses to its output circuit 778 and these are applied to a serial add OR unit 779 (FIG. 20) and through the latter to an AND gate 780.

Thus at O mode time of digits 1–8 the latter opens up and translates such O mode pulses if the TC trigger 776 is off indicating that a positive number is being read in from the storage tracks. Translation of an O mode pulse by the AND gate 780 and OR unit 695' complements the binary number standing in the buffer triggers 615'–618'. As earlier explained, a negative algebraic sign turns the TC trigger 776 on, so the gate 780 does not translate any O mode pulses and the number standing in the buffer is not complemented.

The digit pulses translated by the OR unit 779 are also applied to an AND gate 781 which thereupon translates O mode pulses to a buffer trigger 782 which has previously been reset off at $P_1$ mode time of the preceding digit by $P_1$ pulses applied through an OR unit 783. Each O mode pulse of AND gate 781 turns the buffer trigger 782 on, and its on output potential is applied both to an AND gate 784 and an AND gate 785. The latter translates +B pulses to a differentiating inverter 786, the output of which comprises differentiated −B pulses which are combined with differentiated −A pulses (from the inverter 26 of FIG. 2) in a minus OR unit 787 and applied to the AND gate 784. Accordingly, when the buffer trigger 782 turns on at O mode time, it opens up the gate 784 which translates −A and −B pulses to the AND gates 623' and 630' of the buffer trigger 618', the AND gate 693' of the buffer trigger 617', the AND gate 633' of the trigger buffer 616', and the OR unit 631' of the buffer trigger 615'. These A and B pulses cause the buffer to "roll," which is equivalent to adding to the binary number stored in the buffer one binary digit for each −A and −B pulse.

When these pulses have caused the number standing in the buffer to equal a binary digit 9, the buffer triggers 615' and 618' are turned on and open up the AND gate 694' which applies an output potential to an adder trigger 789. The latter is present by $P_1$ mode pulses of the preceding digit translated through an OR unit 790. Now when the number standing in the buffer advances from 9 to 0, the output potential of the AND gate 694' drops and the resulting negative potential pulse turns the adder trigger 789 on. Its output potential is applied through an OR unit 791 to an AND gate 792 to which are also applied −B and −A pulses. These −B and −A pulses cause the gate 792 to have a "negative OR" characteristic in that the gate develops in its output circuit 792$_O$ an elevated positive potential except in the presence of a −B or −A pulse. The −A and −B pulses translated by the gate 792 are applied to the AND gates 623 and 630 of the adder trigger 618, the AND gate 693 of the adder trigger 617, the AND gate 633 of the trigger 616, and the OR unit 631 of the adder trigger 615. Each such translated pulse causes a one to be added to the binary number standing at that time in the adder.

The buffer trigger 782 and the adder trigger 789 are turned off by the next $P_1$ mode pulse, which occurs five mode periods after the O mode time when the buffer trigger 782 was turned on. Since there is one −A and one −B pulse each mode period, this means that the buffer has been rolled through ten binary digits, and the adder has similarly received binary digits corresponding to all those following the 9 digit occurring in the buffer (at the time AND gate 694' opened up as earlier explained). The binary number thus originally standing in the buffer has by this method been serially added to the binary number standing at that time in the adder.

The "add" program potential is applied to the OR unit 757 of FIG. 21, and at $P_2$ time of each of the ± digit and digits 1–8, the AND gate 756 (FIG. 21) opens up and translates a $P_2$ mode pulse to all of the input AND gates of the 8-position register triggers and also applies a $P_2$ pulse through the OR unit 677 to the input AND gates of the adder triggers. This causes the adder and 8-position register to advance one step, the number stored in the adder being thereupon stored in the input triggers of the register and the number stored in the otuput triggers of the register being thereupon stored in the adder triggers. Thus the number entered from the storage track into the buffer and inserted by the latter into the adder in the manner previously described is added digit by digit to the number standing at that time in the adder and register.

As the addition progresses, the additive process in the adder may result in a carry which should be added into the next higher digit position during the next addition step. Whenever this occurs, the storage of a 9 in the adder causes the triggers 615 and 618 to turn on, and this in turn causes the AND gate 694 to open up and apply a positive potential to the on input circuit of a carry trigger 794. Now when the next binary digit is serially added by operation of the buffer to the number standing in the adder, the trigger 618 turns off and the resulting drop of potential in the output circuit $694_O$ of the AND gate 694 turns the carry trigger to 794 on.

The latter is reset off by each $P_2$ pulse from the AND gate 756 (FIG. 21) which advances the adder and 8-position register. When this occurs, the drop of potential in its output circuit $794_O$ is applied through an OR unit 971 to cause a carry store trigger 795 to be turned on. It was earlier explained that 1–8 digit pulses were applied from the AND gate 769 (FIG. 22*a*) to the OR unit 779, and these pulses are applied to an AND gate 796 to which is also applied the potential of the output circuit $795_O$ carry store trigger 795. Thus when the carry store trigger is on, indicating a carry, the AND gate 796 opens up at O mode time and translates an O mode pulses through an OR unit 797 and the OR unit 791 to the AND gate 792. This causes the latter to translate one pulse and apply it through the output circuit $792_O$ to the ADD gates of the adder. The applied pulse has the effect of causing a binary one to be added to the number standing at that time in the adder, which it will be recalled has newly been entered into the adder at the immediately preceding C mode time and before the buffer has had an opportunity to roll into the adder the number standing in the buffer which starts sometime after the beginning of O mode time. The pulse translated by the AND gate 792 also turns the carry store trigger 795 off and thereby closes down the AND gates 796 and 792. The carry store trigger 795 is thereupon conditioned to store the next carry occurring in the addition process. In this manner, any carry is inserted into the adder in the next higher digit position.

The matter of sign control will now be considered. A register sign trigger 890 is so operated as always to indicate the algebraic sign of a number stored in the register either initially or after completion of a calculation operation under program control. A computation program is always initiated by a "register reset" operation (described hereinafter) and the first number thereafter entered into the register is by means of an initial add or subtract program instruction. At the time that the register is reset, the reset operation also resets the register sign trigger 890 off.

In this matter of sign control, it may be noted at the outset that the register sign trigger is controlled both by the setting of the true complement trigger 776, but in opposite sense to the latter, and by the carry trigger 794. Thus if the true complement trigger 776 stays off by virtue of the positive algebraic sign of a number entering the buffer (or is turned off by a negative number entering the buffer accompanied by a subtract program instruction later to be described) the register sign trigger 890 is turned on at the $T_4$ mode of the ensuing eighth digit time. Conversely if the true complement trigger 776 is turned on by a negative algebraic sign of a number entering the buffer, the register sign trigger 890 stays off at eighth digit $T_4$ mode time. This control of the register sign trigger by the true complement trigger is accomplished by operation of a gate 892 which is conditioned to open whenever the output circuit $776_O$–1 of the true complement trigger 776 develops an elevated potential due to the off condition of the latter. This gate is further conditioned by the add or subtract program control potential from the PROGRAM DECODER, and actually opens on eighth digit pulses applied thereto from the output circuit $768_O$ of the gate 768 and on $T_4$ mode pulses applied to the gate 892. Each $T_4$ mode pulse translated by the gate 892 serves to turn the register sign trigger 890 on from its initial reset-off condition.

It may be noted that while the register sign trigger may thus be turned on by an entering number of positive algebraic sign, this may be only temporary as in the case where the addition proces involves two numbers having positive algebraic sign inherently to result in a carry from the last order addition step. When the carry trigger 794 turns on due to a carry as last mentioned, it also conditions an AND gate 793 to open up (this gate being further conditioned at eighth digit time by the add or subtract program instruction translated through OR unit 893) and the gate accordingly translates $P_2$ mode pulses through the OR unit 891 to turn the register sign trigger 890 off again. Thus the sign control trigger 890 correctly indicates, except for the brief interval of its cycle of operation last described, the algebraic sign of the number standing in the register at any time. That this is true will be apparent from the following described operation of the register sign trigger for several additional algebraic sign conditions encountered during an additive operation.

Thus if the initial number has a negative algebraic sign and to it is added a number of positive algebraic sign during the addition step, it is possible that the latter number may be of larger magnitude than the former and in this event no carry occurs from the last order of the addition. Note in this event that the resultant summation has a positive algebraic sign, and the operation of the sign control trigger 890 will now be considered to show that it correctly indicates the positive sign of the resultant standing in the register. Consider first the initial entry of the negative number into the register. The register sign trigger 890 started initially reset off, and the true complement trigger was turned on by the negative algebraic sign of the first number entered into the register. However, since this number is not complemented in the buffer and therefore is inserted through the adder and into the register in true form, the 9's which fill the register at this time (complemented zero) inherently cause a carry which turns the sign control trigger on at eighth digit $P_2$ mode time by the operation of the carry trigger 794. Now when the second number of positive algebraic sign is entered into the buffer, the true complement trigger 776 remains off and the register sign trigger (now on) is turned off by the following eighth digit $T_4$ mode pulse translated through AND gate 892 and OR unit 891. Since the positive algebraic number has larger magnitude than the negative number, the addition process does not result in a carry of the last order, so that the carry store trigger 890 remains off and thereby correctly indicates that the resultant stored in the register has positive algebraic sgin.

Consider now the case where the first number entered in the register has a positive algebraic sign and to this is added a number of larger magnitude having a negative algebraic sign. The register sign trigger is turned on by the positive algebraic sign of the first number entered in the register, and this number when added to the 9's standing in the register inherently causes a carry which turns the register sign trigger off again. Now when the number of negative algebraic sign enters the buffer, the true complement trigger 776 turns on and the register sign trigger accordingly remains off. When the addition of these two numbers occurs in the adder, a carry results and this causes the register sign trigger 890 to turn on correctly to indicate that the resultant standing in the register has negative algebraic sign.

Lastly, the operation of the sign control trigger for the addition of two numbers of negative algebraic sign will be considered. The negative sign of the first number entering the register turns the true complement trigger on and the register sign trigger remains off. When this number is added to the 9's standing in the register, a carry occurs and the register sign trigger is thereupon turned on. The second number of negative algebraic sign causes the true complement trigger again to turn on so that the register sign trigger stays on. The addition of these two numbers in the adder does not result in a carry, so that the register sign trigger remains on and correctly indicates that the resultant standing in the register has negative algebraic sign.

*Computation—Subtraction*

A subtract operation is performed in very similar fashion to addition with the exception that after the true complement trigger 776 has been set to indicate the algebraic sign of the number to be read in from the drum storage tracks, its on-off operating condition is subsequently reversed. Thus if the number read in from the storage tracks is a positive number, the true complement trigger would complement the number in the buffer for an additive process, but in subtraction the positive number is left standing in true form in the buffer. It is thereby effectively subtracted from the complemented number standing in the adder at the time the buffer serially inserts the number into the adder.

Referring to the control circuit of FIG. 22*a*, a "subtract" program control potential is applied from the output circuit 265 of the PROGRAM DECODER to an AND gate 800 and also to an AND gate 801. The AND gate 800 performs the same function as the AND gate 771 in the addition process, in that the number stored in the C modes of the storage tracks is read into the buffer and the latter advanced to effect storage of the number in the buffer. It will be recalled that the AND gate 770 applied a ± digit pulse through its output circuit 773 to the true complement control OR unit 774, so that at $T_2$ time (gate 775) of the ± digit the AND gate 775 caused the true complement trigger 776 to read the sign of the number being read-out of the storage tracks. In the subtraction process, the AND gate 801 is opened by ± digit pulses from gate 770 and translates $T_4$ mode pulses through its output circuit 802 to the OR unit 775–1 (FIG. 20). Since the $T_4$ pulse occurs later than the $T_2$ pulse which established (through gate 775) the setting of the true complement trigger 776, the $T_4$ pulse has the effect of reversing the established setting of the true complement trigger. Thus if the latter had been turned on at the time of the $T_2$ pulse, it is turned off by the $T_4$ pulse. This resetting of the true complement trigger has the effect that the newly entering number from the storage tracks is left in true form in the buffer if the number has a positive algebraic sign. In true form it subtracts from the number standing in the adder when entered by the buffer into the adder (it will be recalled from the description of the additive process that positive numbers always stand in the adder and 8-position register in complemented form). In similar fashion, such resetting of the true complement causes a negative number read-in from the track to be complemented in the buffer so that it effectively adds to the complemented number (complementing being equivalent to reversing the sign of the number) standing in the adder when these numbers are added.

As in the addition process, the sign trigger 890 is set from the true complement trigger 776 through gate 892 at $T_4$ mode and eighth digit times (OR unit 893) and from the carry trigger 794 through gate 793 at $P_2$ mode time of the eighth digit time (OR unit 893).

Aside from these slight differences the subtraction process is the same as the additive process heretofore described, and will not be repeated.

*Computation—Multiplication*

In the calculating machine described herein, the multiplication program instruction is scheduled to occur at a time when the algebraic sign of the multiplicand is stored in the adder and the multiplicand digits are stored in the 8-position register. Upon receipt of the "multiplication" program instruction the number stored in the adder and 8-position register is immediately written into the M modes of the storage drum, the number being complemented digit by digit just prior to storage if its sign is positive or being read-out in true form if its sign is negative. At the time when the last digit of the multiplicand is in the adder, a binary 9 is inserted in one side of a compare unit and a 5-position register is cleared by filling it with 9's. The multiplier is then read in through the adder and stored in the 8-position register after which the latter has its remaining capacity filled by zeros or 9's, depending upon the sign of the multiplier, and the 8 and 5-position register are then connected in series to provide a 13-position register.

At this point, the first digit of the multiplier is standing in the adder, and its value is compared to the 9 which stands in the compare unit. If the first digit of the multiplier is not equal to 9, a binary one is added to it and the adder and register are stepped five times to place all of the multiplier in the first five positions of the 13-position register. The multiplicand is then read into the adder and register from the M modes of the storage drum, during the next 8-advance steps of the adder and register. This places the first digit of the multiplier again in the adder where it is compared to the 9 which is stored in the compare unit, and an unequal comparison repeats the process just described to cause the multiplicand to be added to itself during the process. This continues until the comparison of the first multiplier digit results in an equal comparison, at which time the first multiplier digit which is now standing in the adder is left as a 9 if the multiplicand is in complemented form in the register or is converted to a zero if the multiplicand stands in true form in the register.

The adder and register are thereupon stepped fifteen times, which places the second digit of the multiplier in th adder. The second digit is now compared to the 9 standing in the compare unit, and if unequal the register stepping occurs as before but now there is the difference that the multiplicand is read-in from the M mode storage beginning at the next higher order digit position of the partial product standing in the register. As each multiplier digit is exhausted and effectively converted to a zero, the space which it formerly occupied becomes available for expansion of the partial product standing in the register. After a maximum of five multiplier digits have been thus used up, the multiplication process is completed and is automatically terminated. The product then standing in the register is further processed in accordance with the next program instruction.

The machine organization for calculation by multiplication is schematically shown in FIGS. 12, 14, 17, 19, 20–22, 24, 25 and 26 which should be considered together as arranged in FIG. 27.

The 5-position register shown in FIG. 24 is, except for its size, similar to the 8-position register of FIG. 21 and similar components are identified by similar reference numerals primed. There is one notable difference in that the 5-position register includes an 8–13 trigger 805 (initially reset off by the machine reset line, not shown) having an output circuit 713 which normally maintains the AND gates 705–712 open, as earlier explained, since the trigger 805 is normally off. The output circuit 806 of this trigger unit opens the output AND gates 758'–765', having output circuits which comprise an input circuit of individual ones of the OR units 714–721 as shown. Whenever the 8–13 trigger 805 is off, as is normally the case, the output of the adder is coupled through the AND gates 705–712 and the OR units 714–721 to the input of the 8-position register. However, when the 8–13 trigger goes on, the AND gates 705–712 are thereupon closed down, the output AND gates 758'–765' open up, and the output of the adder is connected through the 5-position register to the input of the 8-position register so that the 5 and 8-position register are thereupon connected in series to provide a 13-position register.

The compare unit is schematically shown in FIG. 25 and includes a pair of "1's" digit trigger units 810, 811, a pair of "2's" digit trigger units 812, 813, a pair of "4's" digit trigger units 814, 815, and a pair of "8's" digit trigger units 816, 817. The trigger units 810, 812, 814 and 816 store a binary 9, which is inserted therein at the time mentioned above, through respective pairs of AND gates 818–19, 820–821, 822–823 and 824–825. One input circuit of each of these gates is comprised by the output circuit of an OR unit 826, and each has a second input circuit comprised by individual ones of the trunk line circuits 652–659 shown in FIGS. 14, 17, and 19.

The trigger units 811, 813, 815, and 817 receive the number stored in the adder translated through respective pairs of AND gates 827–828, 829–830, 831–832, and 833–834. These gates have one input circuit comprised by an output circuit of an OR unit 835, and another input circuit comprised by individual ones of the adder output trunk-line conductors 660–667 as shown.

The output circuit $810'_O$ of the trigger 810 and the output circuit $811_O$ of the trigger 811 are coupled by a resistor 839 having a center tap connected through a conductor 837 to an input circuit of a coincidence gate 838. The output circuit $810_O$ of the trigger 810 and the output circuit $811'_O$ of the trigger 811 are connected through a resistor 836 having a center tap connected through a conductor 840 to an input circuit of a coincidence gate 841. The trigger units 812 and 813 are similarly connected through respective conductors 842 and 843 to respective coincidence gates 844 and 845, and the trigger units 814 and 815 in similar manner are connected through respective conductors 846 and 847 to respective coincidence gates 848 and 849.

The output circuit 842 of the triggers 812, 813 is also coupled through an inverter 850 to a second input circuit 851 of the gates 838 and 841, and the output circuit 843 of these trigger units is also coupled through an inverter 852 to the coincidence gate input circuit 851. The output circuit 846 of the trigger units 814, 815 is coupled through an inverter 854 to a second input circuit 855 of the gates 844 and 845, and the other output circuit 847 of these triggers is coupled through an inverter 857 to the coincidence gate input circuit 855. The latter circuit is also coupled through inverters 858 and 859 in series to the coincidence gate input circuit 851. In similar fashion, the triggers 816 and 817 are coupled through an output circuit 860 to an inverter 861 and through an inverter 862 to a second input circuit 863 of the gates 848 and 849. The latter input circuit is also coupled through inverters 865 and 868 in tandem to the input circuit 855 of the gates 844 and 845. The other output circuits 870 of the triggers 816, 817 is connected to an inverter 871 and through an inverter 872 to the input circuit 863 of the gates 848 and 849.

The output circuits of the coincidence gates 838, 844, 848 and the inverter 861 is a common circuit 873. Similarly, the output circuits of the gates 841, 845, 849 and inverter 871 is a common output circuit 874. The two output circuits 873 and 874 are coupled by a resistor 875 having a center tap 876 connected through a resistor 877 to a source of negative potential indicated as having a value of —100 volts. The output circuit 874 is coupled through an inverter 878 to one input circuit of an AND gate 879 having as its other input circuit the output circuit 873 and having an output circuit 880.

In considering the operation of the compare unit just described it will be recalled that a binary 9 is entered into and kept stored in the buffer side of the unit comprised by triggers 810, 812, 814 and 816 during multiplication. This means that the triggers 810 and 816 are on and the triggers 812 and 814 are off. Consider for the moment only the trigger pairs 816, 817 as representative of the other trigger pairs. The output voltages of the trigger units are such that if both trigger units are on, both of the output circuits 860 and 870 of these units have a negative potential of approximately —26 volts. This value of voltage renders the respective inverters 861 and 871 nonconductive so that the potential which they apply to their respective output circuits 873 and 874 is likewise equal and of approximately 100 volts value. Conversely, if the trigger 816 is on and the trigger 817 is off, the output voltage of the output circuit 860 will have a value of approximately —65 volts whereas the output circuit 870 will have zero potential impressed upon it considered with respect to ground potential. This results in the inverter 861 applying a high positive voltage of approximately 100 volts to its output 873, but the inverter 871 is now fully conductive and accordingly drops the potential of its output circuit conductor 874 to approximately +40 volts.

With the foregoing description of the operation of the trigger pair 816 and 817 in mind, consider the overall operation of the compare unit when the binary 9 stored in the buffer triggers 810, 812, 814, and 816 is compared to a binary number stored in the adder triggers 811, 813, 815 and 817. If both trigger units 816 and 817 are on indicating storage of an equal binary "8's" digit, the output circuits 873 and 874 of the inverters 861 and 871 have a high positive value of potential. This produces a large positive output potential in the "equal" output circuit 876, but the large positive output potential of the output circuit 874 when inverted by the inverter 878 prevents the AND gate 879 from opening up so that no potential is developed in the "unequal" output circuit 880. If the adder trigger 817 is not on, however, because the number stored in the adder is not a binary 9, the output of the inverter 861 is still high but the output of the inverter 871 is now low. This reduces the output potential of the "equal" output circuit 876, and the low potenial of the ouput circuit 874 when inverted to a high output potential by the inverter 878 operates in conjunction with the high output potential of the output 873 to open up the AND gate 879 so that the latter develops a high positive output potential in the "unequal" output 880. Thus for the trigger pair 816 and 817, it will be seen that an output potential is developed in either the "equal" output circuit 876 or the "unequal" output circuit 880 depending upon whether the comparison indicates respectively equal or unequal compared binary digits.

Assuming that the comparison in the trigger pair 816 and 817 has indicated equality, the low output potential of the trigger pair output circuit 860 when inverted by the inverter 862 will produce a high positive potential in the input circuit 863 of the coincidence gates 848 and 849 thereby conditioning these gates to be conductive. The same is true of the low potential developed in the trigger pair output circuit 870 when inverted by the inverter 872. Note that an unequal comparison by the trigger pair 816 and 817 would have caused the inverter 872 to develop a low output potential biasing the coincidence gates 848 and 849 to cutoff, thus insuring that their output potentials were high and would not affect the results of the unequal comparison as indicated by the inverters 861 and 871 of the first trigger pair.

If it be now assumed that a zero is stored in the adder trigger 815 so that this trigger is off, a zero being stored in the buffer trigger 814, the equality of comparison would again develop low output potentials in the trigger-pair output circuits 846 and 847 which would bias the coincidence gates 848 and 849 to their nonconductive states to develop high output potentials in their output circuits. Since in the operation of the calculating machine herein described the number to be compared in the adder is never larger than a 9, the adder triggers 813 and 815 will always be off at a time when the adder trigger 817 is on indicating storage of a binary "8" in the adder as is presently assumed. Under the assumed conditions that the trigger pairs 816–817, 814–815, and 812–813 indicate equality of comparison, all of the inverters 850, 852, 858 and 859 develop high output voltages in the output circuit 851 of the coincidence gates 838 and 841 thus conditioning the latter to be conductive. It has been assumed that a binary 9 stands in the buffer so that the buffer trigger 810 is on. If the adder trigger 811 is also on indicating a 9 standing in the adder, the output potentials of both output circuits 837 and 840 of the trigger pair 810, 811 are low and bias the coincidence gates 838 and 841 to be nonconductive resulting in the development of high output potentials in their respective output circuits 873 and 874. As before, this develops a large positive potential in the "equal" output circuit 876 and no output potential in the "unequal" output circuit 880. If, however, a zero is stored in the "1's" digit of the adder so that the trigger 811 is off, the resulting potential developed in the output circuit 837 of the trigger pair 810, 811 has a value of approximately −65 volts to maintain the gate 838 cut off at its output potential high. On the other hand, the output circuit 840 of the trigger pair 810–811 is now zero with respect to ground so that the gate 841 becomes fully conductive to result in lowered output potential in the "equal" output circuit 876 and the development of a positive output potential in the "unequal" output circuit 880.

Having now considered the individual operations of the several component parts of the calculating machine, overall operation of the machine during multiplication will be described below.

A multiplication operation starts with the multiplicand stored in the adder and the 8-position register. While the present invention should not be considered as limited thereto, the machine herein described is arranged to multiply a multiplicand having up to a maximum of eight digits by a multiplier having up to five digits. When a multiply program instruction is developed in the output circuit 266 of the PROGRAM DECODER (FIG. 8) it is applied to the OR unit 118 of MACHINE PROGRAM at the ± digit and M mode time the AND gate 120 translates an M mode pulse and turns the calculate trigger 115 off. The multiply program potential is also applied to the negative AND gate 121 to prevent the C to O trigger 124 from turning on at the time the calculate trigger 115 turns off. With the calculate trigger 115 off, further operation of the PROGRAM SEQUENCE SELECTOR and PROGRAM DECODER (FIGS. 5 and 6) closes since the off condition of the calculate trigger shuts down the AND gates 203, 208 and 190 of the PROGRAM SEQUENCE SELECTOR and the advance AND gate 230 of the PROGRAM DECODER. It will be noted that the "multiply" program was developed at ± digit and I mode time, when the AND gate 230 of the PROGRAM DECODER advanced the triggers 225–228 of the latter, and that the calculate trigger turned off at the immediately succeeding ± digit and M mode time. This leaves the coincidence trigger 201 of the PROGRAM SEQUENCE SELECTOR on at a point coinciding with the particular sector and digit of the PROGRAM SEQUENCE SELECTOR cycle of operation, thus marking the point on the storage drum at which the multiplication process is initiated.

Referring now to the control circuit of FIG. 26, the "multiply" output circuit 266 of the PROGRAM DECODER (FIG. 8) is inverted by a polarity inverter 881 and is applied through an OR unit 885 to the off input circuit of a first sector trigger 886. Thus at the beginning of the sector in which the multiply program instruction appears, a negative pulse is applied through the OR unit 885 to the first sector trigger 886 to turn the latter on. This applies a positive potential to one input circuit of three AND gates 887, 888 and 889.

Each "multiply" program instruction is preceded at some previous time by a "reset register" program potential occurring prior to the time the multiplicand becomes stored in the adder and 8-position register (see description of "reset register" operation hereinafter). This operation leaves the register sign trigger 890 turned off. Thus when the multiplicand is stored in the adder and 8-position register in preparation for a multiplication program, its algebraic sign is sensed by the true complement trigger 776 and the register sign trigger 890 is turned on through an OR unit 891 and an AND gate 892 if the multiplicand has a negative algebraic sign or remains off if the multiplicand has a positive algebraic sign.

When the first sector trigger 886 applies a positive potential to the AND gate 887, the latter translates a C mode pulse at ± digit time through its output circuit $887_O$ to an emit to track OR unit 894 (FIG. 22*b*) and through the latter to an AND gate 895 and an AND gate 896. If the number standing in the register is in complemented form, the register sign trigger 890 being off to indicate a positive algebraic sign for the multiplicand, its output circuit $890_{O-1}$ is applied to the AND gate 896 to develop in the latter a positive pulse at C mode time which is translated through an OR unit 897 to a plurality of OR units 898, 901, 902 and 903. This so energizes the OR units 644–651 (FIG. 14) that a binary 9 is applied through trunk lines 652–659 to the adder comprised by triggers 615–618. The C mode pulse translated at ± digit time by the AND gate 887 (FIG. 26) is also applied to the OR unit 677 of the adder so that the binary 9 is stored in the adder. On the other hand if the register sign trigger 890 is on indicating that the multiplicand is negative and thus is stored in the register in true form its output circuit $890_O$ will open up the AND gate 895 (FIG. 22*b*) and translate a C mode pulse through an OR unit 905 to OR units 899, 901, 904 and 902 which place a zero in the adder rather than a 9 as last described.

The "multiply" program potential is also applied to the OR unit 757 (FIG. 21*a*) so that the adder and 8-position register are advanced at $P_2$ mode time of the ± digit by $P_2$ pulses translated through the AND gate 756. The AND gate 889, (FIG. 26*a*) translates C mode pulses during each of digits 1–8 through its output circuit $889_O$ to the OR unit 797 (FIG. 20), whenever the carry store trigger 795 is on, which causes any carrys of the carry store trigger 795 to be added into the adder as the latter and the 8-position register continue to be advanced by the $P_2$ mode pulses in each of the digit times 1–8. Each such carry resets the carry store trigger through the gate 792 and OR unit 786′. The AND gate 888 (FIG. 26*a*) translates O mode pulses at each of digits 1–8, if the register sign trigger 890 is off indicating that the number standing in the register is a positive number and hence is in complemented form in the register. These O mode pulses are translated through the output circuit $888_O$ of this AND unit to the OR unit 695 (FIG. 17) of the adder and have the effect of restoring the complemented number to true form as it is stepped through the register at $P_2$ mode time. Thus at the end of the eighth digit, the number standing in the register is in true form, without regard to whether it had previously stood in the register in true or complemented form. An eighth digit pulse is applied from the address rings (FIG. 3) to the first sector trigger 886 to turn the latter off at the end of the eighth digit time.

When the trigger 886 turns off as last mentioned, it turns on a 2–12 sector trigger 906. The latter through an OR unit 907 conditions an AND gate 908 to translate M mode pulses through its output circuit $908_O$ to the write OR unit 676. This causes the write out AND gates 668–675 to open up during eleven full sector times and write out into the storage track in M mode the mulitplicand now standing in the register in true form. In this, it should be remembered that both the adder and register are stepped at $P_2$ mode time of each digit by operation of the AND gate 756 (FIG. 14). It was earlier pointed out that the multiplicand may have a maximum of eight digits, and it will be apparent that the operation of the 2–12 sector trigger 906 is such that the multiplicand is stored repetitively in the M modes of each of eleven full sectors of the storage drum. At the end of the eleventh sector time following the initiation of the multiply program instruction, a sector potential is applied from the output circuit 164 of the PROGRAM SEQUENCE SELECTOR (which stopped cycling as earlier explained when the calculate trigger of MACHINE PROGRAM turned off) to an AND gate 909 which thereupon translates an eighth digit pulse from the address rings (FIG. 3) to the trigger 906 to turn the latter off. It might be noted at this point that the first (sign) digit of the multiplicand which was writted out at M mode time actually was written into the preceding sector since the write head is one sector behind the read head as earlier explained.

When the 2–12 sector trigger 906 turns off, it turns on a thirteenth sector trigger 910 through an AND gate 911 to which the "multiply" program potential is also applied. This trigger upon turning on conditions (through OR unit 907) the AND gate 908 to translate M mode pulses throughout another sector interval to the write-out AND gates 668–675, thus to write the digits of the multiplicand into the M modes of one more sector of the storage tracks. The multiplicand is thereby stored repetitively in all of the M modes of the 12 sectors.

The trigger 910 also conditions a plurality of AND gates 912–918. The AND gate 913 translates C mode pulses through its output circuit $913_O$ to the read gate OR unit 637 which opens up the read AND gates 635–643 and places the multiplier from C mode storage into the inputs of both the buffer and adder. The C mode pulses translated by the AND gate 913 are also applied to the advance OR unit 677' of the buffer and the advance OR unit 677 of the added to store each digit of the multiplier in turn in these units. Bear in mind in this and in what follows that the adder and register are periodically stepped at $P_2$ time (gate 756 of FIG. 21*a*) of each digit time. The AND gate 918 applies O mode pulses through its output circuit $918_O$ to the adder complement OR unit 695 which have the effect of complementing at O mode time each digit of the multiplier as it is stored in the adder. In this operation, however, the AND gate 918 is opened: (1) by an OR unit 920 if the register sign trigger 890 (FIG. 20) is off and applies to this OR unit a positive potential from its output circuit $890_{O-1}$ during each of digit times ± and 1–8, or (2) by an OR unit 921 which is fed by three AND gates 922, 923, and 924 if the register sign trigger is on and opens the AND gate 918 at digit times ± and 1–5 but not at digit times 6, 7 and 8. To accomplish the last-mentioned result, the output circuit $890_O$ of the register sign trigger 890 conditions each of these latter gates to open up if the trigger 890 is on, and the output potentials of the sixth digit, seventh digit, and eighth digit output circuits $57'_O$, $58'_O$ and $59'_O$ (FIG. 3) are applied to the second input circuits of the respective AND gates 922–924 to maintain these gates open except during the occurrence of sixth digit, seventh digit, and eighth digit pulses. The net result of the operation of the AND gate 918 as thus arranged is always to complement each of the five digits of the multiplier, without regard to the sign of the product established in a manner presently to be described. After complementing, the five digit multiplier is stepped through the added and 8-position register (both of which are stepping at $P_2$ time by $P_2$ mode pulses supplied through the AND gate 756 of FIG. 21*a*). Following the five digits of the multiplier there are three zeros entered into the adder from the remaining three storage modes of the storage track, and the operation of the AND gate 918 last considered is such that if the register sign trigger 890 is off the operation of the OR unit 920 causes these three zeros to be complemented in the adder before being stepped into the register but if the register sign trigger 890 is on the operation of the OR units 920 and 921 and the gates 922–924 prevents the three zeros in the adder from being complemented.

The true complement trigger 776 was reset off at the I mode of ± digit time through the AND gate 777 which was conditioned by the output circuit 116 of the MACHINE PROGRAM calculate trigger 115 just before the latter was turned off by the multiplication program instruction. It was left in this condition (the OR unit 774 keeping the gate 775 closed) through the operation of the first sector trigger 886 and the 2–12 sector trigger 906. With the thirteenth sector trigger 910 on, however, an on condition of the register sign trigger 890 will (through its output circuit $890_O$) condition the AND gate 914 to translate at the ± digit and O mode times an O mode pulse through the output circuit $914_O$ to the true complement trigger OR unit 775–1 (FIG. 20) which has the effect of turning the true complement trigger 776 on at the end of O mode time.

During ± digit time, the AND gate 912 applies a ± digit pulse through its output circuit $912_O$ to the true complement control OR unit 774 which conditions the AND gate 775 to open up at $T_2$ mode time and sense the multiplier algebraic sign standing in the buffer at ± digit time. It will be recalled that the sign of the multiplier was read into and stored in the buffer from the storage track at C mode time (AND gate 913). It was mentioned above that the register sign trigger 890 stores the algebraic sign of the multiplicand, and by this fact and sensing of the sign of the multiplier as last described the algebraic sign of the product is now established in the following manner. The AND gate 915 (FIG. 26*a*) is conditioned by the elevated potential in the output circuit $618'_O$ of the buffer trigger 618', when the latter is on to store a 9 as indicating a negative algebraic sign for the multiplier, to translate to its output circuit $915_O$ a $T_4$ mode pulse during ± digit time. This $T_4$ pulse is applied to the register sign trigger OR unit 891 so that a negative algebraic sign of the multiplier causes the latter to be turned on if it had previously been off or to be turned off if it had previously been turned on. This establishes a positive algebraic sign for the product if both the multiplicand and multiplier had negative algebraic signs or if both had positive algebraic signs, or establishes a negative algebraic sign for the product if either the multiplier or multiplicand had a negative algebraic sign and the other had a positive algebraic sign. It has been explained above that the algebraic sign and first five digits of the multiplier are read into the 8-position register in complemented form. The register sign trigger 890 has at this time been so set that the multiplicand will later be read back from the storage drum into the register in true or complemented form depending upon the algebraic sign of the product.

Following the fifth digit of the multiplier, specifically during O mode of the sixth, seventh, and eighth digit times, a zero or 9 (9 being a complemented zero) is stored in the 8-position register by operation of the AND gate 918 as explained above. During the seventh digit time, the AND gate 917 is supplied with $T_1$, $T_2$, $T_3$, $T_4$ and $P_1$ mode pulses through an OR unit 926. These mode pulses are translated through the output circuit $917_O$ to the emit 9 OR unit 927 (FIG. 22*b*) which translates these pulses through the OR unit 897 and the OR units 898, 901 and 903 to cause a corresponding number of binary 9's to be emitted through the OR units 644–651 to the trunk lines 652–659. The mode pulses last mentioned are also applied to the compare unit OR 826 to open the compare unit AND gates 818–825 and thereby cause the first emitted 9 (succeeding emitted 9's have no further effect) to be stored in the input trigger units of the compare unit of FIG. 25. The five mode pulses translated by the AND gate 917 are also applied to the advance OR unit 755' of the 5-position register so that the latter is stepped five times by pulses from the inverter 754' and thereby filled during the seventh digit time with binary 9's.

During the eighth digit time, the AND gate 916 translates a $T_4$ mode pulse through its output circuit $916_O$ to the 8–13 trigger 805 to turn the latter on. This closes down the AND gates 705–712 and opens up the AND gates 758'–765' and thereby connects the 5-position register in series between the adder and the 8-position register thus providing a 13-position register. This pulse is also applied to the OR unit 937 (FIG. 21*a*) to step the 13-position register one step.

An eighth digit pulse is applied from the address rings (FIG. 3) to the sector trigger 910 to turn it off at the end of the eighth digit. It will be apparent that during the sector time previous to this, the multiplier has been read in from the track and stored in the 8-position register in complemented form, the 5-position register filled with 9's, and the two registers have been connected in series. The $P_2$ pulse occurring just prior to the end of the eighth digit period last mentioned places the first digit of the multiplier in the adder.

When the thirteenth sector trigger 910 turns off as last mentioned, it turns on a multiply trigger 929 which thereupon applies a conditioning potential to a plurality of AND gates 930–934. During the immediately succeeding ± digit time, the AND gate 930 translates through its output circuit 930$_O$ an I mode pulse to the OR unit 835 of the compare unit (FIG. 25) which operates to open up the AND gates 827–834 to place the first digit of the multiplier in the compare unit. It will be recalled that during the time the thirteenth sector trigger 910 was on, the operation of the AND gate 917 caused a binary 9 to be stored in the compare unit. The first digit of the multiplier is now compared against this stored 9.

Assuming that the first digit of the multiplier is not equal to 9 (complemented zero), a potential is developed in the output circuit 880 of the compare AND gate 879 and is supplied to two of the AND gates 932 and 933 of FIG. 26*b*. The AND gate 933 at ± digit time applies through its output circuit 933$_O$ to the carry OR unit 797 (FIG. 20) an M mode pulse which, when translated through the OR unit 791 to the AND gate 792, causes a pulse to be translated to the add AND gates of the adder and thereby add a binary 1 to the first digit of the multiplier. Immediately thereafter, and specifically during ± digit time and C, O, $T_1$, $T_2$ and $T_3$ mode times, the AND gate 934 translates to its output circuit 934$_O$ C, O, $T_1$, $T_2$ and $T_3$ mode pulses received from the address rings and translated by an OR unit 935. These pulses are applied to the register advance OR unit 937 (FIG. 21) which steps the 13-position register five times and thereby conditions the latter to receive and store the multiplicand from track storage.

Storage of the multiplicand as last mentioned occurs by operation of the AND gate 932 which translates both to an AND gate 938 and through its own output circuit 932$_O$ to the serial add OR unit 779 (FIG. 20) 1–8 digit pulses received from the digit address rings (FIG. 3). The AND gate 938 opens up at M mode time and applies through its output circuit 938$_O$ to the read-out OR unit 637 and the buffer OR unit 677' M mode pulses which open up the read-out AND gates 635–643 and store each digit of the multiplicand in succession in the buffer. The digit pulses translated by the AND gate 932 to the serial add OR unit 779 cause the buffer trigger 782 to be turned on at O mode time through AND gate 781, and thereby apply −A and −B pulses through the AND gate 784 to the add gates of the buffer. This causes the buffer to "roll" and insert the number stored in the buffer serially into the adder in the manner explained above in connection with the addition process. It should also be noted at this point that the serial add OR unit 779 conditions the AND gate 780 to translate O mode pulses to the complementing AND gates of the buffer to complement each digit of the multiplicand as it is read-in from the track if the true complement trigger 776 is off at this time or to leave it in true form if the latter is on. The adder and 13-position register are stepped at $P_2$ mode time of each of digit 1–8 times to store the multiplicand in the 13-position register.

After a maximum of eight multiplicand digits have been read from the storage tracks and stored in the 13-position register as described, the $P_2$ pulse occurring at the end of the eighth digit time advances the register and adder to place the first digit of the multiplier again in the adder. This first digit is again compared in the buffer in the manner previously described. Although the digit had a binary 1 added to it just before it went into the register as explained above, if it is yet unequal to the 9 stored on the buffer side of the compare unit the operation above described repeats. In doing so, however, it will be noted that the multiplicand as it is read-in from the storage tracks is added to itself by the action of the buffer and adder which is equivalent to a multiplication of two.

This comparison of the first multiplier digit in the compare unit continues until after successive cycles of operation, adding a binary 1 each time to the multiplier digit, the multiplier digit is shown upon comparison to equal a binary 9. When this occurs the compare unit develops a voltage in its "equal" output circuit 876 which is applied to the AND gate 931. Note in this case that no voltage is developed in the unequal output circuit 880 of the compare unit and thus the AND gates 932 and 933 are shut down. The AND gate 931 thereupon translates a ± digit pulse from the address ring to each of three AND gates 941, 942 and 943. If the register sign trigger 890 is on, the AND gate 941 translates an I mode pulse through its output circuit 941$_O$ to the complement OR unit 695 of the adder which thereupon complements the 9 now standing in the adder to a zero since the register sign trigger being on shows that the partial product is standing in the register in its true form. If the register sign trigger 890 is off, the AND gate 941 does not open up and the 9 (the first multiplier digit) standing in the adder is left as a 9.

The AND gate 934 now transmits to the register advance OR unit 937 five mode pulses C, O, $T_1$, $T_2$, and $T_3$ to step the register five times and bring into the adder the first digit of the partial product. The AND gate 943 thereupon translates a $T_4$ pulse through its output circuit 943$_O$ to the register advance OR unit 937 to step the register once more so that if the carry store trigger 795 is on (indicating a carry from the last addition into the partial product) a $P_1$ pulse can be translated through the AND gate 942 and its output circuit 942$_O$ to the adder carry OR unit 797. There is thereby inserted through the OR unit 791 and the AND gate 792 a pulse which is equivalent to adding a binary 1 as a normal carry into the 10's column of the partial product. The 13-position register is stepped at $P_2$ mode time (AND gate 756, FIG. 14) of the ± digit time and likewise at $P_2$ mode time through digit 1–8 times but nothing occurs during this period except the register shift. This places the second multiplier digit in the adder ready for comparison.

At the time the AND gate 943 shifted the register with a $T_4$ pulse, it also applied a $T_4$ pulse through its output circuit 943$_O$ to an OR unit 944 which in turn translated the pulse to the "on" input of a first trigger unit 955 of a conventional binary 5 counter ring having in addition trigger units 956 and 957. Each of these triggers is initially reset off from the machine reset line as shown. An AND gate 958 couples the on input and output circuits of the trigger 955 to both the off and on input circuits of the trigger unit 956, and the on output circuit of the latter is connected to both the on and off input circuits of the trigger unit 957. The on output circuit of the latter is connected to the off input circuit of the trigger 955. Thus each time that the compare unit shows an equal resulting in a $T_4$ pulse being supplied through the OR unit 944 to the counter 955–957, the latter steps one step and thereby counts the number of multiplier digits which have been used up in the multiplication process. At the end of the fifth count, showing that all of the five multiplier digits have been used up, the trigger 955 is turned off by the trigger 957 and the latter also turns off the multiply trigger 929. Note that just prior to the $T_4$ pulse which last advanced the counter 955–957 and caused the multiply trigger 929 to be turned off, the 13-position register is stepped five times at C, O, $T_1$, $T_2$, and $T_3$ mode times through OR unit 935 to place the eight highest-order digits of the product in the 8-position register. The five lowest-order digits of the product are lost when the 8–13 trigger is immediately thereafter turned off through an AND gate 805*a* at $P_1$ mode and ± digit times when the calculate trigger 115 is now turned on as follows.

An end-of-multiply fall in potential is developed in the output circuit $\mathbf{929_O}$ of the multiply trigger 929 when the latter turns off as just explained, and this potential is applied to the OR unit 114 of MACHINE PROGRAM to turn the calculate trigger 115 on and thereby start the PROGRAM SEQUENCE SELECTOR again into operation looking for the next program instruction.

*Calculation—Division*

The division program instruction is so timed in the present calculating machine that a division operation is initiated with the divisor stored in the 8-position register when the calculate trigger 115 of MACHINE PROGRAM is turned off at the M mode of ± digit time by the division program voltage applied through the OR unit 118 and the AND gate 120. The division program voltage is applied through a polarity inverter 882 to the OR unit 885 (FIG. 26) to the first sector trigger 886 to turn the latter on as in the multiplication operation previously described. In fact, the operation of this trigger and that of the 2–12 sector trigger 906 is the same as that described above in connection with a multiplication operation, and effects storage of the divisor in true form in the M modes of the storage drum.

When the 2–12 sector trigger 906 turns off, it turns on a thirteenth sector trigger 962 through an AND gate 963 to which the division program potential is also applied. When the sector trigger 962 turns on, it conditions a plurality of AND gates 964–967. The divisor continues to be stored in the M modes of the last or twelfth sector digits by application of a control potential from the trigger 962 through the OR unit 907 to the AND gate 908 in similar fashion to the operation of the thirteenth sector trigger 910 during multiplication.

The true complement trigger 776 (FIG. 20) was reset off at I mode of ± digit time through AND gate 777 just before the calculate trigger 115 of MACHINE PROGRAM turned off at M mode of ± digit time on the division program instruction. The AND gate 964 now translates an M mode pulse at ± digit time to an AND gate 968, which is opened up by the on condition of the true complement trigger and in turn translates the M mode pulse to the true complement trigger OR unit 775–1 to turn the true complement trigger 776 off. This off condition of the true complement trigger causes each digit of the divisor to be complemented in the buffer in order to enable the latter to roll each digit into the adder to be there "subtracted" from the dividend which it will be explained below is stored in the 13-position register in true form. At the same time, the M mode pulse is translated through the output circuit $\mathbf{960_O}$ of the gate 964 to an OR unit 969 (FIG. 22*b*) which translates the M mode pulse through the OR unit 905 to the OR units 899, 901, 904 and 902 and thereby causes a zero to be emitted to the trunk lines 652–659. This M mode pulse is also applied to the OR unit 677 of the adder so that the emitted zero last mentioned is stored in the adder. The M mode pulse is also applied to the 8–13 register trigger 805 to turn the latter on and thereby connect the 5 and 8-position register in series between the adder and buffer. Lastly, this M mode pulse is applied to an AND gate 970 and is translated by the latter if the register sign trigger 890 is off, the translated pulse being applied from the output circuit $\mathbf{970_O}$ of the AND gate 970 to the OR unit 891 (FIG. 20) to turn the register sign trigger 890 on. This setting of the trigger is required to tell the calculating machine during a subsequent program instruction, such as a "store" instruction presently to be described, that the number standing in the register is in true form.

The AND gate 965 translates through its output circuit $\mathbf{965_O}$ to the 5-position register OR unit 755′ at ± digit time four mode pulses C, O, $T_1$, and $T_2$, translated through an OR unit 972, to step the 5-position register through four steps. The AND gate 966 translates through its output circuit $\mathbf{966_O}$ to the 5-position register OR unit 755′ a ± digit $T_3$ mode pulse to step the 5-position register one more step. This fills the 5-position register with zeros since a zero stands stored in the adder at this time. Both the 5 and 8-position registers are stepped once more by a $P_2$ pulse translated through the AND gate 756 (FIG. 14) so that the initial 6 positions of this 13-position register store zeros.

The AND gate 967 is opened by a positive potential applied to one of its input circuits at all times except during the time the ± digit trigger 51 of FIG. 3 is on, and at C mode time of digits 1–8 the gate accordingly translates through its output circuit $\mathbf{967_O}$ C mode pulses to the read gate OR unit 637 and to the adder advance OR unit 677. Thus the dividend (up to eight-digit length) stored in the C modes of the storage drum is read into and stored in the adder digit by digit, and each digit entered successively into the 13-position register at $P_2$ mode time by $P_2$ mode pulses translated through the AND gate 756 of FIG. 14. After the 13-position register is stepped by the $P_2$ mode pulse of digit 8, its output 5 positions are filled with zeros, its input 8 positions are filled with the possible 8 digits of the dividend, and a zero stands in the adder. It will be noted that the dividend is stored in the 13-position register in true form. The C mode pulses translated by the AND gate 967 are also applied to an OR unit 971 at the input of the carry store trigger 795 to turn the latter on. This is required since division is accomplished by a "successful" reduction process in which the "success" of each step of division is indicated, as will be more fully made apparent hereinafter, by a carry in the carry store trigger 795 remaining at the end of the division step and an initial such carry is required at the very outset of the division process.

The thirteenth sector division trigger 962 is turned off by an eighth digit pulse from the address rings, and upon turning off it turns both a division trigger 973 and a first ± digit trigger 974 on. The division trigger 973 conditions a plurality of AND gates 975–980, and would condition an AND gate 981 except for the fact that the latter is prevented from translating by the on output circuit of the digit trigger 974.

The AND gate 975 translates to its output circuit during ± digit time the four mode pulses C, O, $T_1$, and $T_2$ translated through the OR unit 972. These translated pulses are applied to the 13-position register advance OR unit 937 to step the 13-position register four times. It is stepped again at $T_3$ mode time of the ± digit by a $T_3$ pulse translated to the output circuit $\mathbf{976_O}$ of the AND gate 976 and applied to the register OR unit 937. In this, the AND gate 976 is opened for this purpose through an OR unit 893 from the output circuit $\mathbf{776_{O-1}}$ of the true complement trigger 776 or the output $\mathbf{795_{O-1}}$ of the carry store trigger 795. This causes loss of the $T_3$ pulse only when the condition of no carry and true register occurs; this occurs only on the overdraw correction. The 13-position register is stepped again at $P_2$ mode time by a $P_2$ mode pulse translated through the AND gate 756 of FIG. 14. The 13-position register in stepping six times as last described places the highest order digit of the dividend in the adder.

The AND gate 977 translates through its output circuit $\mathbf{977_O}$ both to the read gate OR unit 637 and to the buffer advance OR unit 677′ M mode pulses, which effect read-out from the storage drum and storage in the buffer of successive digits of the divisor from the storage track.

The AND gate 978 translates through its output circuit $\mathbf{978_O}$ to the serial add OR unit 779 a positive energizing potential at all times when the ± digit trigger 51 is not on (i.e. at digit times 1–8). Thus each digit of the divisor read-in from the storage track and stored in the buffer is complemented at O mode time by O mode pulses translated through the AND gate 780 conditioned for this purpose by the off condition of the true complement trigger 776. Each complemented digit of the divisor is then inserted into the adder when the buffer starts to roll at O mode time by operation of the AND gate 781, the buffer trigger 782, and the adder trigger 789 operating as explained above in connection with the addition operation. It can be shown that the "addition" (actually a subtraction since the dividend is in true form and the divisor is in complemented form) digit by digit of the divisor to the highest-order digits of the dividend in the adder results in a carry turning the carry trigger 794 on if the reduction process effected by this addition is "successful." The carry trigger 794 on being turned off at $P_2$ mode time (AND gate 756) turns the carry store trigger 795 on to place the carry back in the adder at O mode time of each digit by operation of the serial add OR unit 779 (energized through gate 978, the AND gates 796 and 792, and the OR units 797 and 791). Note in this regard that the carry store trigger started in the on condition (by operation of AND gates 967 at C mode and digit 1 times) so that an initial one is inserted in the units column in the adder when the carry store trigger immediately turns off at O mode and digit 1 times. After the eighth digit of the divisor and dividend has been thus added and if a "successful" reduction thereupon occurs, a one is inserted in the highest order digit position of the quotient by operation of the AND gate 981 which translates through its output circuit $981_O$ an M mode pulse at ± digit time. In this regard, note that the first digit trigger 974 is turned off by the ± digit pulse occurring in the first sector after this trigger was turned on, and thus conditions the AND gate 981 after that time. The latter is further conditioned to open by the potential of the output circuit $776_{O\text{-}1}$ of the true complement trigger 776, which is off at this time, and by the output potential of the output circuit $795_O$ of the carry store trigger 795 which is on if the reduction last described is a successful one. The M mode pulse translated by the gate 981 is applied to the OR unit 791 (FIG. 20) at ± digit time of the succeeding sector, is entered into the adder by operation of the gate 792 (also turning off the carry store trigger 795), and is stepped into the 13-position register by the $P_2$ mode pulse of ± digit time.

The foregoing described cycle of operation repeats until that step of the adder operation where no carry is obtained thereby to indicate an "unsuccessful" reduction or "overdraw." Whenever this occurs, the AND gate 980 is conditioned by a potential applied from the output circuit $795_{O\text{-}1}$ of the carry store trigger 795 (which is now off), is further conditioned by the output circuit $776_{O\text{-}1}$ of the true complement trigger 776 which is still off, and thereupon translates a $P_1$ mode pulse during ± digit time through an OR unit 983 to the true complement OR unit 775 to turn the true complement trigger 776 on. The next additive step through the succeeding digits 1–8 now occurs without complementing the divisor as it is entered through the buffer so that the addition step in the adder occurs with the divisor and dividend digits in true form. The "overdraw" or amount of last reduction is thereupon restored back into the dividend. There is the further result that the AND gate 976 is no longer opened by an appropriate potential supplied through the OR unit 983 from either the true complement trigger 776 (now on) or the carry store trigger 795 (since the last addition inherently results in a carry). While the 13-position register stepped six times before the last addition step, it fails to be stepped at $T_3$ mode time immediately after the addition step due to the closing of the gate 976 for reasons last mentioned. Therefore the 13-position register is stepped only 5 times during the next stepping cycle, and this results in a column shift of the dividend to the left in the register.

After the last-mentioned addition step is completed, and a carry inherently results as mentioned, the AND gate 979 is now conditioned by the on condition of the carry store trigger 795 and the on condition of the true complement trigger 776 and accordingly translates a $P_1$ mode pulse at ± digit time. This translated pulse is applied through the OR unit 944 to the five step counter 955–957 to advance the latter one step and thus indicate that one digit of the five digit divisor has been exhausted in the division process. The translated $P_1$ pulse is also applied through the OR unit 983 to the true complement OR unit 775–1 and thus again turns the true complement trigger 776 off.

Thereafter the division cycles of operation continue as described through five steps of the counter 955–957, the last step occurring at the end of a true form addition in the adder following a last "unsuccessful" reduction. Just prior to completion of the fifth count by the counter 955–957, both of the counter triggers 956 and 957 are on and this conditions an AND gate 985 to translate the $P_1$ mode pulse translated by the AND gate 979 after the last addition step just mentioned. This pulse is thereupon translated through an OR unit 986 to an OR unit 986′ (FIG. 20) to turn the carry store trigger 795 off so that the carry in the store trigger is not inserted into the adder at the following O mode time. The $P_1$ pulse tanslated by the gate 979 is applied through the OR unit 944 to the counter 955–957, which in counting the fifth step causes all of the counter triggers to be turned off. The counter trigger 957 upon turning off turns the division trigger 973 off to complete the division operation. This leaves the quotient stored in the 13-position register ready for processing by the next program instruction. The division trigger 973 in turning off applies an end of division potential through its output circuit $973_O$ to the OR unit 114 of MACHINE PROGRAM to turn the calculate trigger 115 on and thereby start the PROGRAM SEQUENCE SELECTOR again into operation looking for the next program instruction. The calculate trigger 115 in turning on conditions the AND gate **805*a* at $P_1$ mode and ± digit times to turn off the 8–13 trigger 805**.

GENERAL PROGRAMMED OPERATIONS

(1) *Store Operation*

A "store" program instruction potential is developed in the output circuit 268 of the PROGRAM DECODER and is applied to a store trigger 990 shown in FIG. 22*c*. In the calculating machine described herein, it is arranged that a program blank follow the store program instruction so that the latter exists for only one sector interval. When the store program potential drops at the end of the store sector interval, it turns the store trigger 990 on, and the off output potential appearing in the output circuit $990_O$ of this trigger is applied through OR unit 757 (FIG. 21) to condition the AND gate 756 to translate $P_2$ mode pulses and thereby step the register and adder at $P_2$ mode time. At the same time, the output potential of the trigger 990 conditions several AND gates 991–994. The AND gate 991 during ± digit time translates an M mode pulse through the OR unit 894 (FIG. 22*b*) to the AND gates 895 and 896. If the register sign trigger 890 of FIG. 20 is off, the AND gate 896 translates this M mode pulse through OR units 897, 898, 901 and 903 to emit a nine to the adder through OR units 644–651 (FIG. 14). The M mode pulse translated by the AND gate 991 is also applied through the adder OR unit 677 to the advance line of the adder so that the nine last mentioned is stored in the adder. On the other hand, if the register sign trigger 890 is on, the M mode pulse translated by the AND gate 991 is in turn translated by the OR unit 894 and AND gate 895 to emit a zero which is thereupon stored in the adder.

The AND gate 994 translates C mode pulses to the write OR unit 676 (FIG. 17) both during ± digit time and digit times 1–8 so that the binary number stored in the adder at C mode time of each of these digit times is written out into the C modes of the storage track.

The AND gate 992 translates an I mode pulse during each of digit times 1–8 if the carry store trigger 795 is on at any of these I mode times, and these translated I mode pulses are applied to the carry store OR unit 797 to add a carry into the adder and reset the carry store trigger in the manner previously explained.

The AND gate 993 translates 1–8 digit pulses if the register sign trigger is off, and these translated pulses condition two AND gates 995 and 996 respectively to translate M and $T_1$ mode pulses through an OR unit 997 to the adder complement OR unit 695. The adder thereby complements at M mode time the binary number received in the adder from the register and thereafter recomplements it at $T_1$ mode time after complemented number has been written into the storage drum at C mode time.

It will thus be seen that the store operation is one where the binary number stored in the register is transferred to and stored digit by digit in the adder, is complemented in the latter to true form if it had been stored in complemented form in the register, and is then written digit by digit into the C modes of the storage track. At the end of the sector interval during which the number is written into the storage track, an eighth digit pulse is applied to the store trigger 990 to turn the latter off and terminate the store operation.

(2) *Shift Left Operation*

The purpose of the shift left operation is to line up decimal places, or to permit side by side storage of two words having a total digit count not exceeding eight in number, or to cancel out the highest order digit of an ultimate eight digit number.

This program starts with the number in the 8-position register (FIG. 21) and with some superfluous insignificant digit standing in the adder. The control circuit for the shift left operation is shown in FIG. 22*d*, and includes three AND gates 1000, 1001, 1002 each having an input circuit to which the shift left PROGRAM DECODER output circuit 269 is coupled.

The AND gate 1000 also is supplied with a ± digit pulse and a $T_3$ mode pulse, and its output circuit $1000_O$ constitutes one input circuit of an OR unit 1003 (FIG. 22*b*) having an output circuit coupled to two AND gates 1004 and 1005. The AND 1004 has a second input circuit comprised by the −Reg. output circuit $890_O$ of the register sign trigger 890 (FIG. 20) and its output circuit comprises one input circuit of the OR unit 905. The AND gate 1005 also has a second input circuit comprised of the +Reg. output circuit $890_O$–1 of the register sign trigger 890, and its output circuit comprises an input circuit of the OR unit 897. Thus at ± digit and $T_3$ mode times, a $T_3$ mode pulse is translated through the AND gate 1000 and OR unit 1003 to the AND gates 1004 and 1005, and a zero is emitted to the adder by operation of the gate 1004 if the register sign trigger 890 is on or a binary 9 is emitted to the adder by operation of the AND gate 1005 if the register sign trigger 890 is off. There is thus applied to the adder a zero if the number standing in the 8-position register is in true form or a 9 if the number is in complemented form. The $T_3$ pulse translated by the AND gate 1000 is also applied to the adder OR unit 677 and causes the adder to store the zero or 9 thus presented to it.

The AND gate 1002 has a second input circuit to which a positive potential is applied from the on output circuit $59'_O$ of the eighth digit trigger 59, which always has maximum positive value except during eighth digit time, and the output circuit $1002_O$ of this AND gate comprises an input circuit of the OR unit 757 (FIG. 21). Thus the AND gate 756 following the latter unit translates $P_2$ mode pulses in each of digit times ± and 1–7 to step the 8-position register and adder. Accordingly, the zero or 9 stored in the adder as last described is inserted at ± digit and $P_2$ mode times into the input of the 8-position register, and the number standing in the latter is stepped at digit times 1–7 through the adder and back into the register.

The AND gate 1001 includes a second input circuit to which O mode pulses are applied and a third input circuit to which a positive potential is applied during all digit periods with the exception of the ± digit period. Accordingly, the O mode pulses translated to the output circuit $1001_O$ of the AND gate 1001 during digit periods 1–8 are applied to the carry OR unit 797 (FIG. 20) to insert into the adder at O mode time any carry stored in the carry store trigger 795 in digit 1–8 times.

The number standing in the 8-position register is stepped at $P_2$ mode time in the manner earlier explained through the adder during digit times 1–7. There is no register stepping at the eighth digit time, so that the number left in the register is the column-shifted-left number desired by this operation.

(3) *Shift Right Operation*

It is the purpose of the shift right operation to line up decimal points, or to effect the storage or use from storage in side by side relation of two numbers having a total digit count not exceeding eight in number, or to cancel out the lowest order digit of an eight digit number.

As in the shift left operation last described, the shift right program starts with the number in the 8-position register and with some superfluous insignificant digit standing in the adder.

The shift right control circuit is shown in FIG. 22*e*, and includes three AND gates 1007, 1008, and 1009. The ± digit pulses are applied from the address rings of FIG. 3 to a second input circuit of each of these AND gates and the output circuit $1007_O$ of the gate 1007 comprises one input circuit of the OR unit 757 (FIG. 21) which conditions the following AND gate 756 to translate $P_2$ mode pulses to step the 8-position register and adder at $P_2$ mode time.

The AND gate 1008 has a C mode pulse applied from the address rings to an additional input circuit of this gate, and accordingly translates an O mode pulse during ± digit time to the add carry OR unit 797 (FIG. 20) to effect insertion into the adder of any carry stored in the carry store trigger 795.

The AND gate 1009 has a $T_3$ mode pulse applied to another of its input circuits, and its output circuit $1009_O$ comprises an input circuit of the OR unit 1003 (FIG. 22*b*) which through AND gates 1004 and 1005 causes a zero or nine to be emitted to the adder according to whether the register sign trigger 890 is respectively on or off. The output circuit of the AND gate 1009 also comprises one input circuit of the adder OR unit 677, so that the $T_3$ pulse translated by this gate causes the adder to store the zero or nine presented to it. Since the register and adder are thereupon stepped at $P_2$ time under control of the ± digit pulse translated by the AND gate 1007, the number remaining in the register is the column shifted right number desired by this operation.

(4) *Round and Shift Operation*

The purpose of the round and shift operation is to add a five to the lowest order digit of a number standing in the 8-position register, thereafter to add any carry which may occur by virtue of this addition, and to effect a shift right operation to cancel out the resultant lowest order digit of the number.

The control circuit for the round and shift operation is shown in FIG. 22*f* and comprises seven AND gates 1011–1017 each having a common input circuit to which the "around and shift" program output circuit 271 of the PROGRAM DECODER is coupled. The output circuit 271 last mentioned also comprises one input circuit of the OR unit 757 (FIG. 21) so that the 8-position register and adder are stepped at each digit time by $P_2$ mode pulses.

The AND gate 1011 includes two additional input circuits to which a ± digit and M mode pulse are applied, and its output circuit $1011_O$ is coupled to the OR unit 937 (FIG. 21) so that the translated M mode pulse of ± digit time steps the 8-position register and the adder to place in the adder the lowest order digit of the number standing in the 8-position register.

The AND gate 1012 includes two additional input circuits to which a ± digit and a C mode pulse from the address rings are supplied, and its output circuit $1012_O$ constitutes one input circuit of the OR unit 899, 900 and 903 (FIG. 22*b*) so that the C mode pulse translated by this gate during ± digit time causes a binary five to be emitted to the buffer. The output circuit $1012_O$ also comprises one input circuit of the buffer OR unit 677', and the translated C mode pulse thus causes the buffer to store the binary five which is presented to it as last described.

The AND gate 1013 includes three additional input circuits, to two of which ± digit and C mode pulses are applied and to the third of which the output circuit $890_O$ of the register sign trigger is applied. The fact that the trigger 890 is on indicates that the number standing in the register is in true form. The true complement trigger 776 was set off at I mode and ± digit times (gate 777 and the calculate trigger 115 being on). The output circuit $1013_O$ of this gate comprises an input circuit of the true complement OR unit 775-1 (FIG. 20), and an on condition of the register sign trigger 890 accordingly conditions the AND gate 1013 to translate a C mode pulse during ± digit time through the OR unit 775-1 to the true complement trigger 776 to turn the latter on; otherwise the true complement trigger remains off.

Cooperating with the AND gate 1013 is the AND gate 1014 which has an input circuit coupled to the output circuit $59'_O$ of the eighth digit trigger 59 so that this AND gate develops a positive output potential in its output circuit $1014_O$ during all digit times except the eighth digit time. The output circuit $1014_O$ comprises an input circuit of the serial add OR unit 779 (FIG. 20), so that the positive potential of the gate 1014 is applied to both of the AND gates 780, 781 and 796. The gate 780 causes the number standing in the buffer to be complemented at O mode time, if the true complement trigger 776 is off, so that this number corresponds in form to the complemented number standing in the register (the register sign trigger 890 in this case being off). The gates 781 and 796 cause the buffer trigger 782 to turn on also at O mode time and so pulse the buffer that the five which is stored in the buffer at this time is serially added into the adder. This serial addition step was considered in detail above under the subject of the "add" operation.

The AND gate 1015 has two additional input circuits to which 1-8 digit pulses are applied together with M mode pulses, and the latter pulses translated by this gate during each of digit times 1-8 are applied both to the OR unit 969 (FIG. 22*b*) and to the buffer advance OR unit 677' to cause zeros to be presented to and stored in the buffer during each of digit times 1-8. The operation of the AND gate 1013 in turning the true complement trigger 776 off or leaving it on according to the on or off condition of the register sign trigger 890 causes these zeros to be complemented or left true to conform to the form of the number in the register, and the operation of the gate 1014 causes these zeros effectively to be added to the number standing in the register during each of digit times 1-7 as the 8-position register is stepped with the adder by $P_2$ mode pulses translated by the AND gate 756 conditioned by the "round-and-shift" program control potential applied to the OR unit 757.

The AND gate 1016 receives eighth digit and C mode pulses, and translates the latter through its output circuit $1016_O$ to the OR unit 1003 (FIG. 22*b*) to cause either a zero or nine to be presented to the adder through operation of the AND gates 1004 and 1005 and according to the on or off condition of the true complement trigger 776. This translated C mode pulse is also applied to the adder OR unit 677 to cause the zero or nine last mentioned to be stored in the adder. When the 8-position register and adder are stepped by the next $P_2$ pulse translated by the AND gate 756, the zero or nine stored in the adder as last mentioned becomes stored in the input to the 8-position register thus effecting a shift right operation to cancel out the lowest order digit of the number standing in the register. Since a five was added as above described to the lowest order digit of the number in the register, the foregoing described operation insures that the five is added in correctly without regard to whether the number standing in the register is in true form or in complemented form, particularly since it permits a complemented number to become larger or a true number also to become larger.

The AND gate 1017 has ± digit and I mode pulses applied to two of its input circuits, and it may be noted that these pulses are those occurring in the next sector following that to which the foregoing operation pertains. This is because the round-and-shift program (and all other programs) appear in the output circuits of the PROGRAM DECODER at the end of I mode time when the PROGRAM DECODER triggers 225-228 are set by the AND gate 230 associated therewith. Thus the ± digit and I mode pulses is available at this time to add to the rounded and shifted number any carry stored at this time in the carry store trigger 795 (FIG. 20). To this end, the I mode pulse translated to the output circuit $1017_O$ of the AND gate 1017 is applied to the OR unit 797 to cause the carry to be inserted into the adder and there added to the lowest order digit of the rounded number.

(5) *Reset Register*

The reset register control circuit is shown in FIG. 22*g* and includes two AND gates 1019 and 1020 having a common input circuit coupled to the reset register output circuit 272 of the PROGRAM DECODER.

The AND gate 1020 has two additional input circuits, one receiving C mode pulses from the address rings of FIG. 3 and the other receiving the potential of the off output circuit $890_O$ of the register sign trigger 890. The output circuit $1020_O$ of this gate comprises an input circuit of the register sign trigger OR unit 891 (FIG. 20) so that the register sign trigger 890 being on to open gate 1020 is turned off by the first C mode pulse translated by this gate. The AND gate 1019 has a second input circuit to which C mode pulses are applied and its output circuit $1019_O$ comprises one input circuit of the OR unit 927 (FIG. 22*b*). C mode pulses translated by AND gate 1019 are accordingly translated through the OR units 927, 897, 898, 901, 903 and 902 to emit 9's to the adder. The output circuit $1019_O$ of the gate also comprises one input circuit of the adder OR unit 677, so that the 9's emitted to the adder are stored therein. The "reset register" output circuit 272 of the PROGRAM DECODER is coupled to the register stepping OR unit 757 (FIG. 21) so that the 9's stored in the adder are advanced into the 8-position register at $P_2$ mode time as the register and adder are stepped under control of the $P_2$ mode pulses translated by the AND gate 756 of FIG. 21. It is apparent that this operation ensures that the register sign trigger is set off and fills the 8-position register with 9's during the sector interval when the "reset register" program instruction occurs.

(6) *Skip Operation*

The PROGRAM DECODER of FIG. 8 develops four skip program controls in its output circuits 273-276. Two of these are instructions to skip on a positive number (+) or to skip on a negative number (−), and the other two are to skip on two specific program instructions identified as an "*x*" or "no-*x*" which essentially designate skips other than on the arithmetic sign of the number.

The skip control circuit is schematically shown in

FIG. 28, which should be considered together with FIGS. 6 and 8 in the manner shown in FIG. 29.

The skip program instruction is read and stored in the input triggers 218–221 of the PROGRAM DECODER in a given sector time, and the skip operation takes place during the following three sector times. In order that these sector time relationships may be clearly identified in the following description, specific sector times will be assumed by way of example.

Assume that any of the four skip program instructions are read and stored in the input triggers of the PROGRAM DECODER at some $P_1$ or $P_2$ mode of any digit of sector two time (gate 223, FIG. 8). At the ± digit and I mode times which mark the initiation of sector three time the program skip voltage is available (by operation of gate 230) at the appropriate one of the output circuits 273–276 of the PROGRAM DECODER and continues through sector three time, and this instruction is applied to an OR unit 1022 of FIG. 28 and an individual one of the AND gates 1023–1026. The skip instruction is translated through the OR unit 1022 to an AND gate 1027, and at ± digit and C mode times this gate translates a C mode pulse through its output circuit $\mathbf{1027_O}$ to the read OR unit 537 (FIG. 14) to read into the input of the buffer an "*x*" or "no-*x*" specific instruction if such is desired for purposes of the skip operation. The "*x*" instruction may, for example, be a binary two and the "no-*x*" instruction a binary four. The C mode pulse translated by the AND gate 1027 is also applied to the buffer OR unit 677′ to cause the "*x*" or "no-*x*" instruction to be stored in the buffer.

If an "*x*" instruction is stored, the potential of the output circuit $\mathbf{616'_O}$ of the buffer trigger 616′ is applied to the AND gate 1023, whereas if a "no-*x*" instruction occurs the output circuit $\mathbf{617'_O}$ of the buffer trigger 617′ is applied to the AND gate 1024. There is also applied to the AND gates 1023 and 1024 an eighth digit pulse, and should an "*x*" or "no-*x*" skip instruction occur as described this eighth digit pulse is translated by the appropriate one of the AND gates 1023 or 1024 through an OR unit 1029 to a skip OK trigger 1030 to turn the latter on at the end of the eighth digit pulse which it is apparent marks the end of the third sector time and the beginning of the fourth sector time. If the program instruction should be a skip on (−) or a skip on (+), the potential of the output circuit $\mathbf{890_O}$ of the register sign trigger 890 (FIG. 20) is applied to the AND gate 1025 and the potential of the output circuit $\mathbf{890_{O-1}}$ of this gate is applied to the AND gate 1026 and the appropriate one of these gates will translate the potential through the OR unit 1029 to the skip OK trigger 1030. In the case of these latter two program instructions, the skip OK trigger 1030 is turned on at ± digit and I mode times of sector four when the skip program instruction potential disappears by operation of the PROGRAM DECODER.

During sector three time, a $P_1$ or $P_2$ skip program instruction may be stored in the input triggers 218–221 of the PROGRAM DECODER if it is desired to make a particular setting of the $P_1$–$P_2$ trigger 195 (FIG. 6) in a manner and for a purpose presently to be explained.

Now at ± digit and I mode time of sector four, the initial skip program instruction voltage in one of the output circuits 273–276 of the PROGRAM DECODER disappears by operation of the latter, and this causes a skip trigger 1031 to turn on and thereby shut down a plurality of AND gates 1032–1040 which are included in the output circuits 263–271 of the PROGRAM DECODER. This prevents translation to the calculating machine of any program instruction received in these PROGRAM DECODER output circuits. Thus as shown in FIG. 28, if the $P_1$–$P_2$ program instruction last mentioned (relating to the setting of the $P_1$–$P_2$ trigger 195) is a program No. 2 "subtract" one it will not be transmitted to the calculating machine at ± digit and I mode times (gate 230) of sector four when it appears in output circuit 265 of the PROGRAM DECODER. Rather the "subtract" instruction will be applied through a circuit 1041 to an AND gate 1042 which at ± digit and I mode time translates an I mode pulse to a $P_1$–$P_2$ store trigger 1043 to turn the latter on. Also during the fourth sector time, there will be stored in the input triggers 218–221 of the PROGRAM DECODER a $P_1$ or $P_2$ program instruction relating to a specific setting of the digit ring triggers 166–174 of the PROGRAM SEQUENCE SELECTOR, this instruction being utilized in a manner presently to be explained.

At the ± digit and I mode time of the fifth sector, the $P_1$–$P_2$ store trigger 1043 is turned on as earlier mentioned if a "subtract" skip program instruction had been received during the last sector time. Also, the off output potential of the skip trigger 1031 is applied to an AND gate 1044 which at the ± digit and I mode time of sector five translates an I mode pulse to a third sector skip trigger 1045 to turn the latter on. The potential developed in the output circuit $\mathbf{1045_O}$ of the trigger 1045 is applied in common to one input circuit of a plurality of AND gates 1046–1054 each of which has a second input circuit comprised by one of the output circuits 263–271 of the PROGRAM DECODER as shown. The respective output circuits $\mathbf{1046_O}$–$\mathbf{1054_O}$ of the AND gates 1046–1054 constitute one input circuit of respective OR units 1055–1063 having output circuits which comprise an individual input circuit of an AND gate associated with the digit ring triggers 166–174 as shown.

When the third sector trigger 1045 turns on as above described it opens up the AND gates 1046–1054, and at the same time cooperates with the skip OK trigger 1030 to open up three AND gates 1065, 1066, and 1067. Thus at the ± digit and C mode times of sector five, the AND gate 1065 translates a C mode pulse through an inverter 1068 to a plurality of diode devices 1069 which are connected as reset diodes to the digit ring triggers 166–174 and the $P_1$–$P_2$ trigger 195 in the manner of the machine reset diodes 175 and 197. There is one difference, however, in that the diodes 1069 are connected to the trigger units 166–174 and the $P_1$–$P_2$ trigger 195 in such manner that all of these triggers are reset off by the C mode pulses translated by the AND gate 1065.

The $P_1$–$P_2$ program instruction last mentioned (relating to a particular desired setting of the digit triggers 166–174) and which was stored in the triggers 218–221 of the PROGRAM DECODER during sector four time becomes available at ± digit and I mode time of sector five as a program instruction voltage appearing on a selected one of the output circuits 263–271 of the PROGRAM DECODER. This voltage is applied through the appropriate one of the AND gates 1046–1054 and the OR units 1055–1063 to an input AND gate of one of the digit ring triggers 166–174. At ± digit and O mode time of sector five, the AND gate 1066 translates through its output circuits $\mathbf{1066_O}$ to the OR unit 211 of the digit ring an O mode pulse which cooperates with the particular program instruction voltage last mentioned to turn a selected one of the digit triggers 166–174 on and thereby condition the PROGRAM SEQUENCE SELECTOR to select a particular $P_1$ or $P_2$ program instruction for execution during the next succeeding skip operation. At the same time, if the $P_1$–$P_2$ store trigger 1043 is on at this time, it opens the gate 1067 which at ± digit and O mode time of the fifth sector translates an O mode pulse through its output circuit $\mathbf{1067_O}$ to the OR unit 212. This pulse turns the $P_1$–$P_2$ trigger 195 on so that a $P_2$ program, rather than a $P_1$ program, is selected in cooperation with the selected digit trigger 166–174 which was selected as last described. Thus the skip program selection is both by digit and $P_1$ or $P_2$ mode.

The skip operation is completed at ± digit and I mode times of the sixth sector time when the third sector skip trigger 1045 is turned off by an I mode pulse translated by the AND gate 1044. When the trigger 1045 turns off, it turns off with it both the skip trigger 1031 and the skip OK trigger 1030. One or more further skip instruction operations may follow, but the last skip instruction operation is used to reset the digit ring triggers 166–174 and the $P_1$–$P_2$ trigger 195 to the on or off condition which they had at the time the first skip program instruction was received and executed. The PROGRAM SEQUENCE SELECTOR thereupon continues its operation as before to select the next desired normal $P_1$ or $P_2$ program instruction for continued processing of data information in normal manner.

COORDINATED PROGRAM OPERATIONS

The foregoing description of the calculating machine of the present invention has treated each of the several types of arithmetic calculation operation as essentially separate and distinct functions of the machine. It will be appreciated, however, that these types of calculation operation follow one another in rapid sequence under control of the 218 available program instructions. These operations may occur sequentially in any order and even repetitively as necessary to perform desired mathematical calculations.

Further, while the calculating machine has been shown herein as of rather simple nature to perform a limited number of calculation functions on numbers of limited digit lengths, it will be apparent that this has been done by way of simplifying the description only and that the digit capacity and number of mathematical operations handled by the machine may be readily expanded in accordance with the disclosure teachings. For example, it will be noted that no use is made of the PROGRAM DECODER numbers 0 and 14 program instruction, and it will be apparent that these instructions when used with an arrangement similar to that of FIG. 28 may readily provide duality of function of certain program instructions such as that accomplished by the FIG. 8 arrangement in relation to the "subtract" program instruction. Thus temporary storage of partially processed data information or accumulation of minor, intermediate, and grand totals of processed data may readily be stored or accumulated in the $T_1$–$T_4$ modes of the storage drum by appropriate control in conformity with the teachings of the present disclosure.

It will accordingly be apparent from the foregoing description of the invention that it provides a novel drum storage arrangement and system which avoids important disadvantages and limitations of prior arrangements using magnetic drum storage, particularly in that data to be processed is stored in the drum in preestablished spatial storage positions with relation to program instructions applicable to such stored data information. In this, there is the advantage that much of the drum storage capacity is available for transient initial and processed data information while a limited amount of storage capacity is reserved for relatively long term drum storage of program instructions which relate to the data information flowing through the storage drum. Even in connection with the long term program instruction storage it is apparent that program instructions may quickly and readily be changed at will in a simple manner which does not require expensive, laborous, and time-consuming plug board wiring operations as heretofore required.

A calculating machine embodying the invention is accordingly characterized by a high degree of flexibility in its application to numerous and diversified calculation operations, yet is one of relatively simple construction which operates with exceptionally high rapidity yet with high precision and accuracy of its results. Its size, scope of operations, functions, and capacity is limited only as desirable for a particular application.

What is claimed is:

1. An information storage calculation system comprising, storage means having plural storage positions successively presented to store calculation program instruction information and data information interspersed in preselected spatial relationship in succeeding storage positions which permits the selection solely by spatial relationship and in succession of each instruction and its related data information for data processing, positional control means for determining and controlling said spatial relationship, and means controlled by said last-named means for translating to and from storage by spatial selection data and instruction information for processing.

2. An information storage calculation system comprising, positional control means for determining and controlling the translation with respect to predetermined fixed spatial relationships in successively available positions in storage of program instruction information and its related data information, means having plural successive storage positions for storing said information, means controlled by said positional control means for transferring to and from storage in said storage means each said instruction and its related data information while maintaining said spatial relationships thereof, and means responsive to each said program instruction information for receiving solely by spatial selection from storage its related data information for processing.

3. An information storage calculation system comprising, storage means having plural storage positions successively presented to store calculation program instruction information and data information interspersed in preselected spatial relationship in succeeding storage positions which permits the selection solely by spatial relationship and in succession of each instruction and its related data information for data processing, positional control means for determining and controlling said spatial relationship, means controlled by said positional control means for translating to and from relatively long term storage by spatial selection program instruction information, and means controlled by said positional control means for translating to and from relatively short term storage by spatial selection related to said stored instruction information a flow of data information for processing.

4. An information storage calculation system comprising, positional control means for determining and controlling the translation with respect to predetermined fixed spatial relationships in successively available positions in storage of program instruction information and its related data information, means having plural successive storage positions for storing said information, means controlled by said positional control means for transferring to and from storage in said storage means each said instruction and its related data information while maintaining said spatial relationships thereof, and means controlled by said positional control means and responsive to each said stored program instruction information for receiving solely by spatial selection from storage its related data information for processing and for returning to storage with said spatial relationships preserved processed data information.

5. An information storage calculation system comprising, positional control means for determining and controlling the translation with respect to predetermined fixed spatial relationships in successively available positions in storage of program instruction information and its related data information, means having plural successive storage positions for storing said information, means controlled by said positional control means for transferring to and from storage in said storage means each said instruction and its related data information while maintaining said spatial relationships thereof, and means operating under control of said positional control means for automatically transferring in storage data information to differing preselected spatial relationships with respect to its related instruction information during the interval of data storage in said storage means.

6. An information storage calculation system comprisinging, positional control means for determining and controlling the translation with respect to predetermined fixed spatial relationships in successively available positions in storage of program instruction information and its related data information, means having plural successive storage positions for storing said information, means controlled by said positional control means for transferring to and from storage in said storage means each said instruction and its related data information while maintaining said spatial relationships thereof, and means operating under control of said positional control means for automatically effecting, during the data storage interval in said storage means and at each of a plurality of transfer times, transfer in storage of data information to individual different spatial relationships with respect to its related stored instruction information.

7. An information storage calculation system comprising, positional control means for determining and controlling the translation with respect to predetermined spatial relationships in storage of program instruction information and data information, means for storing said information, means controlled by said positional control means for transferring to and from storage in said storage means said instruction and data information while maintaining said spatial relationships thereof, and means operating under control of said positional control means and partially in response to stored program instructions for automatically effecting an effective flow of data information through successive ones of individual different spatial relationships with respect to said stored instruction information and during the interval from data input storage to processed data output storage.

8. An information storage calculation system comprising, positional control means for determining and controlling the translation with respect to predetermined spatial relationships in storage of program instruction information and data information, means for storing said information, means controlled by said positional control means for transferring to and from storage in said storage means instruction and data information while maintaining said spatial relationships to permit spatial selection of program and related data information, and means controlled by said positional control means and responsive to program instructions for spatially selecting from storage desired data information for processing and for thereafter returning said processed information back into repetitive storage having predetermined individual different spatial relationships by which to permit subsequent successive repetitive spatial selections in performing a calculation function by repetitive use of said repetitively stored information.

9. An information storage calculation system comprising, positional control means for determining spatial relationships in storage of functionally coded program instruction information and data information, means for storing said information, means controlled by said positional control means for transferring to and from storage in said storage means said instruction and data information while maintaining said spatial relationships thereof, means for spatially selecting from storage stored program instructions and responsive to the individually coded forms thereof for deriving individual electrical control effects, and means responsive to each of said derived control effects for processing data information spatially related in storage to the program instruction from which said each control effect is derived.

10. An information storage calculation system comprising, positional control means for determining and controlling the translation with respect to predetermined spatial relationships in storage of functionally coded program instruction information and data information, means for storing said information, means controlled by said positional control means for transferring to and from storage in said storage means said instruction and data information while maintaining said spatial relationships thereof, means for spatially selecting from storage successive stored program instructions and responsive to the individually coded forms thereof for deriving individual successive electrical control effects, and means responsive to successive ones of said derived control effects for processing successive groups of data information each spatially related in storage to an individual one of the program instructions from which the individual control effect is derived.

11. An information storage calculation system comprising, storage means for storing interspersed calculation program instruction information and data information in preselected spatial relationship permitting the spatial-relationship selection of data and related instruction information for data processing, positional control means for determining and controlling said spatial relationship, means controlled by said positional control means for placing into storage and receiving from storage instruction information positioned in storage by said spatial relationship, and means controlled by said positional control means for placing into storage and receiving from storage by spatial selection data information positioned in interleaved relation to the instruction information applicable to each bit of stored data information.

12. A calculating machine comprising, storage means operating in repetitive cycles of predetermined periodicity for storing information presented in serial form, control means for developing at least one periodic control effect having a periodicity which is an integral multiple of said first periodicity, and means controlled by said control effect for distributing into preselected positions in storage calculation program instruction information interspersed with the data information to which each program instruction relates to permit subsequent spatial relationship selection by said control means of data and related program instructions for processing.

13. A calculating machine comprising, storage means operating in repetitive cycles of predetermined periodicity for storing information presented in serial form, means for developing at least one periodic control effect having a periodicity which is an integral multiple of said first periodicity, and means controlled by said control effect for distributing into storage in preselected spaced program instruction positions of said storage means calculation program instruction information and for distributing into storage in preselected positions intervening between said instruction positions data information to be processed by individual ones of said program instructions in accordance with predetermined positional relationship in storage of the data and instruction information.

14. A calculating machine comprising, storage means operating in repetitive cycles of predetermined periodicity for storing information presented in serial form, means fer developing at least one periodic control effect having a periodicity which is an integral multiple of said first periodicity, and means controlled by said control effect for distributing into relatively long term storage in preselected spaced program instruction positions of said storage means calculation program instruction information and for periodically distributing and redistributing into relatively short term storage in preselected positions interspersed with said preselected positions data information to be processed and the results of data processing by individual ones of said program instructions.

15. A calculating machine comprising, storage means operating in repetitive cycles of predetermined periodicity for storing information presented in serial form, means for developing at least one periodic control effect having a periodicity which is an integral multiple of said first periodicity, means controlled by said control effect for distributing into storage in said storage means calculation program instruction information stored in preselected spaced instruction positions and data information stored in preselected ones of several data storage positions intervening between successive instruction positions, and means controlled by said control effect at the completion of data information storage for redistributing said stored data information to storage in preselected other ones of said intervening data storage positions.

16. A calculating machine comprising, storage means operating in repetitive cycles of predetermined periodicity for storing information presented in serial form, means for developing at least one periodic control effect having a periodicity which is an integral multiple of said first periodicity, means controlled by said control effect for distributing into storage in said storage means calculation program instruction information stored in preselected spaced instruction positions and data information stored in preselected ones of several data storage positions intervening between successive instruction positions, and means controlled by said control effect and responsive to said stored program instruction information for processing under program instruction said stored data and for restoring the processed data in preselectable ones of said intervening data storage positions.

17. A calculating machine comprising, storage means operating in repetitive cycles of predetermined periodicity for storing information presented in serial form, means for developing at least one periodic control effect having a periodicity which is an integral multiple of said first periodicity, means controlled by said control effect for distributing into storage in preselected spaced program instruction positions of said storage means calculation program instruction information and for distributing into storage in preselected positions intervening between said instruction positions data information to be processed by individual ones of said program instructions in accordance with predetermined positional relationship in storage of the data and instruction in formation, and means controlled by said control effect and responsive to said stored program instruction for processing said stored data and for restoring the processed data in preselected positions intervening between said instruction positions.

18. A calculating machine comprising, storage means operating in repetitive cycles of predetermined periodicity for storing information presented in serial form, means for developing a plurality of periodic control effects each having a distinctive periodicity which is an integral multiple of said first periodicity, means responsive to one of said control effects for effecting storage of successive digit groups of data information in successive sector storage positions of said storage means, means responsive to a second of said control effects for effecting storage of successive digits of each digit group in successive digit storage subsectors occurring in each sector storage position of said storage means, and means responsive to a third of said control effects for effecting initial storage and at least one subsequent restorage of each said digits in any of a plurality of mode storage positions in each digit storage position of said storage means.

19. A calculating machine comprising, storage means operating in repetitive cycles of predetermined periodicity for storing information presented in serial form, means for developing a plurality of periodic control effects each having a distinctive periodicity which is an integral multiple of said first periodicity, and means responsive simultaneously to each of said control effects for effecting distribution into storage in said storage means by word, character and modal storage positions of information presented in serial form.

20. A calculating machine comprising, storage means operating in repetitive cycles of predetermined periodicity for storing information presented in serial form, means for developing a plurality of periodic control effects each having a distinctive periodicity which is an integral multiple of said first periodicity, and means responsive simultaneously to each of said control effects for effecting distribution into storage in said storage means and in modal storage positions of data information interspersed with calculation program instruction information having preselected fixed spatial relationships in storage to said data information.

21. A calculating machine comprising: a storage medium; means for storing in said medium by successively subdivided word, character and modal storage positions data information presented in serial form; and means for storing in said medium in preselected ones of said modal storage positions of each character storage position calculation instruction information presented in serial form and in such manner that each such instruction is stored in predetermined spatial relation in said medium to stored data information to which the instruction relates.

22. A calculating machine comprising, a storage medium, storage control means controlling the storage of information in said medium and abstraction of stored information therefrom by relation to preselected spatially positioned word storage increments each having preselected spatially positioned character storage increments each having preselected spatially positioned mode increments, said means effecting initial storage of data information in preselected ones of the mode storage increments of each character storage increment in interspersed relation with storage of calculation program instructions in preselected other ones of said mode increments of said each character increment with the instruction storage spatially positioned with relation to the stored data information to which the instruction relates, and means responsive to each program instruction for controlling said storage control means to take data from storage in one mode increment and after processing the data under program instruction to restore the processed data in another of said mode increments.

23. A calculating machine comprising, a storage medium, storage control means controlling the storage of information in said medium and abstraction of stored information therefrom by relation to preselected spatially positioned word storage increments each having preselected spatially positioned character storage increments each having preselected spatially positioned mode increments, said means effecting initial storage of data information in preselected input ones of the mode increments of each said character increment in interspersed relation with storage of calculation program instructions in preselected other ones of the mode increments of said each character increment with the instruction storage spatially positioned with relation to the stored data information to which the instruction relates, data transfer means operating in response to the completion of storage of a preselected quantity of data information for controlling said storage control means to effect transfer of stored data from each said input mode to a corresponding calculate mode to leave said input modes free to receive a new quantity of data information during the ensuing data processing interval, and means responsive to the stored program instructions for controlling said storage control means to take data from storage in said calculate modes and process it under program instruction and thereafter to restore said processed data in said calculate modes.

24. A calculating machine comprising, a storage medium, storage control means controlling the storage of information in said medium and abstraction of stored information therefrom by relation to preselected spatially positioned word storage increments each having preselected spatially positioned character storage increments each having preselected spatially positioned mode increments, said means effecting initial storage of data information in preselected input ones of the mode increments of each said character increment in interspersed relation with storage of calculation program instructions in preselected other ones of the mode increments of said each character increment with the instruction storage spatially positioned with relation to the stored data information to which the instruction relates, data transfer means operating in response to the completion of storage of a preselected quantity of data information for controlling said storage control means to effect transfer of stored data from each said input mode to a corresponding calculate mode to leave said input modes free to receive a new quantity of data information during the ensuing data processing interval, and means responsive to the stored program instructions for controlling said storage control means to take data from storage in said calculate modes and process it under program instruction using at least one temporary additional mode storage to ultimate processed form and for thereafter restoring said ultimate processed data in said calculate modes.

25. A calculating machine comprising, a storage medium, storage control means controlling the storage of information in said medium and abstraction of stored information therefrom by relation to preselected spatially positioned word storage increments each having preselected spatially positioned character storage increments each having preselected spatially positioned mode increments, said means effecting initial storage of data information in preselected input ones of the mode increments of each said character increment in interspersed relation with storage of calculation program instructions in preselected other ones of the mode increments of said each character increment with the instruction storage spatially positioned with relation to the stored data information to which the instruction relates, data transfer means operating in response to the completion of storage of a preselected quantity of data information for controlling said storage control means to effect transfer of stored data from each said input mode to a corresponding calculate mode to leave said input modes free to receive a new quantity of data information during the ensuing data processing interval, means responsive to the stored program instructions for controlling said storage control means to take data from storage in said calculate modes and process it under program instruction and thereafter to restore said processed data in said calculate modes, and means responsive to the completion of a calculate operation for controlling said storage control means to effect transfer of storage of processed data to storage in an output mode and thereby leave said calculate modes free to accept new data for processing during the ensuing interval when processed data is supplied to the output of said machine.

26. A calculating machine comprising: a storage medium; storage control means for effecting transfer to and from said medium of data information in serial form by relation to modal storage increments of said medium arranged in modal groups each having selectably positioned modes including at least one for storage of calculation program instruction information, at least one for data information, at least one for data information input storage, at least one for processed data output storage, and at least one for data storage during calculation processing under program instruction; and means responsive to stored program instructions for controlling said storage control means to receive data information stored in said input modes, process it under program instruction, and transfer the processed data to storage in said output modes.

27. A calculating machine comprising: a storage medium; storage control means for effecting transfer to and from said medium of data information in serial form by relation to modal storage increments of said medium arranged in modal groups each having preselectably positioned modes including at least one for storage of calculation program instruction information, at least one for data information input storage, at least one for processed data output storage, at least one for data storage during calculation processing under program instruction, and at least one auxiliary storage mode; and means responsive to stored program instructions for controlling said storage control means to receive data information stored in said input modes, process it under program instruction including at least one temporary storage in said auxiliary modes, and transfer the processed data to storage in said output modes.

28. A calculating machine comprising: a storage medium; storage control means for effecting transfer to and from said medium of data information in serial form by relation to modal storage increments of said medium arranged in modal groups each having preselectably positioned modes including one for storage of calculation program instruction information, one for data information input storage, one for processed data output storage, and one for data storage during calculation processing under program instruction; means responsive to the completion of storage of a predetermined quantity of data information in said input modes for controlling said storage control means to effect transfer of stored data from each input mode to a corresponding one of said calculate modes to leave the input modes free to receive a new quantity of data information during the ensuing data processing interval; means responsive to stored program instructions for controlling said storage control means to receive data information from said calculate modes and to return it to said calculate modes after program instruction processing; and means responsive to the completion of data processing under program instruction for controlling said storage control means to receive processed data information from said calculate modes and to store it in said output modes to leave said calculate modes free to receive a new quantity of data information from said input modes.

29. A calculating machine comprising; a storage medium; storage control means for effecting transfer to and from said medium of data information in serial form by relation to modal storage increments of said medium arranged in modal groups each having preselectably positioned modes including one for storage of calculation program instruction information, one for data information input storage, one for processed data output storage, and one for data storage during calculation processing under program instruction; means responsive to the completion of storage of a predetermined quantity of data information in said input modes for controlling said storage control means to effect transfer of stored data from each input mode to a corresponding one of said calculate modes to leave the input modes free to receive a new quantity of data information during the ensuing data processing interval, and means responsive to stored program instructions for controlling said storage control means to receive data information from said calculate modes and to return it to said calculate modes after program instruction processing.

30. An information storage calculation system comprising, an information storage medium, translating means for effecting transfer of information with respect to storage in said medium, said medium and said means having relative movement related to distribution of said information in storage, means having a motion related to said relative movement for controlling said information distribution to effect predetermined positional storage with respect to a preselected initial storage position, and means having an operation controlled by said last-named means for effecting such transfer into and out of storage of calculation program instruction information and data information that the program instructions are stored in preestablished spatial relationships to the data information to which each instruction relates to permit spatial relationship selection of data and related instruction information for processing.

31. An information storage calculation system comprising, an information storage medium, translating means for effecting transfer of information with respect to storage in said medium, said medium and said means having relative movement related to distribution of said information in storage, means having a motion related to said relative movement for controlling said information distribution to effect predetermined positional storage with respect to a preselected initial storage position, and means controlled by said last-named means for transferring calculating program information and data information into and out of storage while maintaining preestablished spatial relationships in storage of each program instruction and the data information to which the instruction relates to permit spatial relationship selection of data and related instruction information for processing.

32. An information storage calculation system comprising, an information storage medium, translating means for effecting transfer of information with respect to storage in said medium, said medium and said means having relative movement related to distribution of said information in storage, means having a motion related to said relative movement for controlling said information distribution to effect predetermined positional storage with respect to a preselected initial storage position, means controlled by said positional control means for transferring calculation program information into and out of relatively long term storage at spaced positional relationships in said medium, and means controlled by said positional control means for transferring data information to be processed into and out of relatively short term storage at positions bearing predetermined spatial relationships as between each program instruction and the data information to which the instruction relates.

33. An information storage calculation system comprising, an information storage medium, translating means for effecting transfer of information with respect to storage in said medium, said medium and said means having relative movement related to distribution of said information in storage, means having a motion related to said relative movement for controlling said information distribution to effect predetermined positional storage with respect to a preselected initial storage position, means having an operation controlled by said last-named means for selectively transferring groups of calculation program instructions into and out of storage at spaced positional relationships in said medium, and means controlled by said positional control means for selectively transferring grouped data information to be processed into and out of storage with each data informtaion group stored between two successive groups of program instructions but bearing in storage a predetermined spatial relationship to stored program instructions applicable thereto.

34. An information storage calculation system comprising, an information storage medium, translating means for effecting transfer of information with respect to storage in said medium, said medium and said means having relative movement related to distribution of said information in storage, means having a motion related to said relative movement for controlling said information distribution to effect predetermined positional storage with respect to a preselected initial storage position, means having an operation controlled by said positional control means for selectively transferring groups of calculation program instruction into and out of relatively long term storage at spaced positional relationships in said medium, and means controlled by said positional control means for selectively flowing grouped data information into and out of relatively short term storage at successive individual positions in storage intervening between groups of stored program instructions while maintaining predetermined spatial relationships between each data group and the program instructions applicable thereto.

35. An information storage calculation system comprising, an information storage medium, translating means for effecting transfer of information with respect to storage in said medium, said medium and said means having relative movement related to distribution of said information in storage, means having a motion related to said relative movement for controlling said information distribution to effect predetermined positional storage with respect to a preselected initial storage position, means controlled by said positional control means for selectively placing into storage and thereafter selectively using from storage a plurality of calculation program instructions each applicable to any data information stored in predetermined positional relationships thereto, and means controlled by said positional control means for periodically supplying data information into storage in said positional relationships for selective processing by said program instructions.

36. A data processing system comprising, storage means having plural digit storage positions presented in succession, information transfer control means operating in synchronism with the presentation of said storage positions for preselecting storage positions in which plural data processing instructions may be stored and from which said instructions may be supplied from storage and for concurrently automatically preselecting for each said instruction storage position data information storage positions which are individual to said each instruction storage position and have fixed storage-position spatial relationships thereto, and means for controlling said transfer control means to store and thereafter utilize said processing instructions in preselected sequence by addressing successively and automatically said preselected storage positions thereof and during said utilization concurrently to address for data information transfer selection the data information storage positions spatially preselected to be individual to each instruction selected.

37. A data processing system comprising, cyclically operating storage means having plural digit storage positions presented in succession during each operating cycle and repetitively presented during successive operating cycles, information transfer control means operating in synchronism with the presentation of said storage positions for preselecting storage positions to and from which plural data processing instructions may be stored and supplied from storage and for concurrently automatically preselecting data information storage positions which are individual to said each instruction storage position and have fixed storage-position spatial relationships thereto, and means for controlling said transfer control means to store and thereafter utilize said processing instructions in preselected sequence by addressing successively and automatically said preselected storage positions thereof and during said utilization concurrently to address for data information transfer selection the data information storage positions spatially preselected to be individual to each instruction selected.

38. A data processing system comprising, a rotatable magnetic storage drum having plural digit storage positions presented in succession during each drum rotation and repetitively presented during successive drum rotations, information transfer control means operating in synchronism with the presentation of said storage positions for preselecting storage positions to and from which plural data processing instructions may be stored and supplied from storage and for concurrently automatically preselecting data information storage positions which are individual to said each instruction storage position and have fixed storage-position spatial relationships thereto, and means for controlling said transfer control means to store and thereafter utilize said processing instructions in preselected sequence by addressing successively and automatically said preselected storage positions thereof and during said utilization concurrently to address for data information transfer selection the data information storage positions spatially preselected to be individual to each instruction selected.

39. A data processing system comprising, storage means having plural digit storage positions presented in succession, information transfer control means operating synchronously with the presentation of said storage positions for establishing and maintaining by controlled information transfer to and from each said storage position of preselected fixed operational storage relationships between each data processing instruction storage location and the data information storage locations to and from which data information may be transferred under control of said each instruction, and means for controlling said transfer control means to store and thereafter utilize said processing instructions in preselected sequence by addressing successively and automatically said preselected storage positions thereof and during said utilization concurrently to address for data information transfer selection the data information storage positions spatially preselected to be individual to each instruction selected.

40. A data processing system comprising, storage means having plural digit storage positions presented in succession, information transfer control means operating synchronously with the presentation of said storage positions for establishing and maintaining by controlled information transfer to and from each said storage position of preselected fixed operational storage relationships between each data processing instruction storage location and the data information storage locations to and from which data information may be transferred under control of said each instruction, and means for controlling said transfer control means to select and utilize said processing instructions in preselected sequence by addressing successively and automatically said preselected storage positions thereof while concurrently effecting automatic data information transfer at storage positions preselected by said preselected fixed spatial relationships to each processing instruction selected.

41. A data processing system comprising, storage means having plural digit storage positions presented in succession, information transfer control means operating in synchronism with the presentation of said storage positions for storage-positional addressing of stored data-processing instructions to select said instructions successively for use by addressing successively and automatically the preselected storage positions thereof, and means effective upon each said instruction selection for automatically addressing for data information storage transfer under control of the selected instruction preselected storage positions preselected to be individual to each said instruction selected.

42. A data processing system comprising, storage means having plural digit storage positions presented in succession, information transfer control means operating in synchronism with the presentation of said storage positions for storage-positional addressing of stored data-processing instructions to select said instructions successively for use by addressing successively and automatically the preselected storage position thereof and upon each said selection for automatically addressing for data information storage transfer under control of the selected instruction preselected storage positions preselected to be individual to each said instruction selected, and means responsive to completion of use of each instruction selected for controlling said transfer control means to effect automatic addressing of a succeeding instruction storage position together with its individual preselected data information storage positions.

43. A data storage system comprising, storage means having plural digit storage positions presented in succession, information transfer control means operating in synchronism with the presentation of said storage positions for storage-positional addressing of data-processing instructions stored successively in spaced ones of said storage positions to select said instructions successively for use by addressing successively and automatically the preselected storage positions thereof, and means effective upon each said instruction selection for automatically addressing for data information storage transfer under control of the selected instruction preselected storage positions which are interspersed with said instruction storage positions but are preselected to be individual to each said instruction selected.

References Cited in the file of this patent

UNITED STATES PATENTS

| | | |
|---|---|---|
| 2,604,262 | Phelps et al. | July 22, 1952 |
| 2,904,776 | Neff | Sept. 15, 1956 |
| 2,767,908 | Thomas | Oct. 23, 1956 |
| 2,771,595 | Hendrickson | Nov. 20, 1956 |
| 2,808,986 | Stone et al. | Oct. 8, 1957 |
| 2,810,516 | Toothill et al. | Oct. 22, 1957 |
| 2,838,745 | Wright et al. | June 10, 1958 |
| 2,849,704 | Neff | Aug. 26, 1958 |
| 2,850,720 | Oliwa et al. | Sept. 2, 1958 |
| 2,891,237 | Sink et al. | June 16, 1959 |

FOREIGN PATENTS

| | | |
|---|---|---|
| 1,056,750 | France | Oct. 21, 1953 |

UNITED STATES PATENT OFFICE

CERTIFICATE OF CORRECTION

Patent No. 3,028,583 April 3, 1962

James E. Fernekees et al.

It is hereby certified that error appears in the above numbered patent requiring correction and that the said Letters Patent should read as corrected below.

Column 17, line 47, for "$p_1$" read -- $P_1$ --; column 19, line 17, for "impresed" read -- impressed --; column 31, line 4, for "dsicharge" read -- discharge --; column 38, line 21, for "present" read -- preset --; column 39, line 2, strike out "to"; line 72, for "proces" read -- process --; column 47, line 51, for "added" read -- adder --; column 59, line 24, for "537" read -- 637 --; column 69, line 42, for "informtaion" read -- information --.

Signed and sealed this 18th day of September 1962.

(SEAL)

ttest:

RNEST W. SWIDER
ttesting Officer

DAVID L. LADD
Commissioner of Patents